United States Patent [19]

Furuta et al.

[11] Patent Number: 5,504,838
[45] Date of Patent: Apr. 2, 1996

[54] NEURON UNIT WITH ERROR SIGNAL HAVING COMPONENTS REPRESENTING PULSE DENSITIES

[75] Inventors: Toshiyuki Furuta; Hiroyuki Horiguchi; Hirotoshi Eguchi; Yutaka Ebi; Tatsuya Furukawa, all of Yokohama; Yoshio Watanabe, Kawasaki; Toshihiro Tsukagoshi, Itami, all of Japan

[73] Assignee: Ricoh Company, Ltd., Tokyo, Japan

[21] Appl. No.: 206,855

[22] Filed: Mar. 7, 1994

Related U.S. Application Data

[63] Continuation of Ser. No. 889,380, May 28, 1992, Pat. No. 5,333,241, which is a continuation of Ser. No. 629,632, Dec. 18, 1990, Pat. No. 5,167,006.

[30] Foreign Application Priority Data

| Dec. 29, 1989 | [JP] | Japan | 1-343891 |
|---|---|---|---|
| Mar. 7, 1990 | [JP] | Japan | 2-55523 |
| Mar. 9, 1990 | [JP] | Japan | 2-58515 |
| Mar. 9, 1990 | [JP] | Japan | 2-58548 |
| Mar. 12, 1990 | [JP] | Japan | 2-60738 |
| Mar. 16, 1990 | [JP] | Japan | 2-67938 |
| Mar. 16, 1990 | [JP] | Japan | 2-67939 |
| Mar. 16, 1990 | [JP] | Japan | 2-67940 |
| Mar. 16, 1990 | [JP] | Japan | 2-67941 |
| Mar. 16, 1990 | [JP] | Japan | 2-67942 |
| Mar. 16, 1990 | [JP] | Japan | 2-67943 |
| Mar. 16, 1990 | [JP] | Japan | 2-67944 |
| Oct. 11, 1990 | [JP] | Japan | 2-272827 |

[51] Int. Cl.$^6$ ........................... G06F 15/18
[52] U.S. Cl. ........................... 395/23; 395/27
[58] Field of Search ........................... 395/27, 21, 23

[56] References Cited

U.S. PATENT DOCUMENTS

| 3,293,609 | 12/1966 | Martin | 395/27 |
|---|---|---|---|
| 3,358,271 | 12/1967 | Marcus et al. | 395/27 |
| 3,601,811 | 8/1971 | Yoshino | 395/24 |
| 4,193,115 | 3/1980 | Albus | 395/26 |
| 4,807,168 | 2/1989 | Moopenn et al. | 395/27 |
| 4,893,255 | 1/1990 | Tomlinson, Jr. | 395/25 |
| 4,918,618 | 4/1990 | Tomlinson, Jr. | 395/25 |
| 4,941,122 | 7/1990 | Weideman | 395/11 |
| 4,974,169 | 11/1990 | Engel | 395/27 |
| 4,990,838 | 2/1991 | Kawato et al. | 395/11 |
| 5,043,913 | 8/1991 | Furutani | 395/27 |
| 5,048,100 | 9/1991 | Kuperstein | 395/24 |
| 5,093,899 | 3/1992 | Hiraiwa | 395/23 |
| 5,095,443 | 3/1992 | Watanabe | 395/23 |
| 5,129,038 | 7/1992 | Kodha et al. | 395/23 |
| 5,165,010 | 11/1992 | Masuda et al. | 395/27 |

FOREIGN PATENT DOCUMENTS

| 62-295188 | 12/1987 | Japan . |
|---|---|---|
| 1-244567 | 9/1989 | Japan . |

OTHER PUBLICATIONS

Ito et al., "A Neural Network Model Extracting Features form Speech Signals", Electronic Information Communication Society Papers '87/2 vol. J70–D No. 2.

(List continued on next page.)

*Primary Examiner*—Robert W. Downs
*Attorney, Agent, or Firm*—Popham, Haik, Schnobrich & Kaufman, Ltd.

[57] ABSTRACT

A neuron unit processes a plurality of input signals and outputs an output signal which is indicative of a result of the processing. The neuron unit includes input lines for receiving the input signals, a forward process part including a supplying part for supplying weight functions and an operation part for carrying out an operation on each of the input signals using one of the weight functions and for outputting the output signal, and a self-learning part including a generating part for generating new weight functions based on an error signal representing an error between the output signal of the forward process part and a teaching signal and a varying part for varying the weight functions supplied by the supplying part of the forward process part to the new weight functions generated by the generating part. The error signal includes first and second error signal components representing pulse densities.

1 Claim, 46 Drawing Sheets

OTHER PUBLICATIONS

Murray et al., "Asynchoronous Arithmetic for VLSI Neural Systems", Electronic Letters 4th Jun. 1987, vol. 23, No. 12.

Murray et al., "A Novel Computational and Signalling Method for VLSI Neural Networks", Digest of Technical Papers ESSCIRC '87 Thirteenth European Solid–State Circuits Conference, Sep. 23–25, 1987.

Kamada et al., "Digital Neuron Model", 1988 Electronic Information Communication Society Spring National Conference.

Yoshida et al., "Neural Coupling Model of Visuel Domain", 1974 Electronic Communication Society National Conference.

K. Fukushima, "Cognitron", 1974 Electronic Communication Society National Conference.

K. Fukushima, "Improvement in Pattern–Selectivity of a Cognitron", Electronic Communication Society Papers '79/ 10 vol. J62–A No. 10.

W. Banzhaf, "On a Simple Stochastic Neuron–Like Unit", Biological Cybernetics vol. 60, No. 2, 1988.

Martinez, T., "Digital Neural Networks", *Proceedings of the 1988 IEEE Conference on Systems, Man and Cybernetics*, Aug. 8–12, 1988, pp. 681–684.

Widrow, B., et al., "Layered Neural Nets for Pattern Recognition", *IEEE Transactions on Acoustics, Speech, and Signal Processing*, vol. 36, No. 7, Jul. 1988, pp. 1109–1118.

Yasunaga, M., et al., "A Wafer Scale Integration Neural Network Utilizing Completely Digital Circuits", *Proc. of the IJCNN*, Jun. 18, 1989, vol. 2, pp. 213–217.

Murray, A. F., and Smith, A. V. W., "Asynchronous VLSI Neural Networks Using Pulse–Stream Arithmetic", *IEEE Journal of Solid–State Circuits*, vol. 23, No. 3, Jun. 1988, pp. 688–697.

Suzuki, Y. and Atlas, L. E., "A study of Regular Architectures for Digital Implementation of Neural Networks", *IEEE International Symposium on Circuits and Systems*, 8–11 May 1989, pp. 82–85.

Treleaven, P., et al., "VLSI Architecture for Neural Networks", *IEEE Micro*, Dec. 1989, pp. 8–27.

Hirai, Yuzo et al., "Design of a Completely Digital Neuro–Chip", *Integrated Circuit Study Group of the Electronic Information Communication Society*, Dec. 16, 1988, pp. 89–93.

Banzhaf, "On a Simple Stochastic Neuron–Like Unit", *Biological Cybernetics.*, 60, 1988, pp. 155–160.

Duranton, M., et al., "A General Purpose Digital Architecture for Neural Network Simulations", *First Conference on Artificial Neural Networks*, 16–18 Oct. 1989, pp. 62–66.

Eberhardt, S. et al., "Design of Parallel Hardware Neural Network Systems from Custom Analog VLSI 'Building Block' Chips", *IJCNN*, Jun. 18–22, 1989, vol. 2, pp. 183–190.

Furman, B., et al., "An Analog CMOS Backward Error–Propagation LSI", *First Annual INNS Symposium*, 1988.

Wike, W., et al., "The VLSI Implementation of STONN", *IJCNN*, 1990, vol. 2, pp. 593–598.

Tomberg, et al., "Fully Digital Neural Network Implementation Based on Pulse Density Modulation", IEEE 1989 Custom Integrated Circuits Conf., May 1989, 12.7.1–12.7.4.

T. Furuta et al., "Neuron Model Utilizing Pulse Density and its Self–Learning Circuit," *1990 Spring National Convention Record, The Institute of Electronics, Information and Communication Engineers*, vol. D–56 (1990), pp. 6–56.

T. Furuta et al., "Pulse Density Neuron Model Having Learning Function and How to Construct it by Hardwares," *Inst. Electronics, Infor. and Comm. Engr.* (Oct. 15, 1990), p. 66.

T. Furuta et al., "Development of Neuro LSI with Self–Learing Function Utilizing Pulse Density," *1990 Autumn National Convention Record, The Institute of Electronics, Information and Communication Engineers*, vol. D–41 (1990), pp. 6–41.

FIG. 3 PRIOR ART
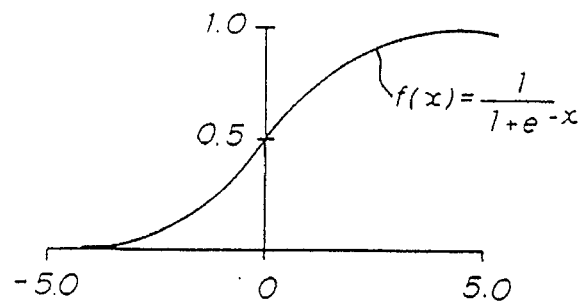
FIG. 4 PRIOR ART
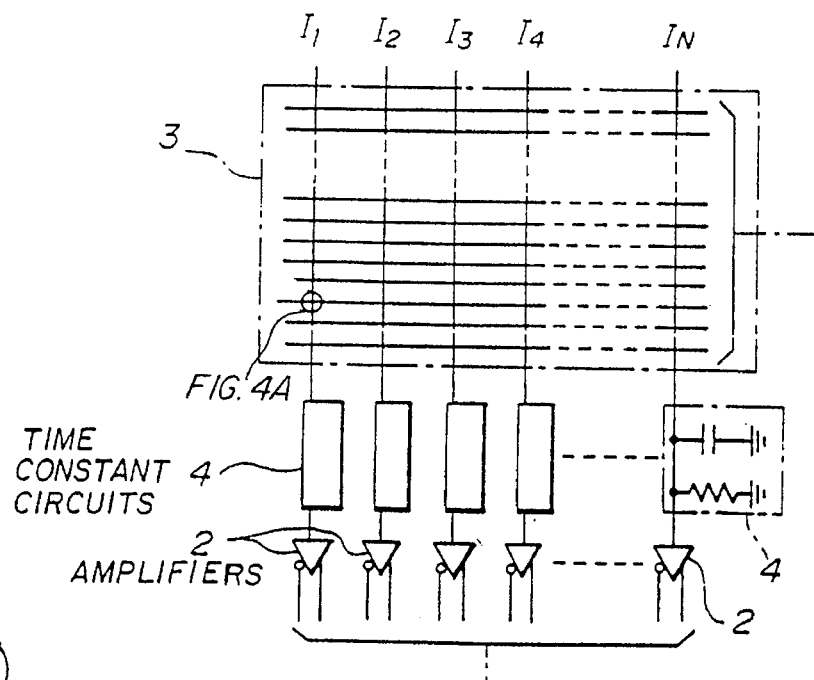
FIG. 4A PRIOR ART

FIG. 23

INPUT SIGNAL

WEIGHT FUNCTION $y_i \cap T_{ij} = 4/6$ $y_i \cap T_{ij} = 3/6$ $y_i \cap T_{ij} = 2/6$

FIG. 24

$y_i \cap T_{ij}$ $\vdots$ $y_i \cap T_{ij}$ $U(y_i \cap T_{ij})$

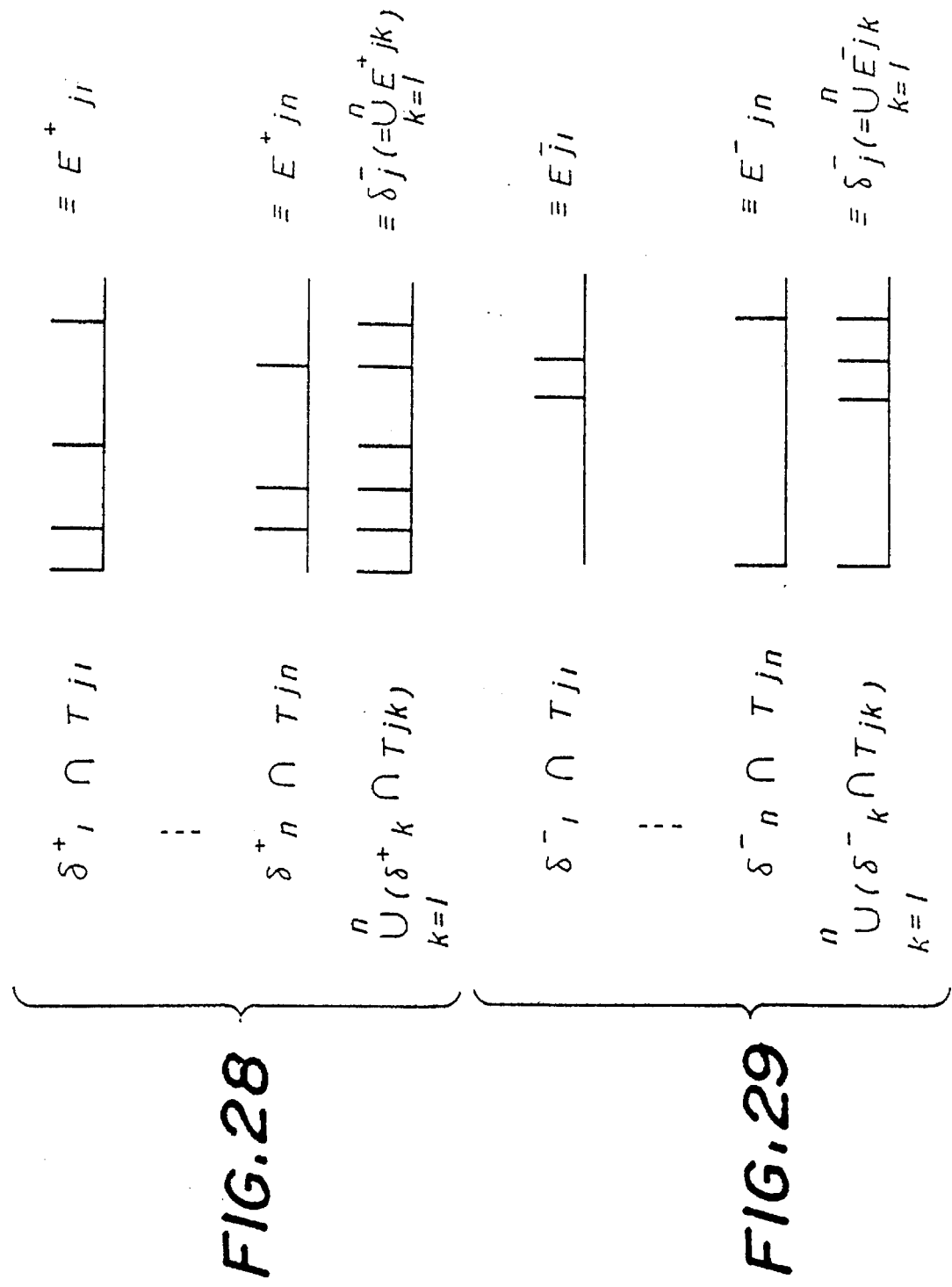

FIG. 30

$$\left. \begin{array}{l} \delta^-_1 \cap T_{j1} \\ \qquad \cdots \\ \delta^-_n \cap T_{jn} \\ \bigcup_{k=1}^{n}(\delta^+_k \cap T_{jk}) \end{array} \right\}$$

$\equiv E^+_{j1}$ $\equiv E^+_{jn}$ $\equiv \delta^+_j \left(= \bigcup_{k=1}^{n} E^+_{jk}\right)$

FIG. 31

$$\left. \begin{array}{l} \delta^+_1 \cap T_{j1} \\ \qquad \cdots \\ \delta^+_n \cap T_{jk} \\ \bigcup_{k=1}^{n}(\delta^-_k \cap T_{jk}) \end{array} \right\}$$

$\equiv E^-_{j1}$ $\equiv E^-_{jn}$ $\equiv \delta^-_j \left(= \bigcup_{k=1}^{n} E^-_{jk}\right)$

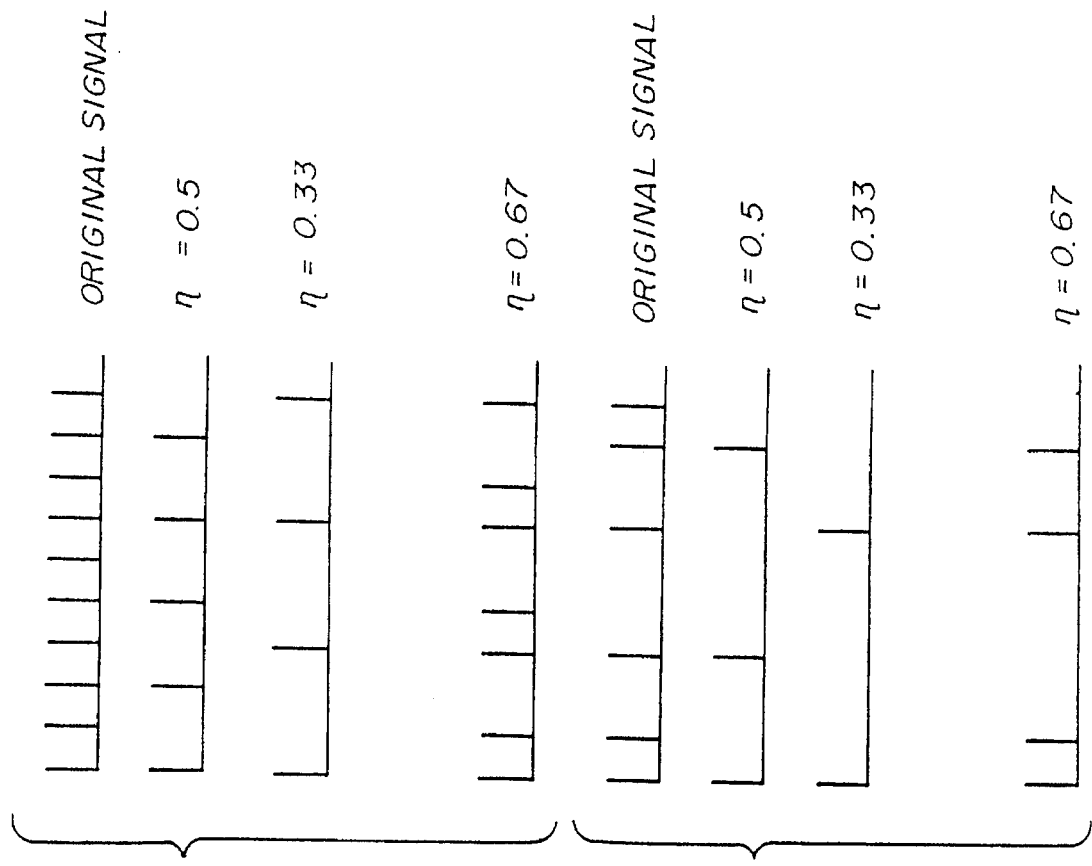

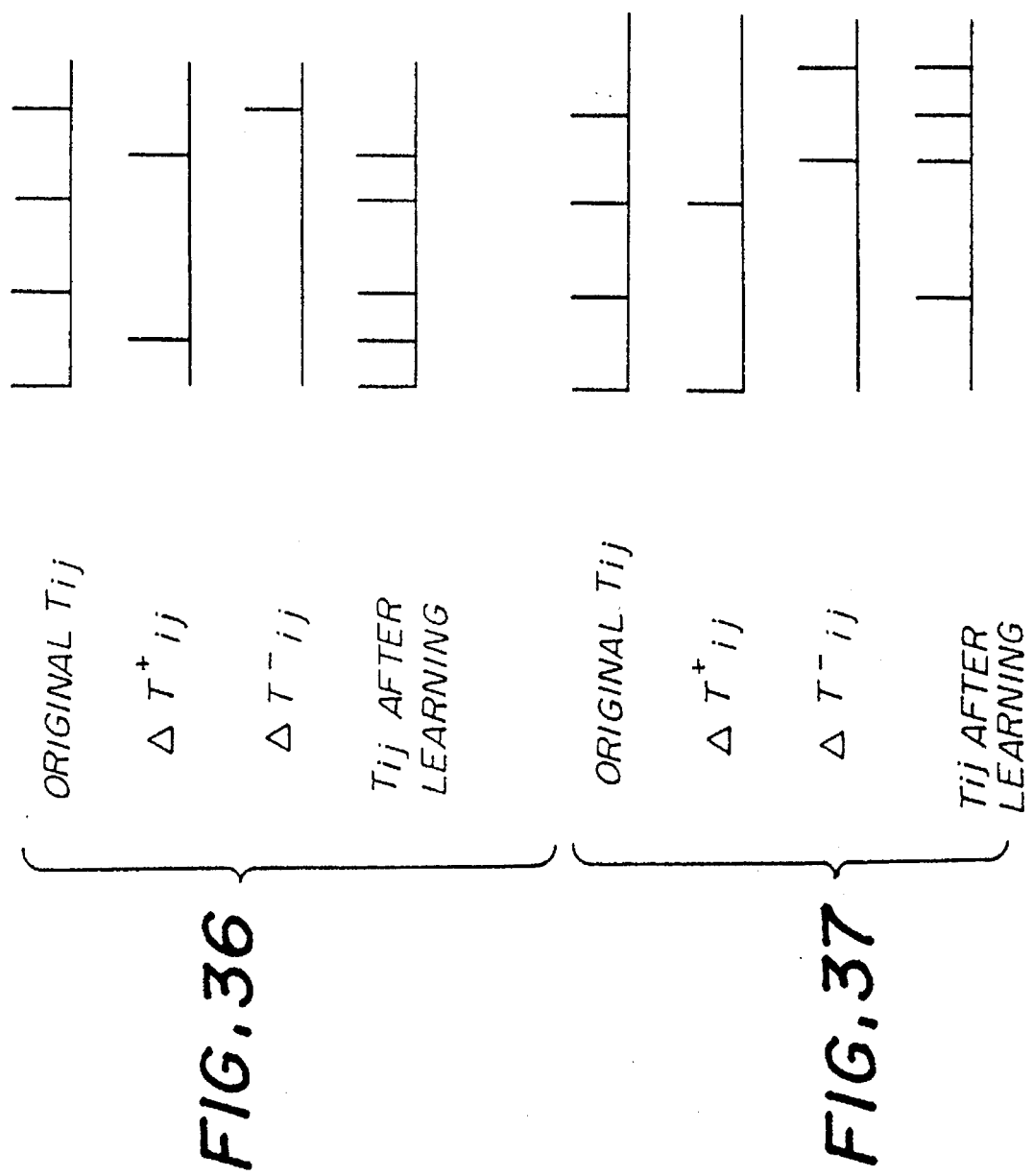

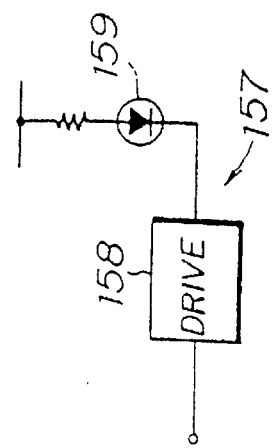
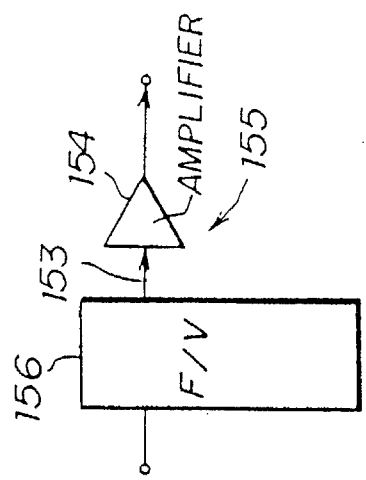
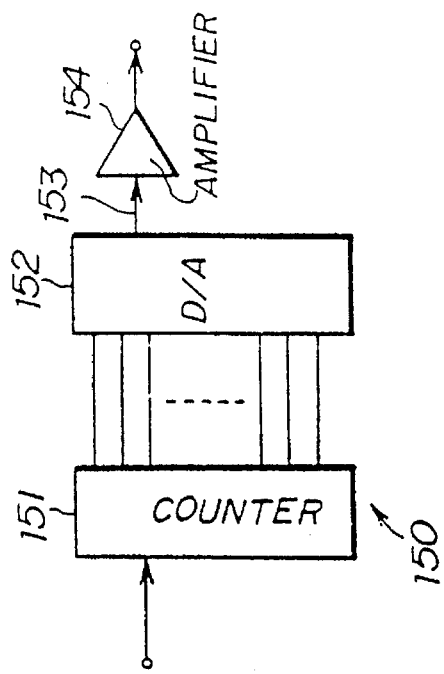
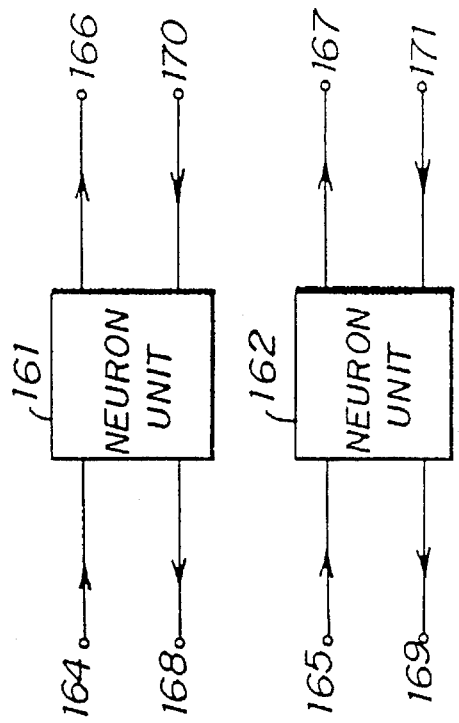

NEURON UNIT WITH ERROR SIGNAL HAVING COMPONENTS REPRESENTING PULSE DENSITIES

This application is a continuation of allowed U.S. patent application Ser. No. 07/889,380, filed May 28, 1992, now U.S. Pat. No. 5,333,241 which is a continuation of U.S. patent application Ser. No. 07/629,632, filed Dec. 18, 1990, now U.S. Pat. No. 5,167,006, issued Nov. 24, 1992.

BACKGROUND OF THE INVENTION

The present invention generally relates to neuron units, neural networks and signal processing methods, and more particularly to a neuron unit which resembles neurons and is applicable to neural computers, a neural network which includes a plurality of such neuron units which are coupled to form a hierarchical network structure and a signal processing method which uses such a neural network.

In a living body, processes such as character recognition, memory by association and control of motion can be carried out quite simply. However, such processes are often extremely difficult to carry out on Neumann computers.

Hence, in order to cope with the problems encountered in the Neumann computers, various models of neuron units and neural networks have been proposed. The neuron unit resembles a neuron of the living body, and the neural network uses such neuron units which form a network so as to carry out parallel information processing and self teaching which are functions peculiar to a nervous system of the living body.

Presently, the neural network is in most cases realized by computer simulation. However, in order to bring out the advantageous features of the neural network, it is necessary to realize the parallel processing by hardware.

Some proposals have been made to realize the neural network by hardware, however, the proposed neural networks cannot realize the self learning function which is another advantageous feature of the neural network. Furthermore, the majority of the proposed neural networks are realized by analog circuits can suffer from the problems which will be described later in conjunction with the drawings.

First, a description will be given of a model of a conventional neural network. FIG. 1 shows one neuron unit 1, and FIG. 2 shows a neural network which is made up of a plurality of such neuron units 1. Each neuron unit 1 of the neural network is coupled to and receives signal from a plurality of neuron units 1, and outputs a signal by processing the received signals. In FIG. 2, the neural network has a hierarchical structure, and each neuron unit 1 receives signals from the neuron units 1 located in a previous layer shown on the left side and outputs a signal to the neuron units 1 located in a next layer shown on the right side.

In FIG. 1, $T_{ij}$ denotes a weight function which indicates the intensity of coupling (or weighting) between an ith neuron unit and a jth neuron unit. The coupling between first and second neuron units is referred to as an excitatory coupling when a signal output from the second neuron unit increases as a signal received from the first neuron unit increases. On the other hand, the coupling between the first and second neuron units is referred to as an inhibitory coupling when the signal output from the second neuron unit decreases as the signal received from the first neuron unit increases. $T_{ij} > 0$ indicates the excitatory coupling, and $T_{ij} < 0$ indicates the inhibitory coupling.

FIG. 1 shows the jth neuron unit 1 which outputs an output signal $y_j$. When an output signal of the ith neuron unit 1 is denoted by $y_i$, the input signal to the jth neuron unit 1 from the ith neuron unit 1 can be described by $T_{ij}y_i$. Since a plurality of neuron units 1 are coupled to the jth neuron unit 1, the input signals to the jth neuron unit 1 can be described by $\Sigma T_{ij}y_i$. The input signals $\Sigma T_{ij}y_i$ to the jth neuron unit 1 will hereinafter be referred to as an internal potential $u_j$ of the jth neuron unit 1 as defined by the following equation (1).

$$u_j = \Sigma T_{ij} y_i \quad (1)$$

Next, it will be assumed that a non-linear process is carried out on the input. The non-linear process is described by a non-linear neuron response function using a sigmoid function as shown in FIG. 3 and the following equation (2).

$$f(x) = 1/(1+e^{-x}) \quad (2)$$

Hence, in the case of the neural network shown in FIG. 2, the equations (1) and (2) are successively calculated for each weight function $T_{ij}$ as as to obtain a final output.

FIG. 4 shows an example of a conventional neuron unit proposed in a Japanese Laid-Open Patent Application No. 62-295188. The neuron unit includes a plurality of amplifiers 2 having an S-curve transfer function, and a resistive feedback circuit network 3 which couples outputs of each of the amplifiers 2 to inputs of amplifiers in another layer as indicated by a one-dot chain line. A time constant circuit 4 made up of a grounded capacitor and a grounded resistor is coupled to an input of each of the amplifiers 2. Input currents $I_1, I_2, \ldots, I_N$ are respectively applied to the inputs of the amplifiers 1, and output is derived from a collection of output voltages of the amplifiers 2.

An intensity of the coupling (or weighting) between the neuron units is described by a resistance of a resistor 5 (a lattice point within the resistive feedback circuit network 3) which couples the input and output lines of the neuron units. A neuron response function is described by the transfer function of each amplifier 2. In addition, the coupling between the neuron units may be categorized into the excitatory and inhibitory couplings, and such couplings are mathematically described by positive and negative signs on weight functions. However, it is difficult to realize the positive and negative values by the circuit constants. Hence, the output of the amplifier 2 is distributed into two signals, and one of the two signals is inverted so as to generate a positive signal and a negative signal. One of the positive and negative signals derived from each amplifier 2 is appropriately selected. Furthermore, an amplifier is used to realize the sigmoid function shown in FIG. 3.

However, the above described neuron unit suffers from the following problems.

(1) The weight function $T_{ij}$ is fixed. Hence, a value which is learned beforehand through a simulation or the like must be used for the weight function $T_{ij}$, and a self-learning cannot be made.

(2) Because the signal intensity is described by an analog value of potential or current and internal operations are also carried out in the analog form, the output value easily changes due to the temperature characteristic, the drift which occurs immediately after the power source is turned ON and the like.

(3) When the neural network is formed by a large number of neuron units, it is difficult to obtain the large number of neuron units which have the same characteristic.

(4) When the accuracy and stability of one neuron unit are uncertain, new problems may arise when a plurality of such neuron units are used to form the neural network. As a result, the operation of the neural network becomes unpredictable.

On the other hand, as a learning rule used in numerical calculations, there is a method called back propagation which will be described hereunder.

First, the weight functions are initially set at random. When an input is applied to the neural network in this state, the resulting output is not necessarily a desirable output. For example, in the case of character recognition, a resulting output "the character is 'L'" is the desirable output when a handwritten character "L" is the input, however, this desirable output is not necessarily obtained when the weight functions are initially set at random. Hence, a correct solution (teaching signal) is input to the neural network and the weight functions are varied so that the correct solution is output when the input is the same. The algorithm for obtaining the varying quantity of the weight functions is called the back propagation.

For example, in the hierarchical neural network shown in FIG. 2, the weight function $T_{ij}$ is varied using the equation (4) so that E described by the equation (3) becomes a minimum when the output of the jth neuron unit in the output (last) layer is denoted by $y_j$ and the teaching signal with respect to this jth neuron unit is denoted by $d_j$.

$$E = \Sigma(d_j - y_j)^2 \quad (3)$$

$$\Delta T_{ij} = \sigma E / \sigma T_{ij} \quad (4)$$

Particularly, when obtaining the weight functions of the output layer and the layer immediately preceding the output layer, an error signal $\delta$ is obtained using the equation (5), where f' denotes a first order differential function of the sigmoid function f.

$$\delta_j = (d_j - y_j) \times f'(u_j) \quad (5)$$

When obtaining the weight functions of the layers preceding the layer which immediately precedes the output layer, the error signal $\delta$ is obtained using the equation (6).

$$\delta_j = \Sigma \delta_j T_{ij} \times f'(u_j) \quad (6)$$

The weight function $T_{ij}$ is obtained from the equation (7) and varied, where $\Delta T_{ij}'$ and $T_{ij}'$ are values respectively obtained during the previous learning, $\eta$ denotes a learning constant and $\alpha$ denotes a stabilization constant.

$$\Delta T_{ij} = \eta(\delta_j y_i) + \alpha \Delta T_{ij}'$$

$$T_{ij} = T_{ij}' + \Delta T_{ij} \quad (7)$$

The constants $\eta$ and $\alpha$ are obtained through experience since these constants $\eta$ and $\alpha$ cannot be obtained logically. The convergence is slower as the values of these constants $\eta$ and $\alpha$ become smaller, and an oscillation tends to occur when the values of these constants $\eta$ and $\alpha$ are large. Generally, the constants $\eta$ and $\alpha$ are in the order of "1".

The neural network learns in the above described manner, and an input is thereafter applied again to the neural network to calculate an output and learn. By repeating such an operation, the weight function $T_{ij}$ is determined such that a desirable resulting output is obtained for a given input.

When an attempt is made to realize the above described learning function, it is extremely difficult to realize the learning function by a hardware structure since the learning involves many calculations with the four fundamental rules of arithmetics.

On the other hand, a neural network realized by digital circuits has been proposed in Hirai et al., "Design of Completely Digital Neuro-Chip", Electronic Information and Communication Society, ICD-88-130, Dec. 16, 1988.

FIG. 5 shows a circuit construction of a single neuron. In FIG. 5, each synapse circuit 6 is coupled to a cell circuit 8 via a dendrite circuit 8.

FIG. 6 shows an example of the synapse circuit 6. In FIG. 6, a coefficient multiplier circuit 9 multiplies a coefficient a to an input pulse f, where the coefficient a is "1" or "2" depending on the amplification of a feedback signal. A rate multiplier 10 receives an output of the coefficient multiplier circuit 9. A synapse weighting register 11 which stores a weight function w is connected to the rate multiplier 10.

FIG. 7 shows an example of the cell circuit 8. In FIG. 7, a control circuit 12, an up/down counter 13, a rate multiplier 14 and a gate 15 are successively connected in series. In addition, an up/down memory 16 is connected as shown.

In this proposed neural network, the input and output of the neuron circuit is described by a pulse train, and the signal quantity is described by the pulse density of the pulse train. The weight function is described by a binary number and stored in the memory 16. The input signal is applied to the rate multiplier 14 as the clock and the weight function is applied to the rate multiplier 14 as the rate value, so that the pulse density of the input signal is reduced depending on the rate value. This corresponds to the term $T_{ij} y_i$ of the back propagation model. The portion which corresponds to $\Sigma$ of $\Sigma T_{ij} y_i$ is realized by an OR circuit which is indicated by the dendrite circuit 7.

Because the coupling may be excitatory or inhibitory, the circuit is divided into an excitatory group and an inhibitory group and an OR operation is carried out independently for the excitatory and inhibitory groups. Outputs of the excitatory and inhibitory groups are respectively applied to up-count and down-count terminals of the counter 13 and counted in the counter 13 which produces a binary output. The binary output of the counter 13 is again converted into a corresponding pulse density by use of the rate multiplier 14.

A plurality of the neurons described above are connected to form a neural network. The learning of this neural network is realized in the following manner. That is, the final output of the neural network is input to an external computer, a numerical calculation is carried out within the external computer, and a result of the numerical calculation is written into the memory 16 which stores the weight function. Accordingly, this neural network does not have the self-learning function. In addition, the circuit construction of this neural network is complex because a pulse density of a signal is once converted into a numerical value by use of a counter and the numerical value is again converted back into a pulse density.

Therefore, the conventional neural network or neural network suffer from the problem in that the self-learning function cannot be realized by hardware.

Furthermore, the analog circuits do not provide stable operations, and the learning method using numerical calculation is extremely complex and is unsuited to be realized by hardware. On the other hand, the circuit construction of the digital circuits which provide stable operations is complex.

SUMMARY OF THE INVENTION

Accordingly, it is a general object of the present invention to provide a novel and useful neuron unit, neural network and signal processing method, in which the problems described above are eliminated.

Another and more specific object of the present invention is to provide a neuron unit for processing a plurality of input signals and for outputting an output signal which is indicative of a result of the processing, the neuron unit comprising input line means for receiving the input signals, forward process means coupled to the input line means and including supplying means for supplying weight functions, and operation means for carrying out an operation on each of the input signals using one of the weight functions and for outputting the output signal, and self-learning means coupled to the forward process means and including generating means for generating new weight functions based on errors between the output signal of the forward process means and teaching signals, and varying means for varying the weight functions supplied by the supplying means of the forward process means to the new weight functions generated by the generating means. According to the neuron unit of the present invention, it is possible to realize the functions of a neuron including the self-learning function.

Still another object of the present invention is to provide the neuron unit described above wherein the supplying means and the operation means of the forward process means are made up of analog circuits.

A further object of the present invention is to provide the neuron unit described above wherein the supplying means and the operation means of the forward process means are made up of digital circuits.

Another object of the present invention is to provide the neuron unit described above wherein the input line means includes a plurality of first input lines for receiving first binary input signals which undergo transitions with time and a plurality of second input lines for receiving second binary input signals which undergo transitions with time, the supplying means includes first and second memory means for storing the weight functions, and the operation means includes first gate means for successively obtaining a logical product of one of the first binary input signals received from the first input lines and a corresponding one of the weight functions read out from the first memory means for each of the first binary input signals, second gate means for successively obtaining a logical product of one of the second binary input signals received from the second input lines and a corresponding one of the weight functions read out from the second memory means for each of the second binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, the gate outputting the output signal of the neuron unit.

Still another object of the present invention is to provide the neuron unit described above wherein the input line means includes a plurality of input lines for receiving binary input signals which undergo transitions with time, the supplying means includes memory means for storing the weight functions and corresponding grouping information, the grouping information indicating one of excitatory and inhibitory groups to which the weight functions belong, and the operation means includes first gate means for successively obtaining a logical product of one of the binary input signals received from the input lines and a corresponding one of the weight functions read out from the memory means for each of the binary input signals, second gate means for obtaining a logical product of one of the grouping information read out from the memory means and a corresponding one of logical products output from the first gate means for each of the logical products output from the first gate means, third gate means for obtaining a logical product of an inversion of one of the grouping information read out from the memory means and a corresponding one of the logical products output from the first gate means for each of the logical products output from the first gate means, fourth gate,means for obtaining a logical sum of logical products output from the second gate means, fifth gate means for obtaining a logical sum of logical products output from the third gate means, and output means including an inverter for inverting the logical sum output from the fifth gate means and a gate for obtaining one of a logical product and a logical sum of the logical sum output from the fourth gate means and an inverted logical sum output from the inverter, the gate outputting the output signal of the neuron unit.

A further object of the present invention is to provide the neuron unit described above wherein the input line means includes a plurality of input lines for receiving binary input signals which undergo transitions with time, the supplying means includes first and second memory means for storing the weight functions, and the operation means includes first gate means for successively obtaining a logical product of one of the binary input signals received from the input lines and a corresponding one of the weight functions read out from the first memory means for each of the binary input signals, second gate means for successively obtaining a logical product of one of the binary input signals received from the input lines and a corresponding one of the weight functions read out from the second memory means for each of the binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, the gate outputting an output signal of the neuron unit.

Another object of the present invention is to provide the neuron unit described above wherein the generating means of the self-learning means generates the new weight functions based on the errors and a learning constant.

Still another object of the present invention is to provide the neuron unit described above which further comprises means for arbitrarily setting the learning constant from outside the neuron unit.

A further object of the present invention is to provide the neuron unit described above which further comprises switching means for switching a mode of the neuron unit between first and second modes, the varying means of the self-learning means being enabled in the first mode to thereby renew the weight functions, the varying means of the self-learning means being disabled in the second mode to thereby fix the weight functions.

Another object of the present invention is to provide the neuron unit described above wherein the supplying means of the forward process means includes memory means for storing the weight functions, and the neuron unit further comprises means for making access to the memory means, so that the weight functions can be written into and read out from the memory means from outside the neuron unit.

Still another object of the present invention is to provide the neuron unit described above which further comprises first memory means for storing the input signals, second memory means for storing the teaching signals, and control means for controlling the first and second memory means to supply the stored input signals to the forward process means and the teaching signals to the self-learning means.

A further object of the present invention is to provide the neuron unit described above wherein the supplying means of the forward process means includes memory means for storing the weight functions, and the neuron unit further comprises setting means for variably setting a data length of the weight functions in the memory means.

Another object of the present invention is to provide the neuron unit described above which further comprises first converter means for converting analog input signals into digital input signals which are supplied to the forward process means as the input signals, and second converter means for converting the output signal of the neuron unit into an analog signal.

Still another object of the present invention is to provide the neuron unit described above which further comprises switching means for switching at least one of the input signals to the forward process means and the output signal of the self-learning means in response to a plurality of external signals.

A further object of the present invention is to provide the neuron unit described above wherein the operation means of the forward process means includes first means for successively carrying out an operation on the input signals in groups of the input signals, second means for successively storing results of operations for the groups, and third means for carrying out an operation on the results of operations simultaneously read out from the second means.

Another object of the present invention is to provide the neuron unit described above wherein the operation means of the forward process means includes first means for successively carrying out an operation on the input signals in groups of the input signals, second means for successively storing results of operations for the groups, third means for carrying out an operation the input signals in a first mode and for carrying out an operation on the results of operations simultaneously read out from the second means in a second mode, and fourth means for setting a mode of the third means to one of the first and second modes.

Still another object of the present invention is to provide the neuron unit described above wherein operations of the forward process means and the self-learning means are carried out on a computer.

A further object of the present invention is to provide the neuron unit described above wherein operations of the forward process means are carried out by hardware, and operations of the self-learning means are carried out on a computer.

Another object of the present invention is to provide a neural network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure, each of the neuron units simultaneously processing a plurality of binary input signals and outputting an output signal which is indicative of a result of the processing, the neuron unit comprising input line means for receiving the input signals, forward process means coupled to the input line means and including supplying means for supplying weight functions, and operation means for carrying out an operation on each of the input signals using one of the weight functions and for outputting the output signal, and self-learning means coupled to the forward process means and including generating means for generating new weight functions based on errors between the output signal of the forward process means and teaching signals, and varying means for varying the weight functions supplied by the supplying means of the forward process means to the new weight functions generated by the generating means.

Still another object of the present invention is to provide the neural network described above wherein the operation means of the forward process means includes first means for successively carrying out an operation on the input signals in groups of the input signals, second means for successively storing results of operations for the groups, and third means for carrying out an operation on the results of operations simultaneously read out from the second means.

A further object of the present invention is to provide the neural network described above wherein the operation means of the forward process means includes first means for successively carrying out an operation on the input signals in groups of the input signals, second means for successively storing results of operations for the groups, third means for carrying out an operation the input signals in a first mode and for carrying out an operation on the results of operations simultaneously read out from the second means in a second mode, and fourth means for setting a mode of the third means to one of the first and second modes.

Another object of the present invention is to provide a signal processing system comprising N neural networks which are coupled to carry out a signal processing on a plurality of input signals respectively having N bits, where N is an integer, the N neural networks receiving corresponding bits of the input signals, each of the N neuron units comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure, each of the neuron units simultaneously processing a plurality of binary input signals and outputting an output signal which is indicative of a result of the processing, the neuron unit comprising input line means for receiving the input signals, forward process means coupled to the input line means and including supplying means for supplying weight functions, and operation means for carrying out an operation on each of the input signals using one of the weight functions and for outputting the output signal, and self-learning means coupled to the forward process means and including generating means for generating new weight functions based on errors between the output signal of the forward process means and teaching signals, and varying means for varying the weight functions supplied by the supplying means of the forward process means to the new weight functions generated by the generating means.

Still another object of the present invention is to provide a signal processing method for processing a plurality of input signals in a neuron unit and for outputting an output signal which is indicative of a result of the processing, the signal processing method comprising the steps of writing weight functions in memory means of the neuron unit from outside the neuron unit, forward process including carrying out an operation on each of the input signals using one of weight functions stored in the memory means and for outputting an operation result as the output signal, and self-learning process including generating new weight functions based on errors between the output signal obtained by the forward process and teaching signals, and varying the weight functions used by the forward process to the new weight functions which are generated by renewing contents of the memory means.

A further object of the present invention is to provide a signal processing method for processing a plurality of input signals in a neuron unit and for outputting an output signal which is indicative of a result of the processing, the signal processing method comprising the steps of writing weight functions in memory means of the neuron unit from outside the neuron unit, forward process including carrying out an operation on each of the input signals using one of weight functions stored in the memory means and for outputting an operation result as the output signal, self-learning process including generating new weight functions based on errors between the output signal obtained by the forward process and teaching signals, and varying the weight functions used by the forward process to the new weight functions which are generated by renewing contents of the memory means, and reading the weight functions stored in the memory means from outside the neuron unit.

Another object of the present invention is to provide a signal processing method for processing a plurality of input signals in a neuron unit and for outputting an output signal which is indicative of a result of the processing, the signal processing method comprising the steps of storing input signal data of the input signals in first memory means and storing teaching signal data of teaching signals in second memory means, forward process including carrying out an operation on each of the input signals using one of weight functions and for outputting an operation result as the output signal, and self-learning process including generating new weight functions based on errors between the output signal obtained by the forward process and the teaching signals, and varying the weight functions used by the forward process to the new weight functions which are generated.

Still another object of the present invention is to provide a computer-implemented method of simulating a neuron unit for processing a plurality of input signals and for outputting an output signal which is indicative of a result of the processing, the computer-implemented method comprising receiving the input signals, carrying out a forward process including supplying weight functions and carrying out an operation on each of the input signals using one of the weight functions and for outputting an operation result as the output signal, and carrying out a self-learning process including generating new weight functions based on errors between the output signal and teaching signals, and varying the weight functions to the new weight functions which are generated.

A further object of the present invention is to provide a computer-implemented method of simulating a self-learning process of a neuron unit which processes a plurality of input signals and outputs an output signal which is indicative of a result of the processing, the neuron unit including input line means for receiving the input signals and forward process means including supplying means for supplying weight functions and operation means for carrying out an operation on each of the input signals using one of the weight functions supplied by the supplying means and for outputting the output signal, the computer-implemented method comprising the step of generating new weight functions based on errors between the output signal output from the forward process means and teaching signals, and varying the weight functions supplied by the supplying means of the forward process means to the new weight functions which are generated, Other objects and further features of the present invention will be apparent from the following detailed description when read in conjunction with the accompanying drawings.

BRIEF DESCRIPTION OF THE DRAWINGS

FIG. 3 is a-graph showing a sigmoid function;

FIG. 4 is a circuit diagram showing a neural network proposed in a Japanese Laid-Open Patent Application No, 62-295188;

FIG. 23 is a diagram for explaining a logical product of the input signal and the weight function;

FIG. 24 is a diagram for explaining an output of the second embodiment;

FIGS. 28 and 29 respectively are diagrams for explaining positive and negative error signals in the case of an excitatory coupling;

FIGS. 30 and 31 respectively are diagrams for explaining positive and negative error signals in the case of an inhibitory coupling;

FIGS. 34 and 35 respectively are diagrams for explaining a method of varying the weight function;

FIGS. 36 and 37 respectively are diagrams for explaining a method of obtaining a new weight function for excitatory and inhibitory original weight function;

FIG. 10 is a circuit diagram showing a circuit for obtaining an error signal in a final layer of the neural network based on an output of the final layer and a teaching signal;

FIGS. 56A through 56C respectively are circuit diagrams showing another essential part of the ninth embodiment of the present invention for explaining a digital-to-analog conversion;

FIG. 58 is a system block diagram for explaining the functions of two neuron units;

DESCRIPTION OF THE PREFERRED EMBODIMENTS

A description will be given of a first embodiment of a neuron unit according to the present invention.

In this embodiment, the neuron unit has the self-learning function. Hence, the weight function must be made variable so as to enable the self-learning.

Figure 8:
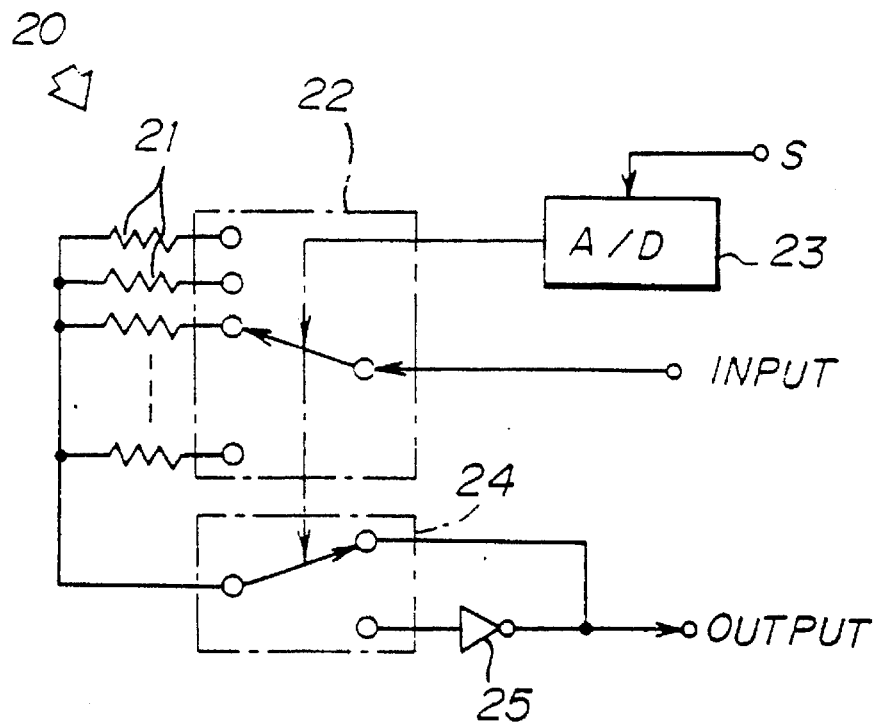
FIG. 8 is a circuit diagram showing a weight function varying circuit of a first embodiment of a neuron unit according to the present invention.

FIG. 8 shows the circuit construction of a weight function varying circuit 20 for varying the weight function. The weight function varying circuit 20 includes a plurality of resistors 21 which describe the weight function, and the weight function is made variable by appropriately switching a switching circuit 22 so as to connect to the resistor 21 which is to be used. The switching circuit 22 may be realized by a generally available switch which is switched and controlled responsive to a binary input from an external controller (not shown). In the case shown in FIG. 8, an analog-to-digital (A/D) converter 23 is used to convert a voltage S from the external controller into a binary value, and this binary value is used to control the switching of the switching circuit 22. In addition, a sign bit of the A/D converter 23 is used to control the switching of a switching circuit 24. The switching circuit 24 determines whether or not an output is to be obtained via an inverting amplifier 25 responsive to the sign bit, so as to switch the output between an excitatory output and an inhibitory output. Accordingly, the weight function is variable depending on the voltage (external signal) S, and it is possible to obtain an output by multiplying the weight function having an arbitrary value to an input signal.

Figure 9:
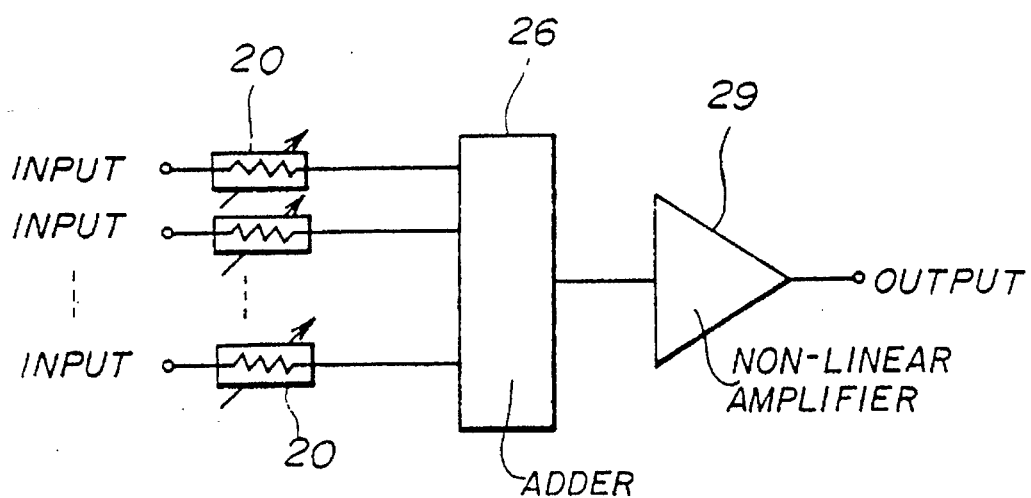
FIG. 9 is a circuit diagram showing a coefficient multiplier circuit which uses the weight function varying circuit shown in FIG. 8.
Figure 7:
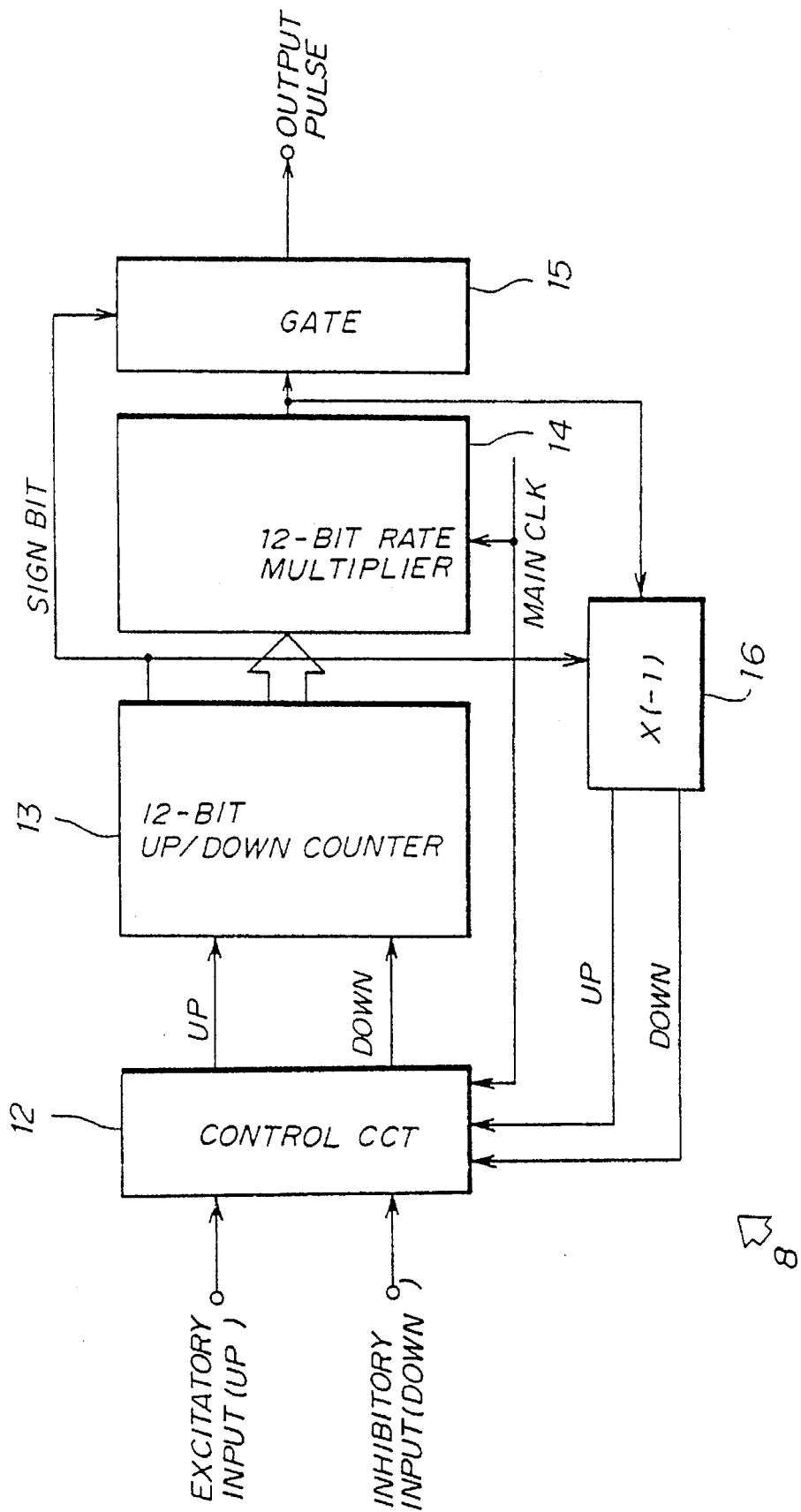
FIG. 7 is a system block diagram showing a cell circuit shown in FIG. 5.

FIG. 9 shows a coefficient multiplier circuit for describing the equations (1) and (2) using the weight function varying circuit 20 shown in FIG. 8. Each weight function varying circuit 20 has the function of multiplying the weight function to an input signal from an immediately preceding layer. Outputs of the weight function varying circuits 20 are added in an adder circuit 26.

Figure 10:
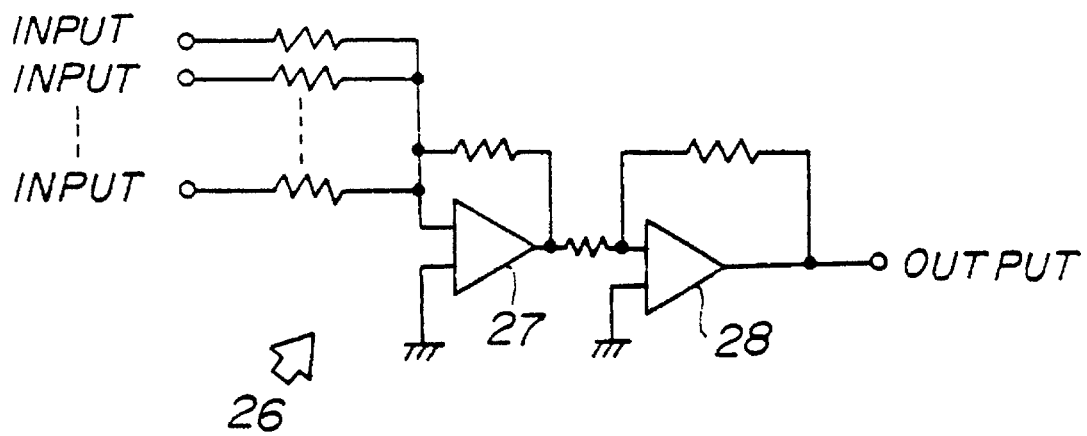
FIG. 10 a circuit diagram showing an adder circuit shown in FIG. 9.

The adder circuit 26 may be easily realized by use of a generally available operational amplifier 27 as shown in FIG. 10. In FIG. 10, the operational amplifier 27 is for adding but has the inverting amplifier structure. Hence, an amplifier 28 is used to further invert an output of the operational amplifier 27 to obtain an output of the adder circuit 26.

A non-linear amplifier 29 is connected to an output of the adder circuit 26 as shown in FIG. 9. The input and output of this amplifier 29 have a relationship described by the equation (2). The input to the amplifier 29 corresponds to the internal potential of the equation (1).

Figure 11:
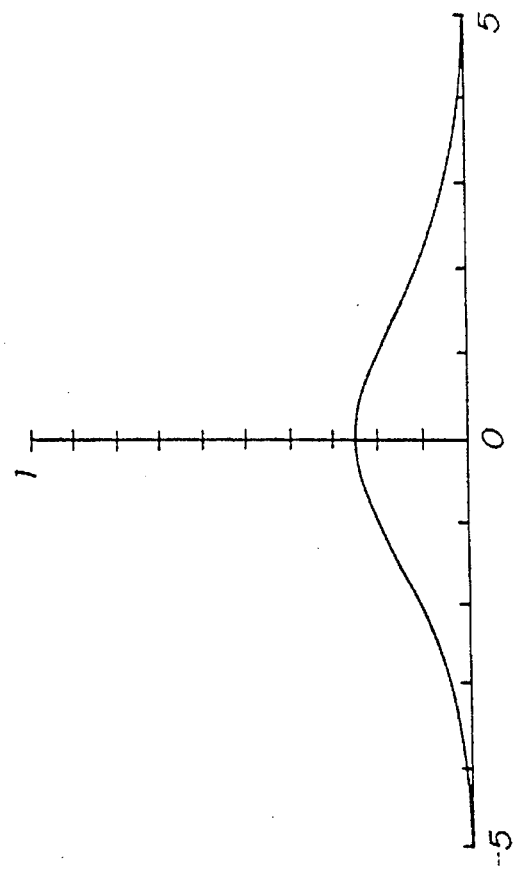
FIG. 11 is a graph showing a characteristic of a first order differential function f'.
Figure 12:
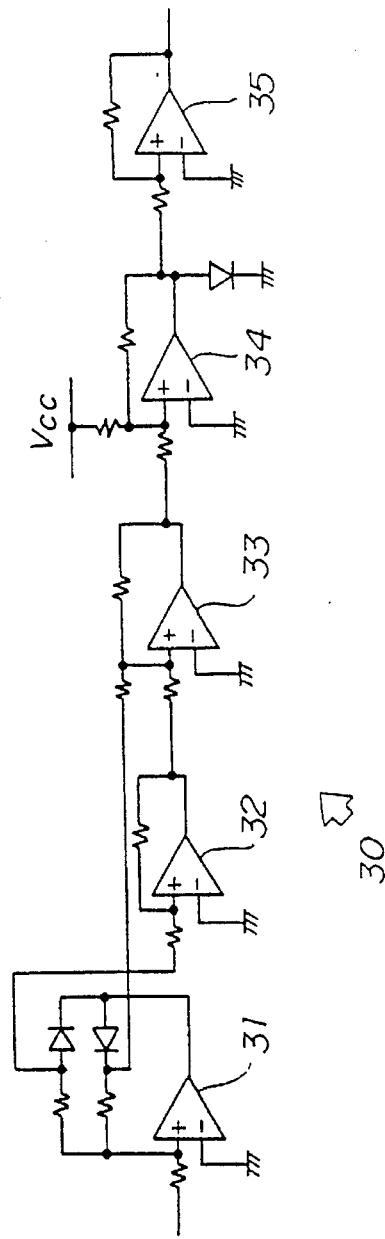
FIG. 12 is a circuit diagram showing an f' signal generating circuit 30.
Figure 13:
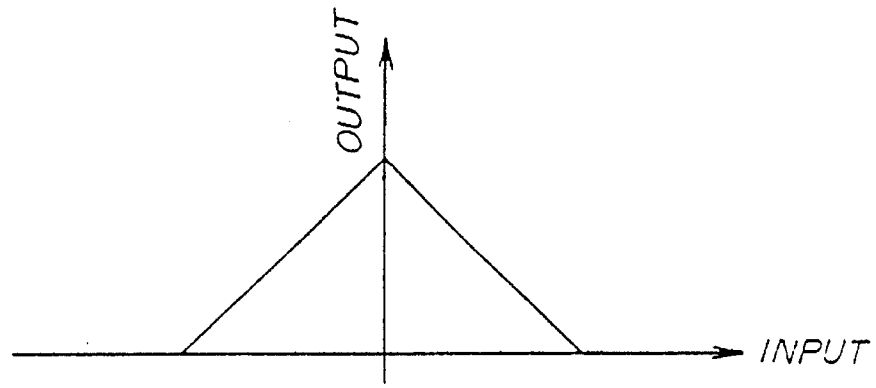
FIG. 13 shows an input versus output characteristic of the f' signal generating circuit shown in FIG. 12.
Figure 14:
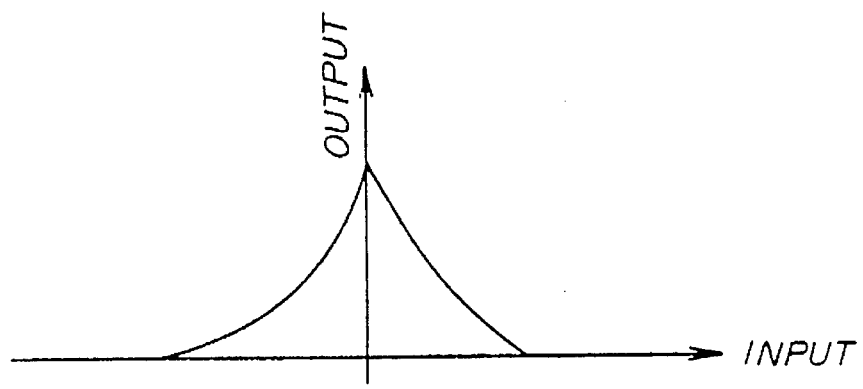
FIG. 14 shows an input versus output characteristic of the f' signal generating circuit when an amplifier having a non-linear input versus output characteristic is provided at an input stage.

Next, a description will be given of a method of forming the external signal S which determines the weight function. This method corresponds to the equations (5) through (7), and circuits are necessary to realize these equations (5) through (7). In the equations (5) and (6), f' is the first order differential function of the sigmoid function shown in FIG. 3 and has a characteristic shown in FIG. 11. An f' signal generating circuit 30 shown in FIG. 12 realizes the first order differential function f'. As shown in FIG. 12, a plurality of amplifiers 31 through 35 are connected in a plurality of stages so that the f' signal generating circuit 30 might have a non-linear characteristic shown in FIG. 11. This f' signal generating circuit 30 has an input versus output characteristic shown in FIG. 13. The f' signal generating circuit 30 does not always accurately realize the characteristic shown in FIG. 11, however, the characteristic can be approximated. In addition, when an amplifier (not shown) having a non-linear input versus output characteristic shown in FIG. 14 is provided at an input stage of the f' signal generating circuit 30, the input versus output characteristic of the f' signal generating circuit 30 becomes as shown in FIG. 14, and the characteristic shown in FIG. 11 can be more closely approximated.

Figure 15:
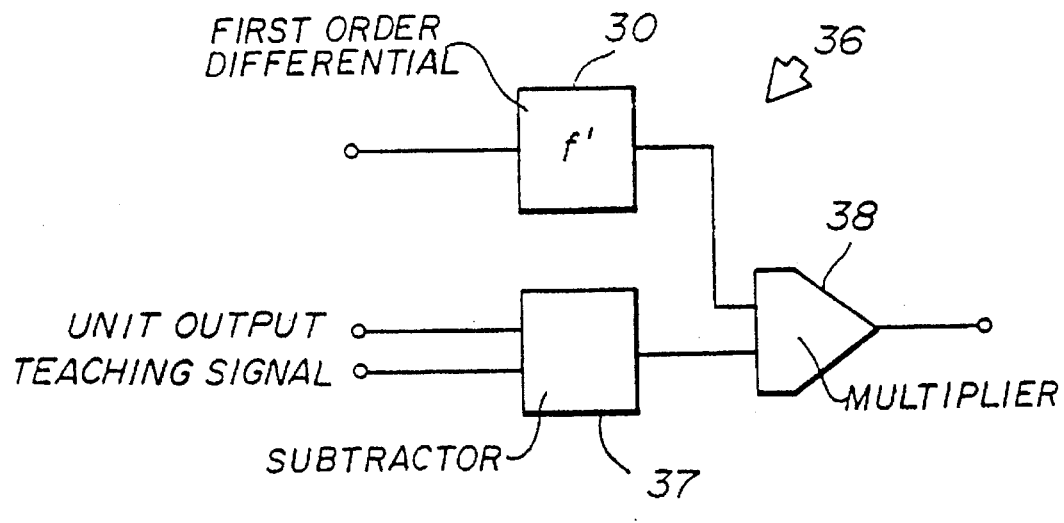
FIG. 15 is a system block diagram showing an error signal generating circuit corresponding to the equation (5)

FIG. 15 shows an error signal generating circuit 36 which corresponds to the equation (5). In FIG. 15, the f' signal generating circuit 30 is the same as that shown in FIG. 12, and subjects the internal potential (that is, the input to the amplifier 29 shown in FIG. 9) to the function processing shown in FIG. 13 or 14. On the other hand, a subtracting circuit 37 is provided to obtain an error between an output of the neuron unit in the output layer and a teaching signal. A circuit similar to that shown in FIG. 10 may be used by inverting one input in an amplifier. Outputs of these circuits 30 and 37 are supplied to a multiplier circuit 38 which obtains a product of the two outputs and obtains a result similar to the equation (5).

Figure 16:
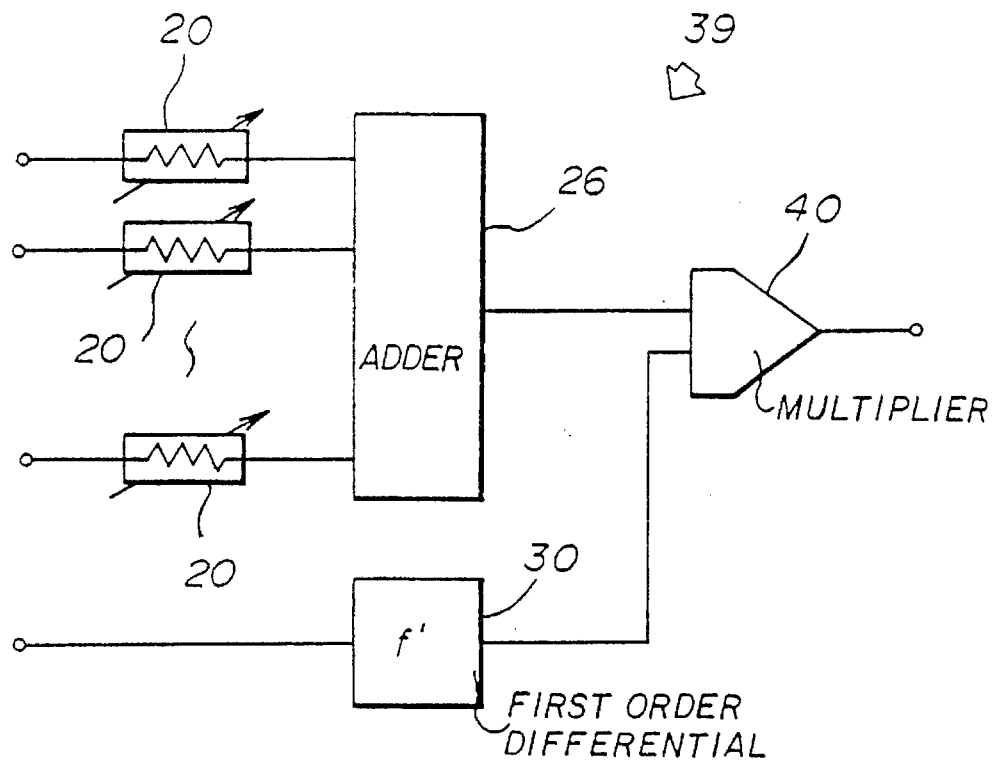
FIG. 16 is a system block diagram showing an error signal generating circuit corresponding to the equation (6)

On the other hand, FIG. 16 shows an error signal generating circuit 39 corresponding to the equation (6). In FIG. 16, the error signal generating circuit 39 includes the weight function varying circuits 20, the adder circuit 26, the f' signal generating circuit 30 and a multiplier circuit 40 which obtains a product of the outputs of the circuits 26 and 30. This circuit construction is equivalent to the equation (6). Accordingly, by inputting the internal potential and the error signal which is generated by the circuit 39 shown in FIG. 16 in another layer or by the circuit 36, it is possible to finally obtain an output which is similar to that obtained by the equation (6).

Figure 17:
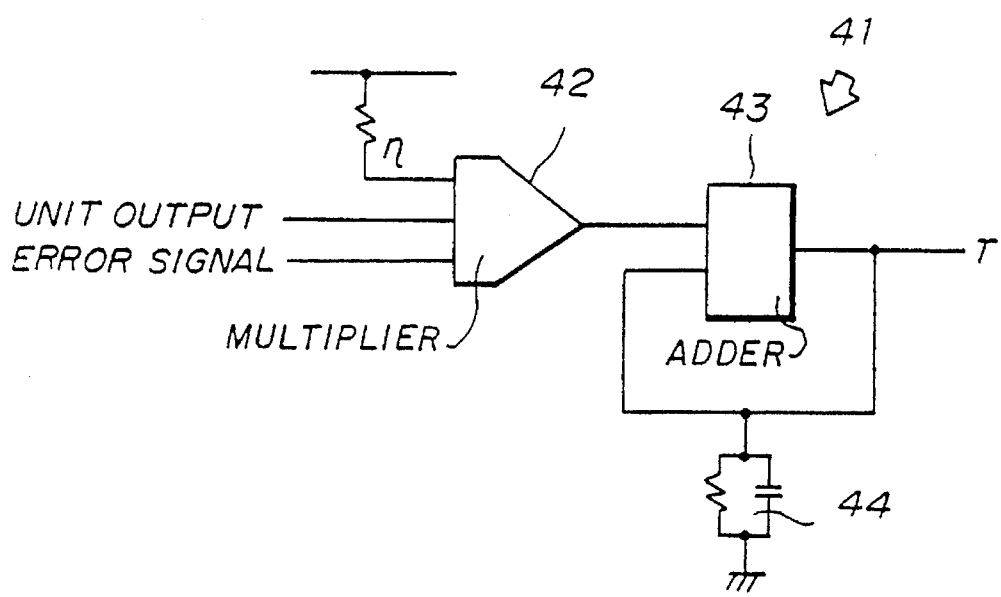
FIG. 17 is a system block diagram showing a weight function generating circuit corresponding to the equation (7)

FIG. 17 shows a weight function generating circuit 41 corresponding to the equation (6). The weight function generating circuit 41 includes a multiplier circuit 42 which may be realized by a generally available multiplier. The multiplier circuit 42 obtains a product of an output of a neuron unit of one layer, the error signal generated in the circuit described above, and a constant η. An output of the multiplier circuit 42 is supplied to an adder circuit 43, and a new T is generated from T and ΔT using a delay circuit 44. Hence, an output of the adder circuit 43 corresponds to the output obtained by the equation (7).

Figure 18:
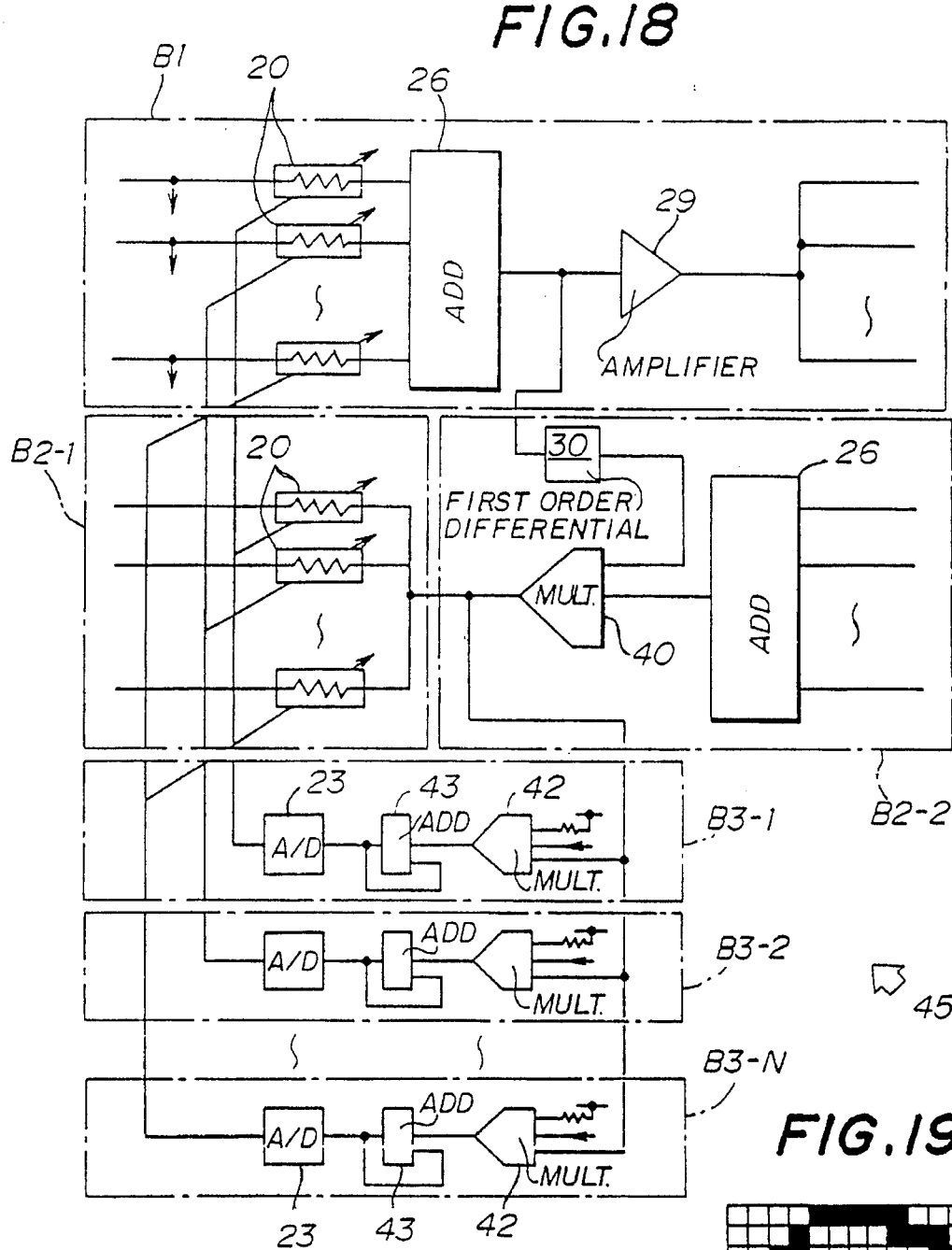
FIG. 18 is a system block diagram showing the first embodiment of the neuron unit according to the present invention.

FIG. 18 shows the first embodiment of the neuron unit which is formed from the circuits described above. In a neural network, a neuron unit 45 shown in FIG. 18 corresponds to a part surrounded by a dashed line in FIG. 2, for example.

In FIG. 18, a block B1 corresponds to the circuit shown in FIG. 9, and an output of this block B1 is supplied to each neuron unit of the next layer. A block B2 corresponds to the error signal generating circuit 39 shown in FIG. 16. That is, the block B2-1 of the next layer and the block B2-2 of the neuron unit 45 correspond to the circuit shown in FIG. 16. Similarly, the block B2-1 of the neuron unit 45 and the block B2-2 of the preceding layer correspond to the circuit shown in FIG. 16. Since the neural network as a whole has the multi-layer structure as shown in FIG. 2, the block of the error signal generating circuit 39 can be divided into two at the center to realize an equivalent circuit from two circuit parts.

Blocks B3-1, B3-2, . . . , B3-N shown in FIG. 18 each correspond to the weighing coefficient generating circuit 41 shown in FIG. 17 and the A/D converter 23 shown in FIG. 8. In FIG. 18, however, the illustration of the delay circuit 44 is omitted for the sake of convenience. The weight functions T which are newly obtained in the blocks B3-1, B3-2, . . . , B3-N are used, and each weight function T is varied in the weight function varying circuit 20 shown in FIG. 8. Since the same weight function is used at two locations which are the blocks B1 and B2-1, the two are linked and varied. In other words, the blocks B2-1 and B3 and the weight function varying circuit 20 within the block B1 in FIG. 18 correspond to a self-learning circuit, while the remaining part of the block B1 and the block B2-2 correspond to a neuron circuit which resembles a neuron.

Figure 1:
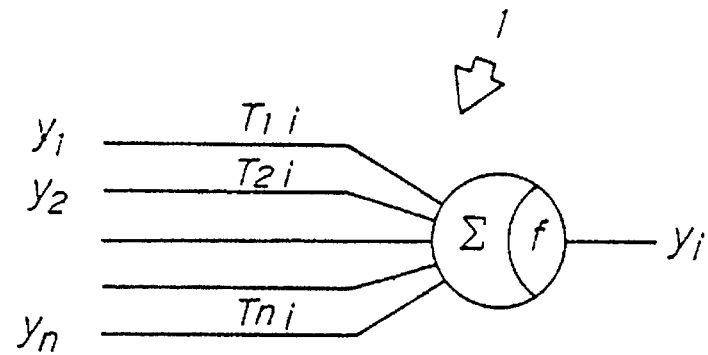
FIG. 1 shows an example of a conventional neuron unit.
Figure 2:
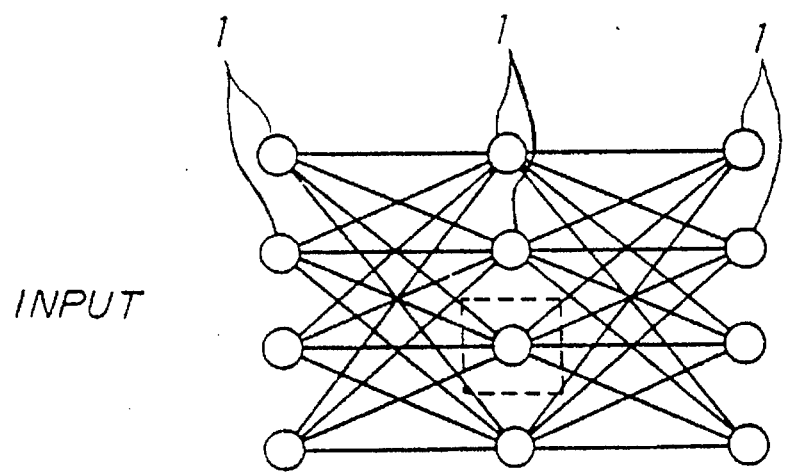
FIG. 2 shows a conventional neural network.
Figure 5:
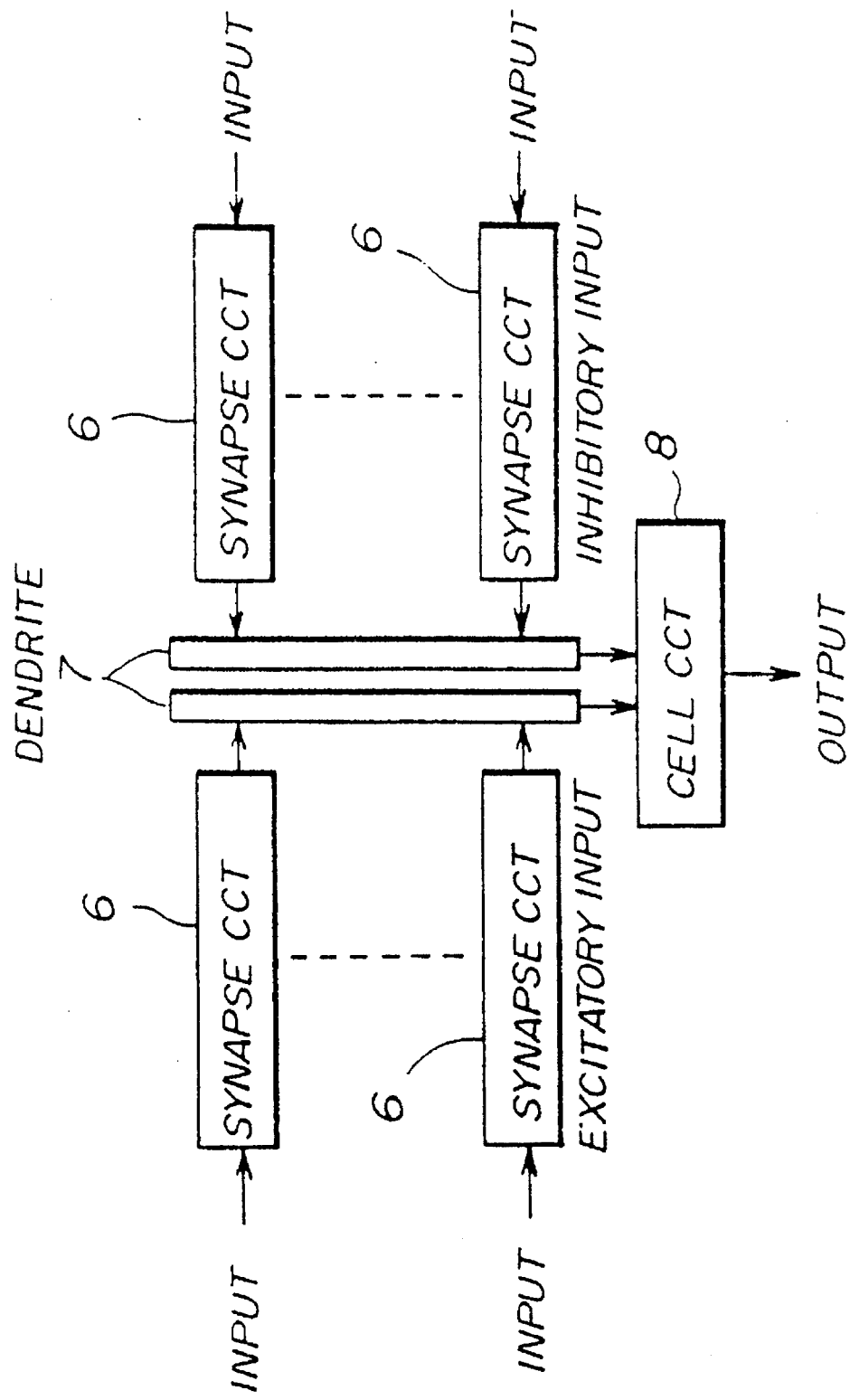
FIG. 5 is a system block diagram showing an example of a conventional neuron using digital circuits.
Figure 6:
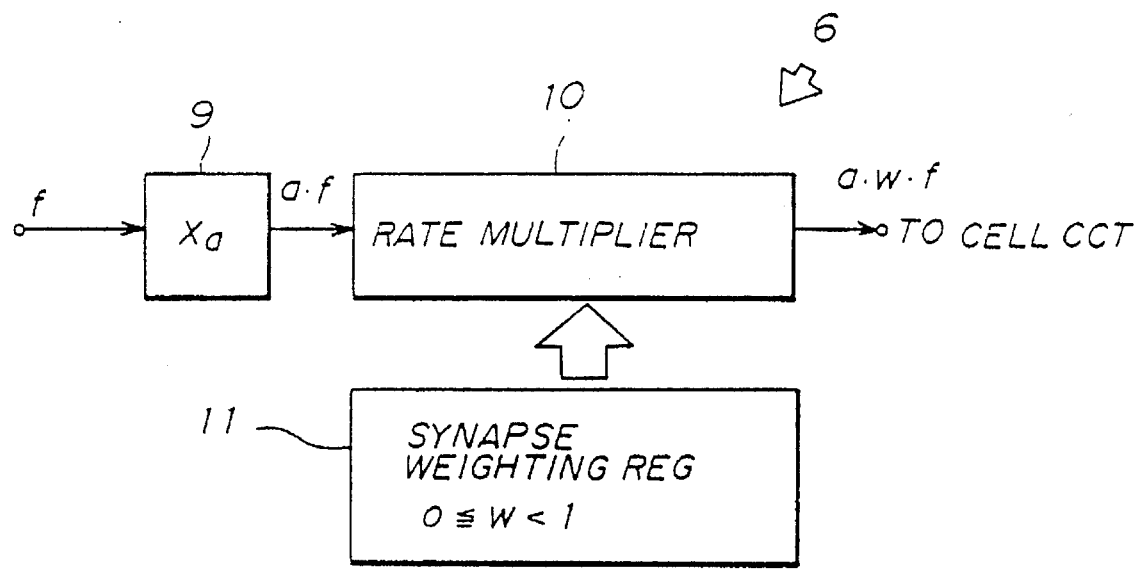
FIG. 6 is a system block diagram showing a synapse circuit shown in FIG. 5.

A plurality of the neuron units 45 having the structure shown in FIG. 18 are connected to form a network similar to that shown in FIG. 2. The neural network is realized by adding the error signal generating circuit 36 shown in FIG. 15, for example, at the output part of the final output layer.

A particular case will be described for the circuit construction described above. First, the adder circuit and the like of each block are all made of generally available operational amplifiers, and a plurality of 256-input and 256-output neuron units 45 having the structure shown in FIG. 18 and a plurality of weight function generating circuits 41 shown in FIG. 17 are formed. Next, the input and output lines of the neuron units 45 and the weight function generating circuits 41 are connected to form a neural network having three layers. In the neural network, a first layer includes 256 neuron units 45, a second layer includes four neuron units 45, and a third layer includes five neuron units 45. In addition, an output of the third layer is connected to the error signal generating circuit 36 shown in FIG. 15. When an input is applied to each neuron unit 45 of the first layer in the neural network, the resulting output is not necessarily a desirable value. However, because this neuron unit network has the self-learning circuit, the resulting output eventually becomes the desirable value, that is, the teaching signal.

Figure 19:
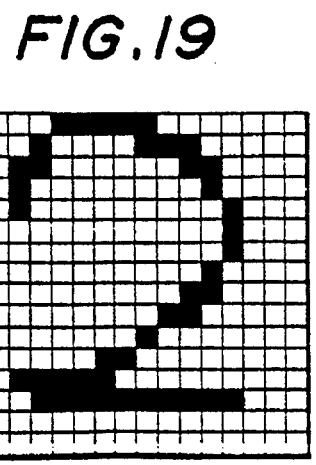
FIG. 19 is a diagram showing a hand-written character which is read on a scanner for explaining an application of the first embodiment to a self-learning type character recognition system.

A description will be given of a case where the above described neural network is applied to a self-learning type character recognition system. First, a hand-written character shown in FIG. 19 is read by a scanner, and the read image is divided into 16×16 meshes. The data in each mesh is then applied to each neuron unit 45 of the first layer in the neural network. For the sake of convenience, the data of a mesh which includes a portion of the character is taken as 1 V, while the data of a mesh which includes no portion of the character is taken as 0 V. The output of the neural network is connected to a voltmeter so that the resulting output is directly displayed on the voltmeter. Out of the five neuron units 45 of the third layer, the neuron unit 45 which outputs the largest output is assumed to output the recognition result. The learning takes place so that when the numbers "1" through "5" are input to the neural network, the five neuron units 45 of the third layer respectively corresponding to the numbers "1" through "5" output the largest output. In other words, when the number "1" is input, the neuron unit 45 of the third layer corresponding to the number "1" outputs the largest output. With respect to a character after sufficient learning, the recognition rate was 100%.

Next, a description will be given of a second embodiment of the neuron unit according to the present invention. In this embodiment, the neuron unit is realized by use of digital circuits according to the following rules [1] through [6].

[1] Input and output signals of the neuron unit, intermediate signals within the neuron unit, the weight function, the teaching signal and the like are all take the form of a pulse train described by binary values "0" and "1".

[2] The signal quantity within the neural network is expressed by the pulse density, that is, the number of "1"s within a predetermined time.

[3] The calculation within the neuron unit is described by a logic operation of pulse trains.

[4] The pulse train expressing the weight function is stored in a memory.

[5] The learning is realized by rewriting the pulse train of the weight function stored in the memory.

[6] When learning, an error is calculated based on a pulse train of the given teaching signal, and the pulse train of the weight function is varied depending on the calculated error. The calculation of the error and the calculation of the deviation of the weight function are carried out by logic operations of pulse trains described by "0"s and "1"s.

Figure 20:
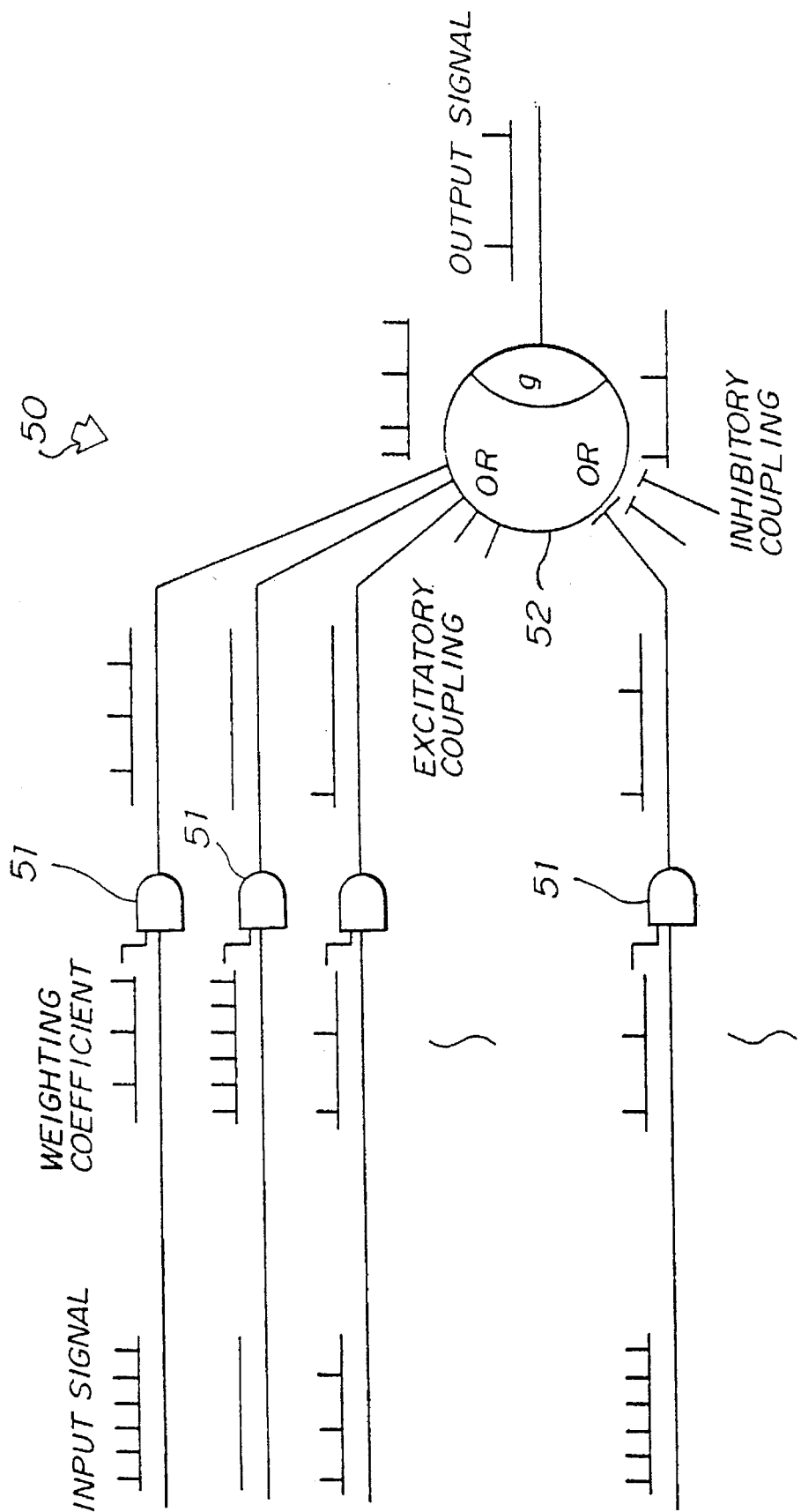
FIG. 20 is a circuit diagram showing a second embodiment of the neuron unit according to the present invention.
Figures 21, 22:
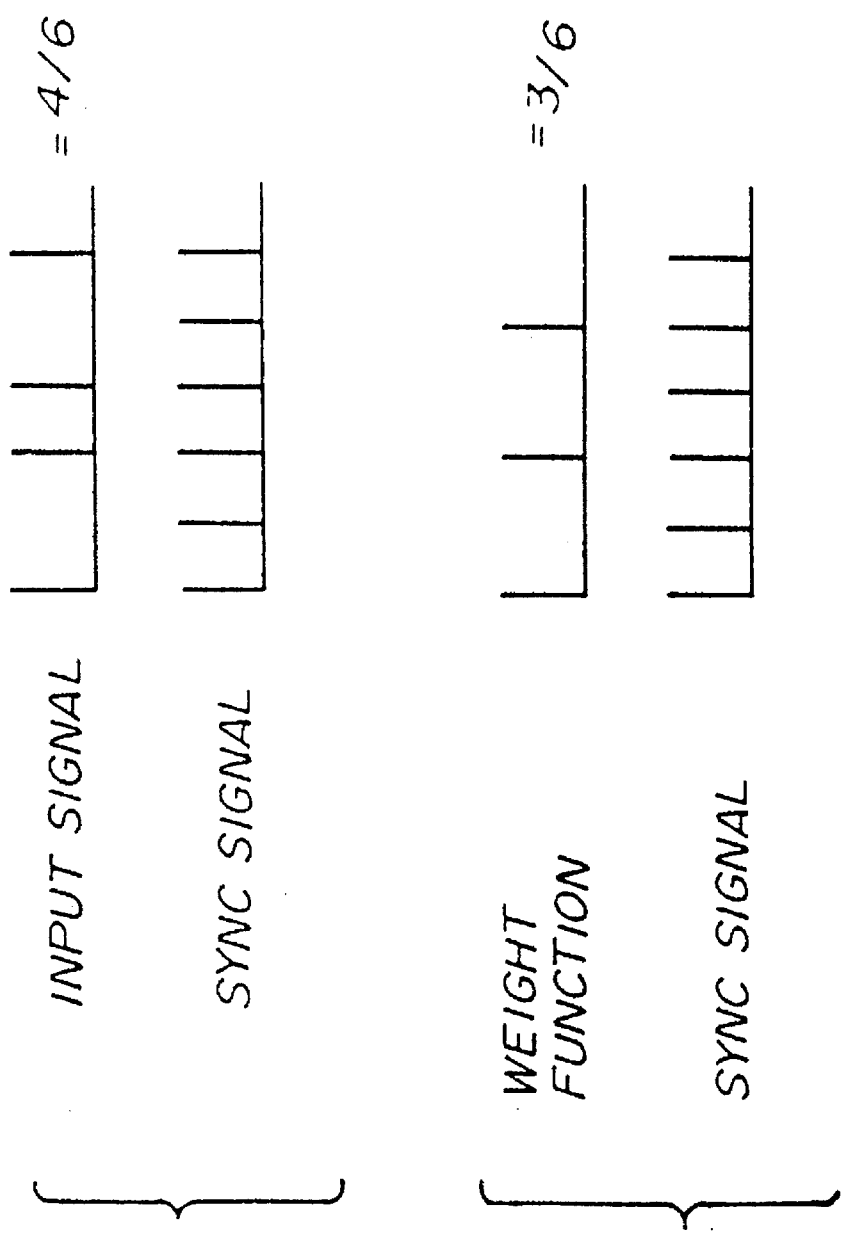
FIG. 21 is a diagram for explaining a pulse train which describes an input signal of the second embodiment.
FIG. 22 is a diagram for explaining a pulse train which describes a weight function of the second embodiment.

FIG. 20 shows a neuron unit 50, and a plurality of such neuron units 50 are connected in a plurality of layers to form a hierarchical neural network shown in FIG. 2, for example. The input and output signals of the neuron unit 50 are all described in binary by "1"s and "0"s and are synchronized. The signal intensity of the input signal $y_i$ is expressed by a pulse density, that is, a number of "1"s existing in a pulse train within a predetermined time. FIG. 21 shows a case where four "1"s and two "0"s of the input signal $y_i$ exist within the predetermined time amounting to six synchronizing pulses. In this case, the input signal $y_i$ has a signal intensity 4/6. It is desirable that the "1"s and "0"s of the input signal $y_i$ are positioned at random within the predetermined time.

On the other hand, the weighting coefficient $T_{ij}$ is similarly described by a pulse density, and is stored in a memory as a pulse train of "0"s and "1"s. FIG. 22 shows a case where three "1"s and three "0"s of the weight function $T_{ij}$ exist within the predetermined time amounting to six synchronizing pulses. In this case, the weight function $T_{ij}$ has a value 3/6. It is desirable that the "1"s and "0"s of the weight function $T_{ij}$ are positioned at random within the predetermined time.

Figures 23, 24:
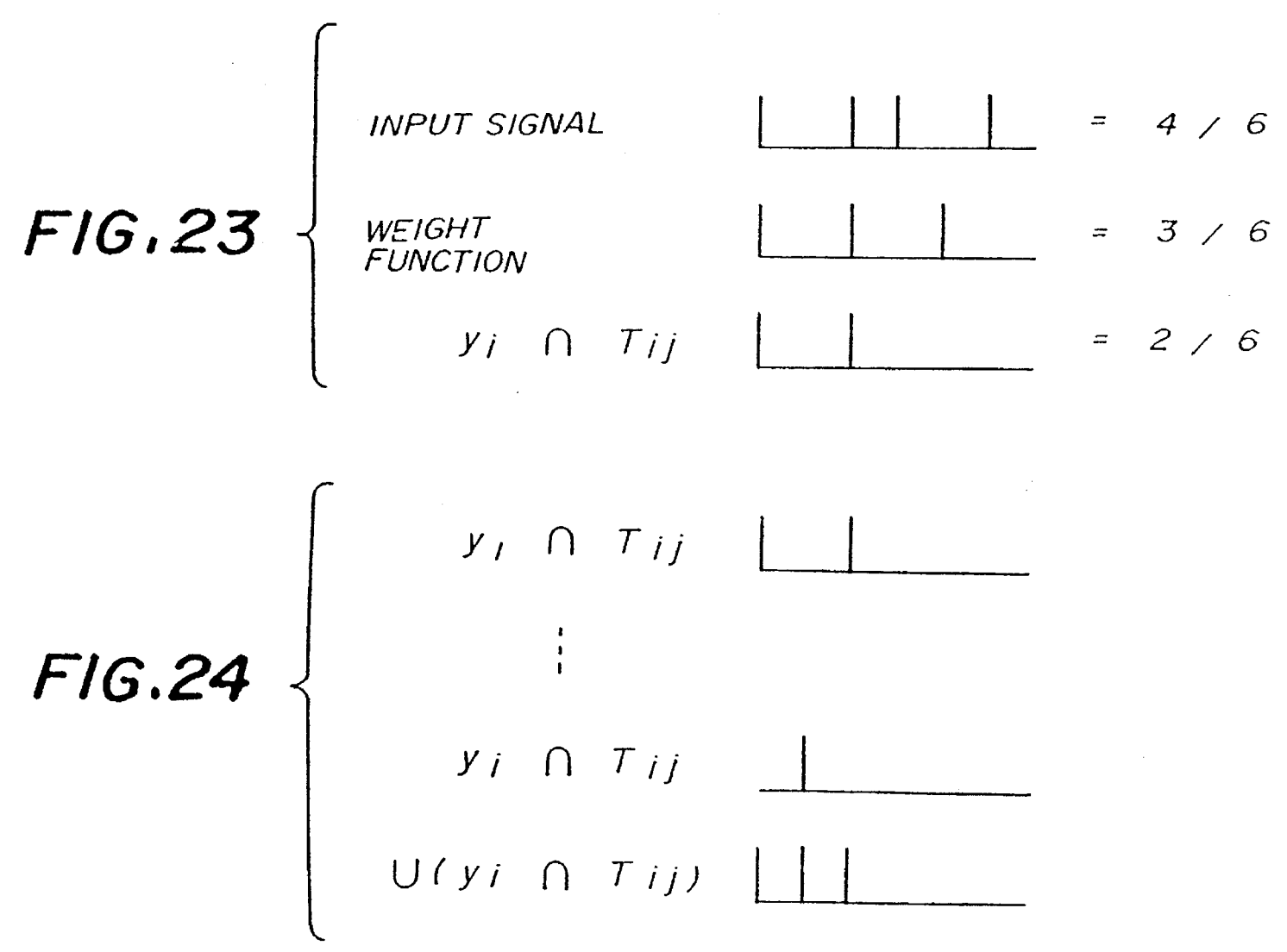

The pulse train of the weight function $T_{ij}$ is successively read from the memory responsive to the synchronizing pulses and supplied to each AND gate 51 shown in FIG. 20 which obtains a logical product $(y_i \cap T_{ij})$ with the pulse train of the input signal $y_i$. An output of the AND gate 51 is used as an input to the neuron unit 50. Hence, in the case described above, the logical product $y_i \cap T_{ij}$ becomes as shown in FIG. 23 and a pulse train "101000" is obtained. It can be seen from FIG. 23 that the input signal $y_i$ is converted by the weight function $T_{ij}$ and the pulse density becomes 2/6.

The pulse density of the output signal of the AND gate 51 is approximately the product of the pulse density of the input signal and the pulse density of the weight function, and the AND gate 51 acts similarly as in the case of the analog circuit. The pulse density of the output signal of the AND gate 51 more closely approximates the above product as the pulse train becomes longer and as the locations of the "1"s and "0"s become more at random. When the pulse train of the weight function is short compared to the pulse train of the input signal and no further data can be read out from the memory, the data can be read out from the first data and repeat such an operation until the pulse train of the input signal ends.

One neuron unit 50 receives a plurality of input signals, and a plurality of logical products are obtained between the input signal and the weight function. Hence, an OR circuit 52 obtains a logical sum of the logical products. Since the input signals are synchronized, the logical sum becomes "111000" when the first logical product is "101000" and the second logical product is "010000" for example FIG. 24 shows the logical products input to the OR circuit 52 and the logical sum $\cup(y_i \cap T_{ij})$ which is output from the OR circuit 52. This corresponds to the calculation of the sum and the non-linear function (sigmoid function) in the case of the analog calculation.

When the pulse densities are low, the logical sum of such pulse densities is approximately the sum of the pulse densities. As the pulse densities become higher, the output of the OR circuit 52 saturates and no longer approximates the sum of the pulse densities, that is, the non-linear characteristic begins to show. In the case of the logical sum, the pulse density will not become greater than "1" and will not become smaller than "0". In addition, the logical sum displays a monotonous increase and is approximately the same as the sigmoid function.

As described above, there are two types of couplings (or weighting), namely, the excitatory coupling and the inhibitory coupling. When making numerical calculations, the excitatory and inhibitory couplings are described by positive and negative signs on the weight function. In the case of the analog neuron unit, when the weight function $T_{ij}$ indicates the inhibitory coupling and the sign on the weight function $T_{ij}$ is negative, an inverting amplifier is used to make an inversion and a coupling to another neuron unit is made via a resistance which corresponds to the weight function $T_{ij}$.

On the other hand, in this embodiment which uses digital circuits, the couplings are leaded into an excitatory group and an inhibitory group depending on the positive and negative signs on the weight function $T_{ij}$. Then, the calculation up to the part where the logical sum of the logical products of the pulse trains of the input signals and the weight functions are carried out for each group. Thereafter, the neuron unit 50 outputs "1" when only the output of the excitatory group is "1" and outputs "0" when only the output of the inhibitory group is "1". When the outputs of the excitatory and inhibitory groups are both "1" or both "0" the neuron unit 50 may output either "1" or "0" or output "1" with a probability of ½.

Figure 25:
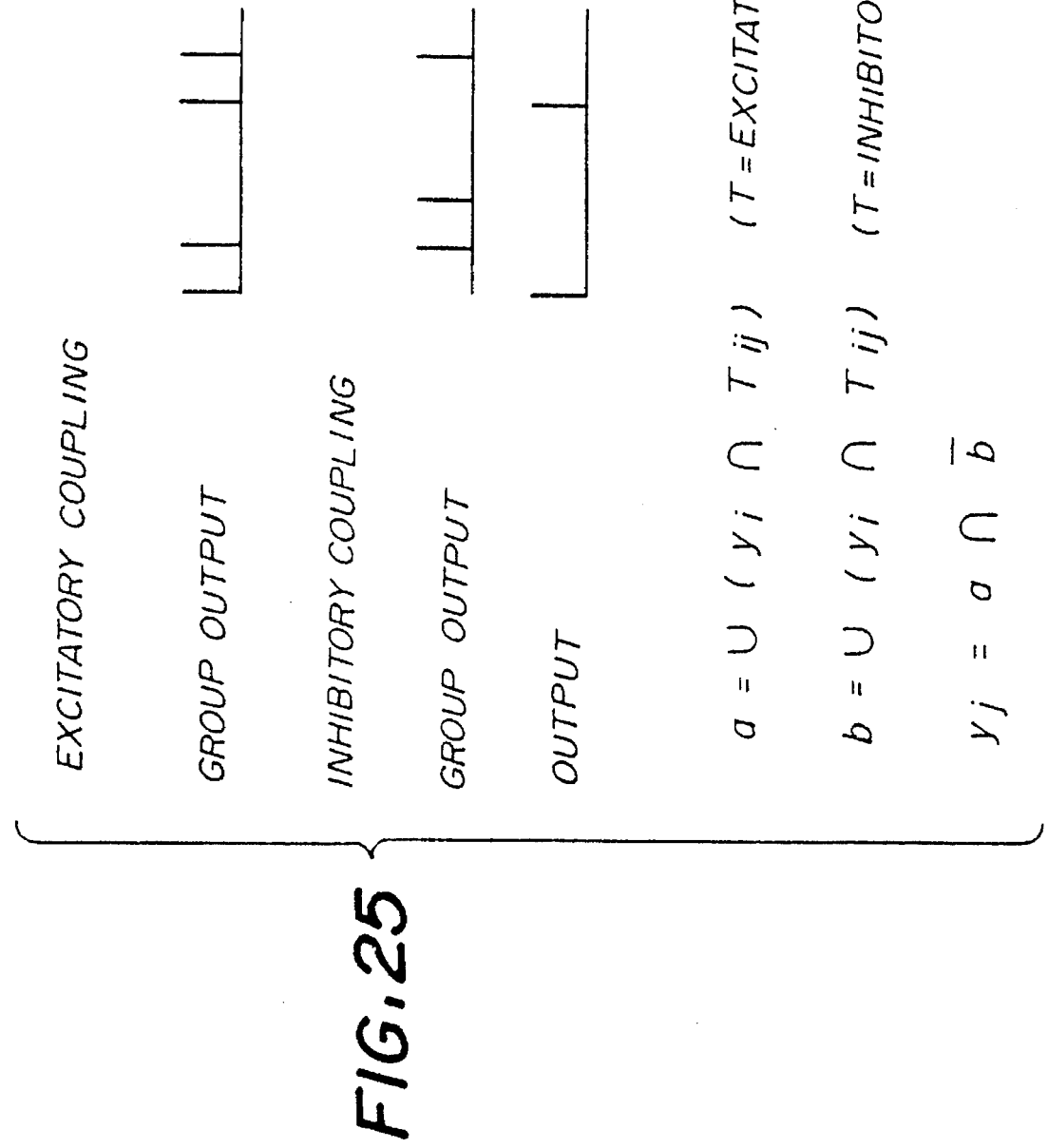
FIG. 25 and 26 are diagrams for explaining outputs of excitatory and inhibitory groups.

In this embodiment, the neuron unit 50 outputs "1" only when the output of the excitatory group is "1" and the output of the inhibitory group is "0". This may be achieved by obtaining an AND of a NOT of the output of the inihibitory group and the output of the excitatory group as shown in FIG. 25. Hence, the output a of the excitatory group can be described as $a=\cup(y_i \cap T_{ij})$ and the output b of the inhibitory group can be described by $b= \cup(y_i \cap T_{ij})$. In addition, the output $y_j$ of the neuron unit 50 can be described by $y_j = a \cap \bar{b}$. The neural network can be formed by connecting a plurality of such neuron units 50 in a plurality of layers to form a hierarchical structure similarly as in the case of the neural network shown in FIG. 2. When the entire neural network is synchronized, it is possible to carry out the above described calculation in each layer.

Figure 26:
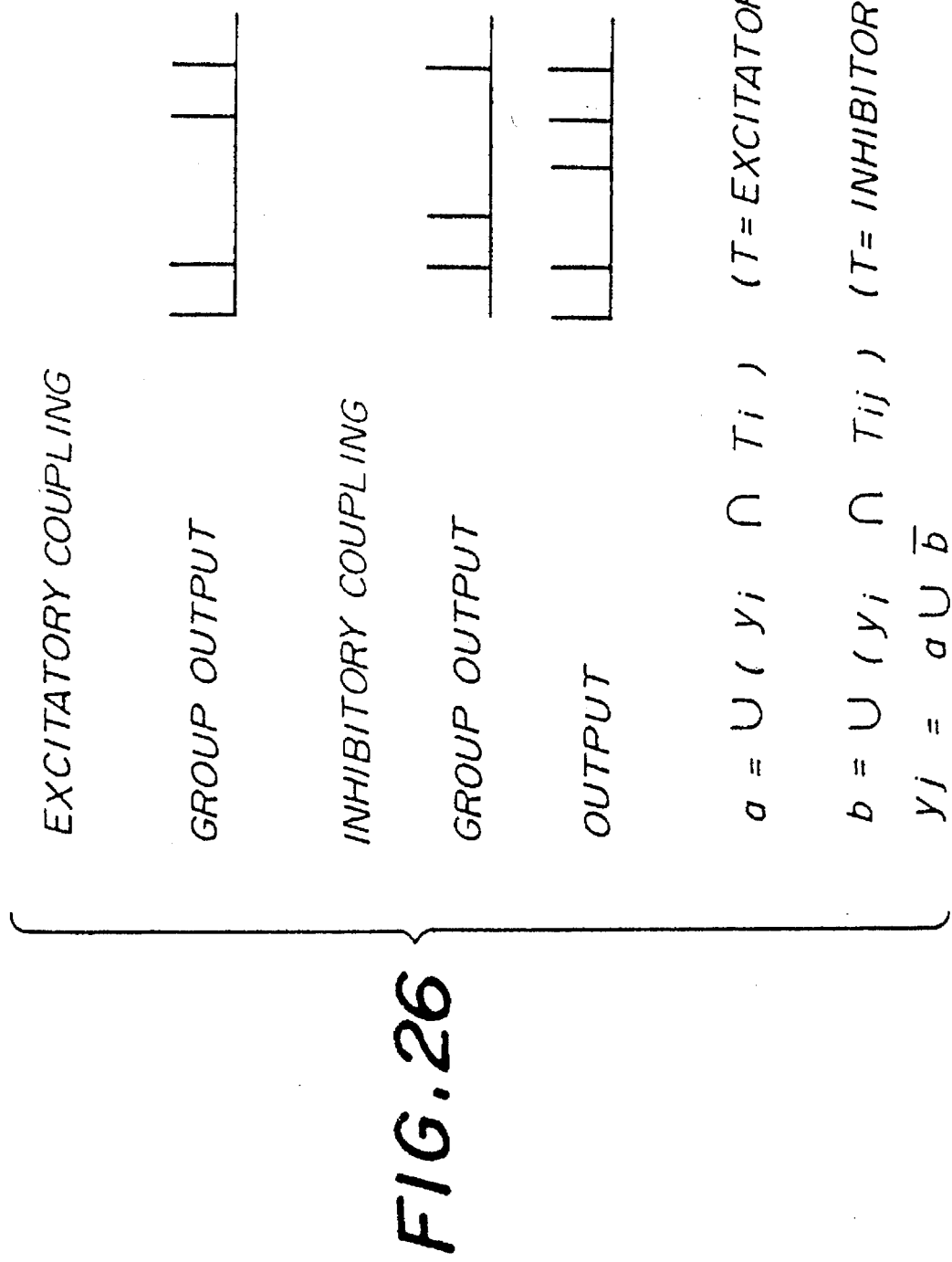

On the other hand, measures may be taken so that the neuron unit 50 outputs "1" excluding the case where the output of the excitatory group is "0" and the output of the inhibitory group is "1". This may be achieved by obtaining an OR of a NOT of the output of the inihibitory group and the output of the excitatory group as shown in FIG. 26. Hence, the output a of the excitatory group can be described as $a=\cup(y_i \cap T_{ij})$ and the output b of the inhibitory group can be described by $b=\cup(y_i \cap T_{ij})$. In addition, the output $y_j$ of the neuron unit 50 can be described by $y_j=a \cup \bar{b}$.

Next, a description will be given of the learning process.

Figure 27:
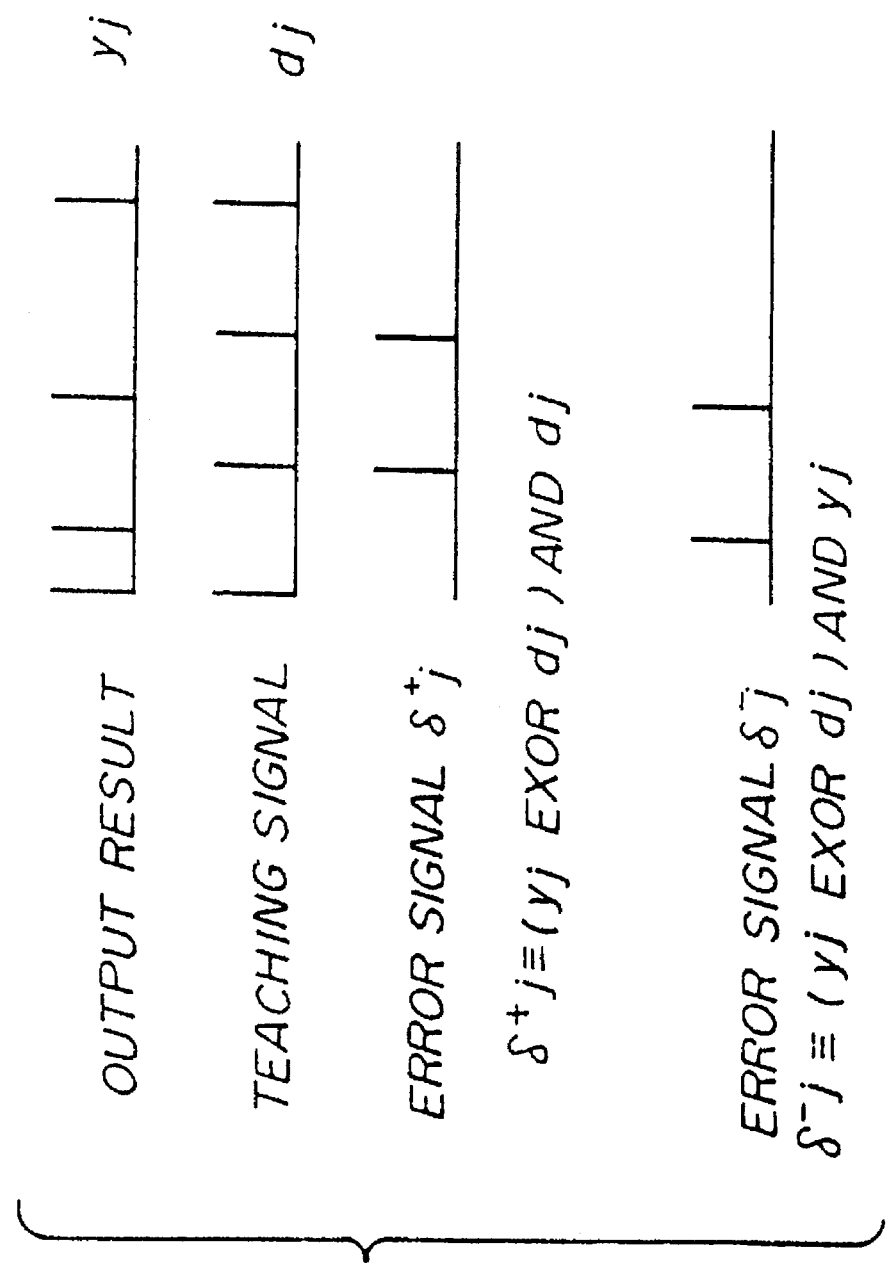
FIG. 27 is a diagram for explaining an error signal.

The Error Signal in the Final Layer:

The error signal of each neuron unit 50 in the final layer is calculated, and the weight function of each neuron unit 50 is varied depending on the error signal. A description will now be given of the method of calculating the error signal. In this embodiment, the error signal is defined as follows. That is, the error may take a positive or negative value when the error is described by a numerical value, but in the case of the pulse density, it is impossible to simultaneously describe the positive and negative values. Hence, two kinds of signals, namely, a signal which indicates a positive component and a signal which indicates a negative component are used to describe the error signal. In other words, an error signal $\delta^+ j$ or $\delta^- j$ of the jth neuron unit 50 can be described as follows, where $\delta^+ j$ denotes the positive error signal, $\delta^- j$ denotes the negative error signal, and the output signal $y_j$ and the teaching signal $d_j$ of the jth neuron unit 50 are as shown in FIG. 27.

$$\delta^+ j \equiv (y_j \text{ EXOR } d_j) \text{ AND } d_j$$

$$\delta^- j \equiv (y_j \text{ EXOR } d_j) \text{ AND } y_j$$

Therefore, the positive component of the error signal corresponds to the pulses existing on the teaching signal side out of the parts (1, 0) and (0, 1) where the teaching signal pulse and the output signal pulse differ. Similarly, the negative component of the error signal corresponds to the pulses existing on the output signal side out of the parts (1, 0) and (0, 1) where the teaching signal pulse and the output signal pulse differ. In other words, when the positive component of the error signal is added to the output signal and the negative component of the error signal is subtracted, the teaching signal is obtained. As will be described later, the weight function is varied based on such error signal pulses.

The Error Signal in the Intermediate Layer:

The error signal is back propagated, so that not only the weight functions of the final layer and the immediately preceding layer but also the weight functions of the layer which precedes the above immediately preceding layer are varied. For this reason, there is a need to calculate the error signal for each neuron unit 50 in the intermediate layer. The error signals from each of the neuron units 50 in the next layer are collected and used as the error signal of a certain neuron unit 50 of the intermediately layer, substantially in the reverse manner as supplying the output signal of the certain neuron unit 50 to each of the neuron units in the next layer. This may be achieved similarly as described above with reference to the equation (7) and FIGS. 21 through 23. That is, the couplings are divided into two groups depending on whether the coupling is an excitatory coupling or an inhibitory coupling, and the multiplication part is described by AND and the Σ part is described by OR. The only difference in this case is that although y is a single signal δ may be positive or negative and thus two error signals must be considered. Therefore, four cases must be considered depending on whether the weight function T is positive or negative and whether the error signal δ is positive or negative.

First, a description will be given of the excitatory coupling. In this case, $\delta^+ k \cap T_{ij}$ which is an AND of the positive error signal $\delta^+ k$ of the kth neuron unit in the layer next to a specific layer and the weight function $T_{jk}$ between the jth neuron unit in the specific layer and the kth neuron unit in the next layer is obtained for each neuron unit in the specific layer. Furthermore, $\cup(\delta^+ k \cap T_{jk})$ which is an OR of $\delta^+ k \cap T_{jk}$ obtained for each neuron unit in the specific layer, and this OR is regarded as the positive error signal $^+ j$ for the specific layer as shown in FIG. 28.

In addition, $\delta^- k \cap T_{jk}$ which is an AND of the negative error signal $\delta^- k$ of the kth neuron unit in the next layer and the weight function $T_{jk}$ between the jth neuron unit in the specific layer and the kth neuron unit in the next layer is obtained for each neuron unit in the specific layer. Furthermore, $\cup(\delta^- k \cap T_{jk})$ which is an OR of $\delta^- k \cap T_{jk}$ obtained for each neuron unit in the specific layer, and this OR is regarded as the negative error signal $\delta^- j$ for the specific layer as shown in FIG. 29.

Next, a description will be given of the inhibitory coupling. In this case, $\delta^- k \cap T_{jk}$ which is an AND of the negative error signal $\delta^- k$ of the kth neuron unit in the layer next to a specific layer and the weight function $T_{jk}$ between the jth neuron unit in the specific layer and the kth neuron unit in the specific layer. Furthermore, $\cup(\delta^- k \cap T_{jk})$ which is an OR of $\delta^- k \cap T_{jk}$ obtained for each neuron unit in the specific layer, and this OR is regarded as the positive error signal $\delta^+ j$ for the specific layer as shown in FIG. 30.

In addition, $\delta^+ k \cap T_{jk}$ which is an AND of the positive error signal $\delta^+ k$ of the kth neuron unit in the next layer and the weight function $T_{jk}$ between the jth neuron unit in the specific layer and the kth neuron unit in the next layer is obtained for each neuron unit in the specific layer. Furthermore, $\cup(\delta^+ k \cap T_{jk})$ which is an OR of $\delta^+ k \cap T_{jk}$ obtained for each neuron unit in the specific layer, and this OR is regarded as the negative error signal $\delta^- j$ for the specific layer as shown in FIG. 31.

Since one neuron unit may be coupled to another neuron unit by an excitatory or inhibitory coupling, an OR of the error signal $\delta^+ j$ shown in FIG. 28 and the error signal $\delta^+ j$ shown in FIG. 30 is regarded as the error signal $\delta^+ j$ of the jth neuron unit. Similarly, an OR of the error signal $\delta^- j$ shown in FIG. 29 and the error signal $\delta^- j$ shown in FIG. 31 is regarded as the error signal $\delta^- j$ of the jth neuron unit.

Therefore, the error signals $\delta^+ j$ and $\delta^- j$ of the jth neuron unit in the specific layer can be described as follows.

$$\delta^+ j = [\cup(\delta^+ k \cap T_{jk})] \cup [\cup(\delta^- k \cap T_{jk})]$$
$$k \in \text{excitatory} \quad k \in \text{inhibitory}$$

$$\delta^- j = [\cup(\delta^- k \cap T_{jk})] \cup [\cup(\delta^+ k \cap T_{jk})]$$
$$k \in \text{excitatory} \quad k \in \text{inhibitory}$$

The error signals $\delta^+ j$ and $\delta^{-j}$ can also be described as follows.

$$\delta^+ j = \cup E^+ jk$$

-continued where $E^+jk = \delta^+k \cap T_{jk}$ $(T_{jk} = \text{excitatory})$ $\phantom{E^+jk} = \delta^-k \cap T_{jk}$ $(T_{jk} = \text{inhibitory})$ $\delta^-j = \cup E^-jk$ where $E^-jk = \delta^-k \cap T_{jk}$ $(T_{jk} = \text{inhibitory})$ $\phantom{E^-jk} = \delta^+k \cap T_{jk}$ $(T_{jk} = \text{excitatory})$ It is possible to further provide a function corresponding to the learning rate (learning constant). When the rate is "1" or less in numerical calculation, the learning capability is improved. This may be realized by thinning out the pulse train in the case of an operation on pulse trains. Two examples will now be described where the example 1) thins out every other pulses of the original pulse signal in which the pulses are equi-distant from each other and the example 2) thins out every other pulses of the original pulse signal in which the pulses are not equi-distant from each other.

FIG. 32 shows the example 1) for $\eta=0.5$ where every other pulses of the original pulse signal are thinned out, $\eta=0.33$ where every third pulses of the original pulse signal are thinned out, and $\eta=0.67$ where every third pulses of the original pulse signal are thinned out.

FIG. 33 shows the example 2) for $\eta=0.5$ where every other pulses of the original pulse signal are thinned out, $\eta=0.33$ where every third pulses of the original pulse signal are thinned out, and $\eta=0.67$ where every third pulses of the original pulse signal are thinned out.

By thinning out the error signal in the above described manner, it is possible to provide the function corresponding to the learning rate. Such thinning out can easily be realized by use of a generally available counter and/or flip-flop by carrying out a logic operation on a counter output, for example. In a particular case where the counter is used, it is possible to easily set the value of the learning constant $\eta$ to an arbitrary value, thereby making it possible to control the characteristic of the neural network.

It is not essential to always use the learning constant for the error signal. For example, it is possible to use the learning constant may be used only when carrying out the operation to obtain the weight function. In addition, the learning constant at the time of back-propagating the error signal and the learning constant at the time of carrying out the operation to obtain the weight function may be different. This means that the characteristics of the neuron units in the neural network can be set independently, and it is thus possible to form a system which is easily applicable to general applications. Accordingly, it becomes possible to appropriately adjust the performance of the neural network.

Figures 34, 35:
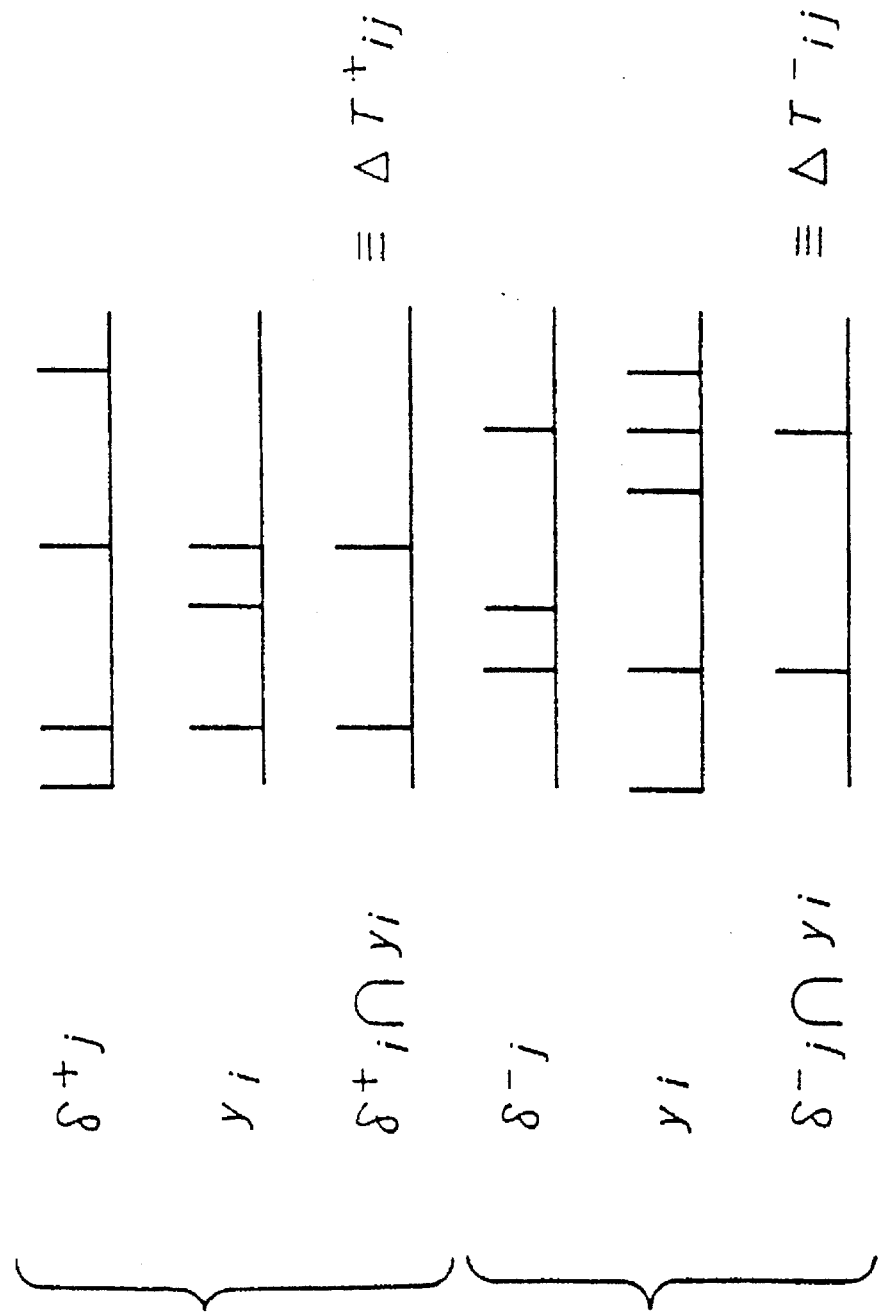
FIGS. 34 and 35 respectively are diagrams for explaining examples of thinning out the error signal.

Variation of Each Weighting Coefficient by the Error Signal:

The error signal is obtained by the method described above, and each weight function is varied. The method of varying each weight function will now be described. First, an AND is obtained between the error signal and the signal flowing in a line to which the weight function which is to be varied belongs. In other words, $\delta \cap y$ is obtained. But since there are two error signals, one positive and one negative, both $\delta^+j \cap y_i$ and $\delta^-j \cap y_i$ are obtained as shown respectively in FIGS. 34 and 35. The two signals which are obtained from $\delta^+j \cap y_i$ and $\delta^-j \cap y_i$ are respectively denoted by $\Delta T^+ij$ and $\Delta T^-ij$.

Next, a new weight function $T_{ij}$ is obtained based on $\Delta T_{ij}$. But since the weight function $T_{ij}$ in this embodiment is an absolute value component, the new weight function $T_{ij}$ is obtained differently depending on whether the original weight function $T_{ij}$ is excitatory or inhibitory. When the original weight function $T_{ij}$ is excitatory, the component of $\Delta T^+ij$ is increased with respect to the original weight function $T_{ij}$ and the component of $\Delta T^-ij$ is decreased with respect to the original weight function $T_{ij}$ as shown in FIG. B6. On the other hand, when the original weight function $T_{ij}$ is inhibitory, the component of $\Delta T^+ij$ is decreased with respect to the original weight function $T_{ij}$ and the component of $\Delta T^-ij$ is increased with respect to the original weight function $T_{ij}$ as shown in FIG. 37.

The calculations in the neural network are carried out based on the above described learning rules.

Figure 38:
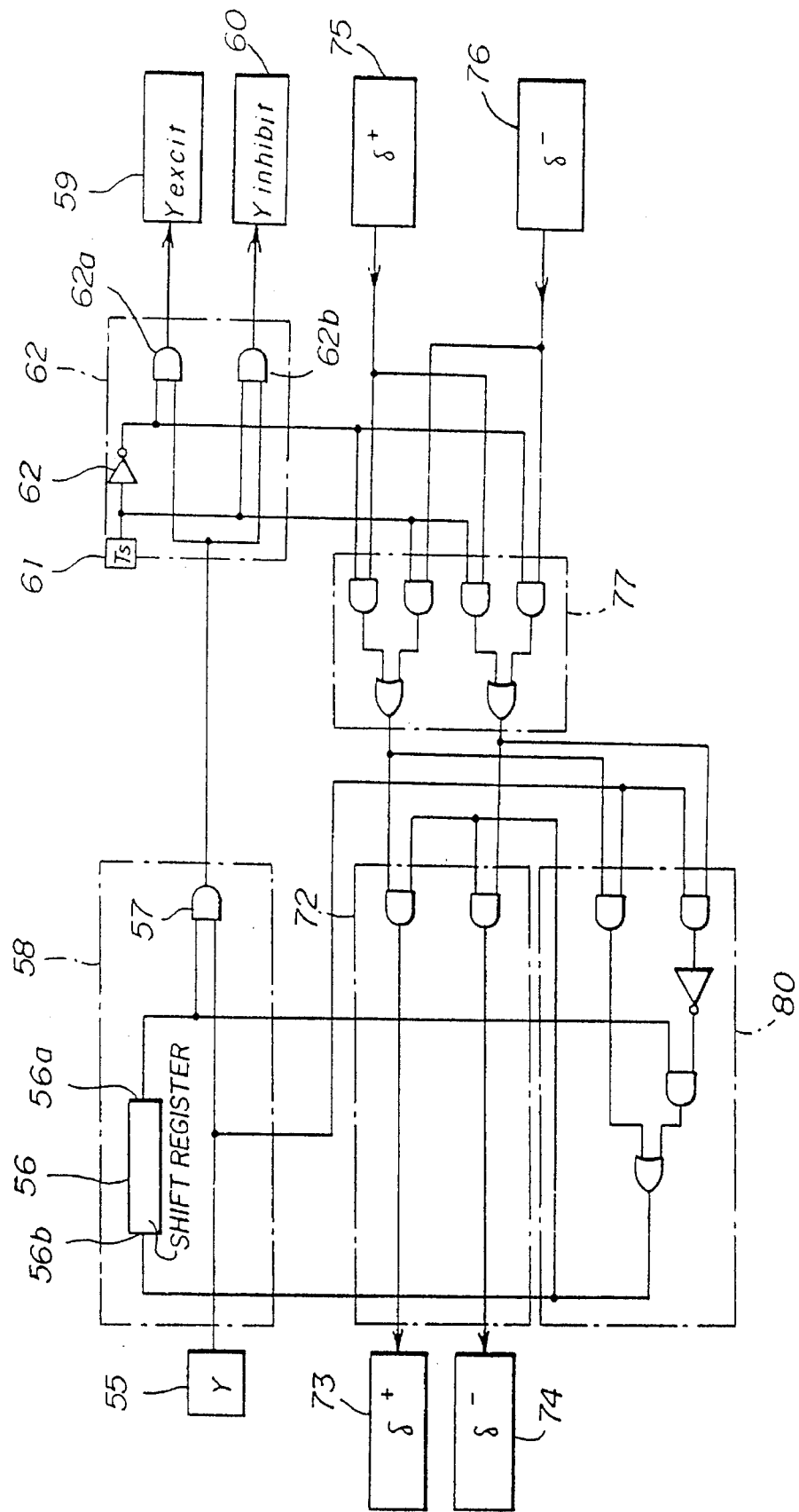
FIG. 38 is a circuit diagram showing a circuit which corresponds to a connection line between two neuron units in the neural network shown in FIG. 2.
Figure 39:
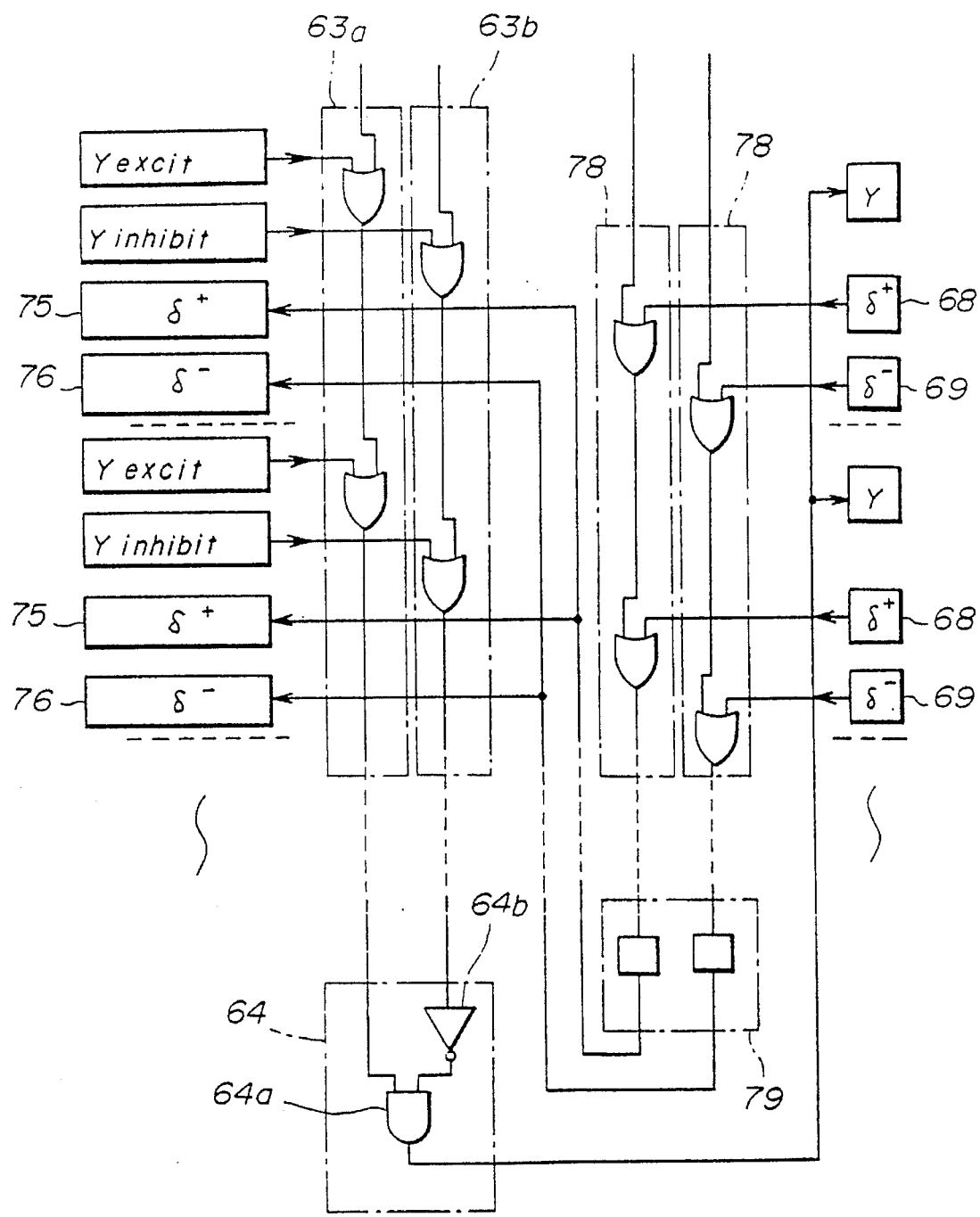
FIG. 39 is a circuit diagram showing a circuit which corresponds to the neuron unit of the second embodiment.
Figure 40:
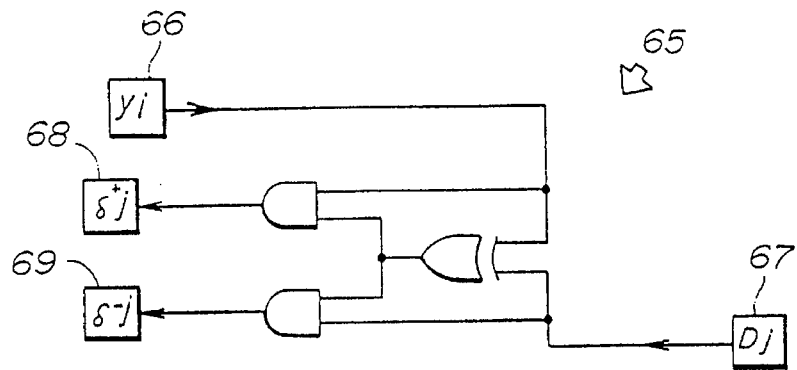

Next, a description will be given of actual circuits which form the second embodiment, by referring to FIGS. 38 through 40. FIG. 38 shows a circuit which corresponds to a connection line between two neuron units in the neural network shown in FIG. 2. FIG. 39 shows a circuit which corresponds to the neuron unit 50. FIG. 40 shows a circuit for obtaining the error signal in the final layer based on the output of the final layer and the teaching signal. The circuits shown in FIGS. 38 through 40 are connected as shown in FIG. 2 to form the digital neural network having the self-learning function.

In FIG. 38, an input signal 55 to the neuron unit 50 corresponds to the input signal described with reference to FIG. 21. The value of the weight function described with reference to FIG. 22 is stored in a shift register 56. The shift register 56 has an input 56b and an output 56a and has a function similar to a general shift register. For example, a combination of a random access memory (RAM) and an address controller may be used as the shift register 56.

A logic circuit 58 which includes an AND circuit 57 and corresponds to $y_i \cap T_{ij}$ described with reference to FIG. 23 obtains an AND of the input signal 55 and the weight function within the shift register 56. An output signal of the logic circuit 58 must be grouped depending on whether the coupling is excitatory or inhibitory, but it is preferable from the point of general application to prepare an output 59 for the excitatory group and an output 60 for the inhibitory group and output one of these outputs 59 and 60. For this reason, this embodiment has a memory 61 for storing a bit which indicates whether the coupling is excitatory or inhibitory, a switching gate circuit 62 is switched depending on the bit which is stored in the memory 61. The switching gate circuit 62 includes two AND gates 62a and 62b and an inverter 62c which inverts the bit which is read out from the memory 61 and is supplied to the AND gate 62a.

In addition, as shown in FIG. 39, gate circuits 63a and 63b which include a plurality of OR gates and correspond to $\cup(y_i \cap T_{ij})$ and described with reference to FIG. 24 are provided to process each input. A gate circuit 64 includes an AND gate 64a and an inverter 64b and outputs an output signal "1" only when the output of the excitatory group is "1" and the output of the inhibitory group is "0" as described in conjunction with FIG. 25.

Next, a description will be given of the error signal. A logic circuit 65 shown in FIG. 40 includes two AND gates and one exclusive-OR gate and generates error signals in the final layer. This logic circuit 65 corresponds to the equations described with reference to FIG. 27. In other words, the logic circuit 65 generates error signals 68 and 69 based on an output signal 66 of the final layer and a teaching signal 67. The calculation of the error signals in the intermediate layer described with reference to FIGS. 28 through 31 is carried out by a gate circuit 72 shown in FIG. 38 which includes two AND gates. The gate circuit 72 outputs output signals 73 and 74 depending on positive and negative signals 75 and 76 of the error signals 68 and 69.

The calculation is carried out for two cases, that is, for the case where the coupling is excitatory and the case where the coupling is inhibitory. A gate circuit 77 which includes four AND gates and two OR gates determines which one of the cases the calculation is to be carried out based on the bit stored in the memory 61 and the positive and negative signals 75 and 76.

A gate circuit 78 which includes OR gates as shown in FIG. 39 carries out the calculations according to the equations described above to obtain the error signals $\delta^+j$ and $\delta^-j$. Furthermore, the calculation to obtain the learning rate as described in conjunction with FIGS. 32 and 33 is carried out by a frequency dividing circuit 79 shown in FIG. 39. Finally, a gate circuit 80 which includes three AND gates, an OR gate and an inverter as shown in FIG. 38 calculates the new weight function from the error signal as described in conjunction with FIGS. 34 through 37. The content of the shift register 56, that is, the weight function, is rewritten into the new weight function which is calculated by the gate circuit 80. The gate circuit 80 also carries out the calculation for the case where the coupling is excitatory and the case where the coupling is inhibitory, and one of these two cases is determined by the gate circuit 77.

Figure 41:
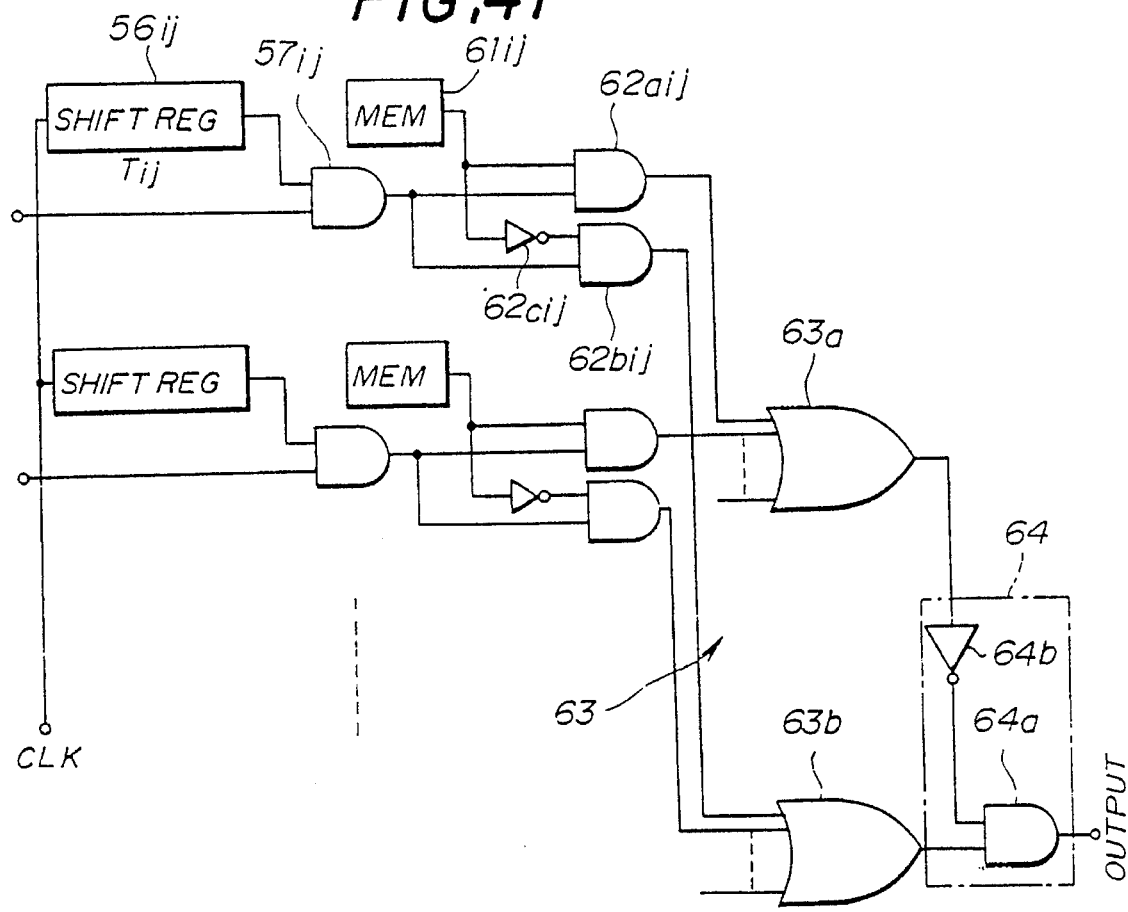
FIG. 41 is a circuit diagram showing an embodiment of a circuit for grouping excitatory and inhibitory couplings and determining the output in FIGS. 38 and 39.

FIG. 41 shows an embodiment of the grouping system and the output determination system shown in FIGS. 38 and 39. In this case, the grouping is not made at the input stage. A shift register $56_{ij}$ which stores the weight function is provided with respect to each input signal $55_{ij}$. An output signal of each AND gate $57_{ij}$ is grouped into one of excitatory and inhibitory groups via the switching gate circuit 62 depending on the content of a memory $61_{ij}$. A logical sum is obtained in the OR gate 63a for the excitatory group (excitatory coupling) and a logical sum is obtained in the OR gate 63b for the inhibitory group (inhibitory coupling). Thereafter, the output signal is determined by a logical product processing in the gate circuit 64.

Next, a description will be given of a case where the above described neural network is applied to a self-learning type character recognition system. The first layer of the neural network includes 256 neuron units, the second layer includes 20 neuron units and the third layer includes five neuron units. First, a hand-written character shown in FIG. 19 is read by a scanner, and the read image is divided into 16×16 meshes. The data in each mesh is then applied to each neuron unit of the first layer in the neural network. For the sake of convenience, the data of a mesh which includes a portion of the character is taken as "1" while the data of a mesh which includes no portion of the character is taken as "0". The output of the neural network is connected to a light emitting diode (LED) so that the resulting output is directly displayed on the LED. Out of the five neuron units of the third layer, the neuron unit which outputs the largest output is assumed to output the recognition result. The learning takes place so that when the numbers "1" through "5" are input to the neural network, the five neuron units of the third layer respectively corresponding to the numbers "1" through "5" output the largest output. In other words, when the number "1" is input, the neuron unit of the third layer corresponding to the number "1" outputs the largest output. Those input parts of the neuron units not connected to another neuron unit are grounded.

Initially, when each weight function is set at random, the resulting output is not necessarily the desirable value. Hence, the self-learning function is used to newly obtain each weight function, and such renewal of each weight function is repeated a predetermined number of times until the desired value is obtained as the resulting output. In this embodiment, the input signal is "0" or "1", and the input pulse sequence is simply made up of low-level and high-level pulses. The LED is turned ON when the output signal has the high level and is turned OFF when the output signal has the low level. Since the synchronizing pulses (clock) has a frequency of 1000 kHz, the brightness of the LED appears to change to the human eye depending on the pulse density. Hence the LED which appears to be the brightest corresponds to the answer, that is, the recognition result. With respect to a character after sufficient learning, the recognition rate was 100%.

Figure 42:
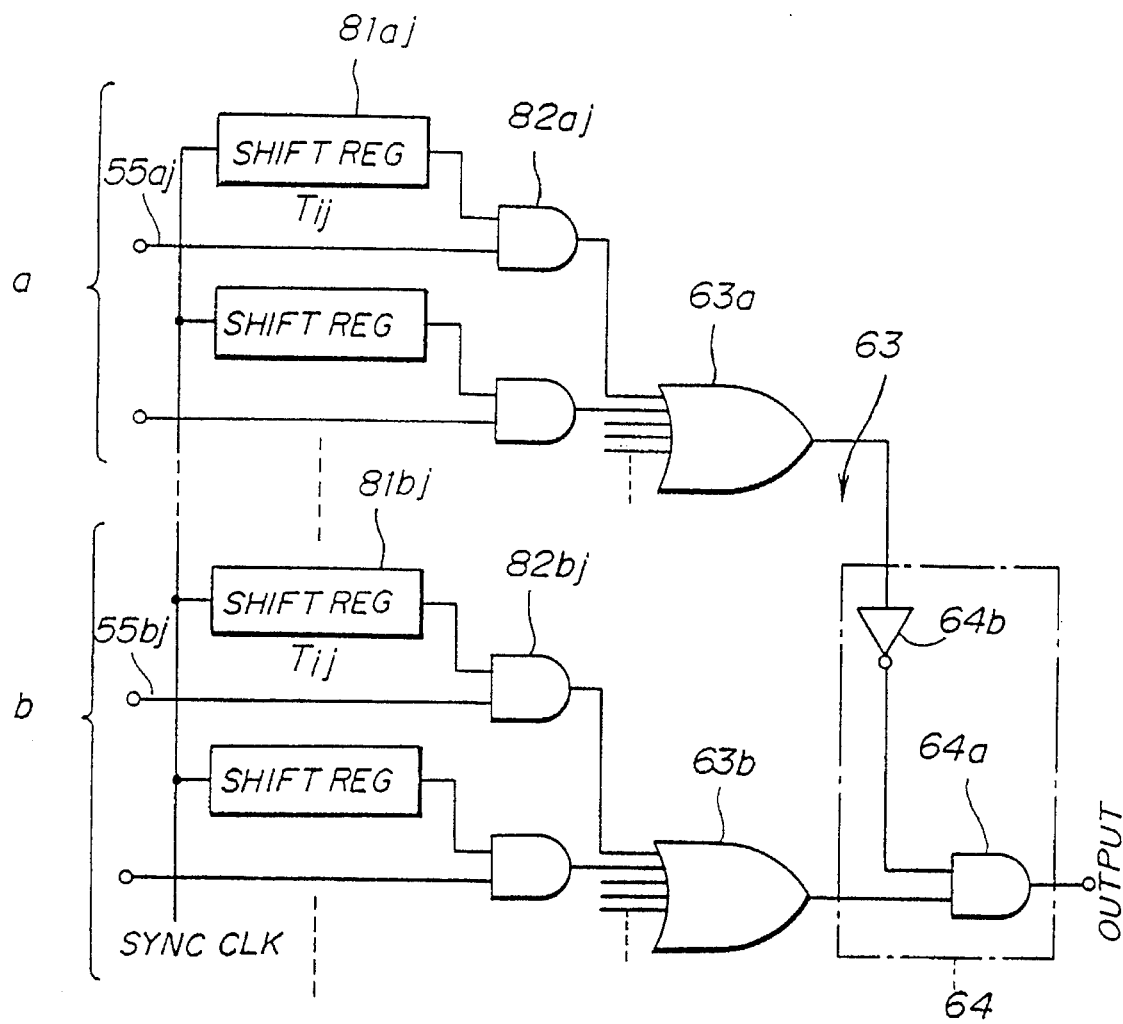
FIG. 42 is a circuit diagram showing another embodiment of the circuit for grouping excitatory and inhibitory couplings and determining the output.

FIG. 42 shows an embodiment of the grouping system and the output determination system shown in FIGS. 38 and 39. In this case, the grouping is made at the input stage, and the couplings are grouped into an excitatory coupling group a and an inhibitory coupling group b. A shift register 81 has at least two bits and stores the coupling coefficient $T_{ij}$ with respect to each input signal $55_{ij}$. The output signals of the group a is supplied to the OR gate 63a, while the output signals of the group b are supplied to the OR gate 63b. The output signals of the OR gates 63a and 63b are processed similarly as in the case of the embodiment shown in FIG. 41 in the gate circuit 64.

Figure 43:
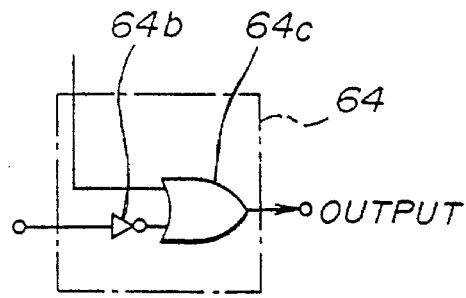
FIG. 43 is a circuit diagram showing a modification of a gate circuit shown in FIGS. 41 and 42.

FIG. 43 shows a modification of the gate circuit 64 shown in FIGS. 41 and 42. This modification of the gate circuit 64 uses an OR gate 64c in place of the AND gate 64a and obtains a logical sum. This process of the gate circuit 64 shown in FIG. 43 corresponds to the process described with reference to FIG. 26.

The circuit for grouping the couplings into the excitatory group and the inhibitory group and determining the output is further disclosed in a U.S. patent application Ser. No. 550,404 filed Jul. 10, 1990, the disclosure of which is hereby incorporated by reference.

Next, a description will be given of a third embodiment of the neuron unit according to the present invention, by referring to FIG. 44. This embodiment further includes learning constant setting means 82 for arbitrarily and variably setting the learning constant which is used in the weight function varying circuit from the outside. In other words, in addition to the fundamental rules [1] through [6] described above, the neuron unit is realized by use of digital circuits according to the following additional rule [7A].

[7A] The learning constant (learning rate) which is used during the learning process of [6] is made variable, so as to enable general applications of the neural network.

The learning constant setting means 82 is provided in place of the frequency dividing circuit 79 shown in FIG. 39. The learning constant setting means 82 includes a counter 83 which receives the error signal, OR gates 84 through 87 for carrying out a logic operation on outputs of the counter 83 so as to process the learning constant, switches Sa through Sd which are respectively connected to the OR gates 84 through 87, and an AND gate 88 which receives outputs of the OR gates 84 through 87. $\eta=1.0$ when the switches Sa through Sd are connected to the high-level side, and $\eta=\frac{1}{16}$ when the switches Sa through Sd are connected to the not-high-level side. When the number of switches connected to the high-level side is denoted by N, $\eta=2^N/16$. Accordingly, the learning constant can be set arbitrarily by use of the switches Sa through Sd or external signals which replace the switches Sa through Sd.

Figure 44:
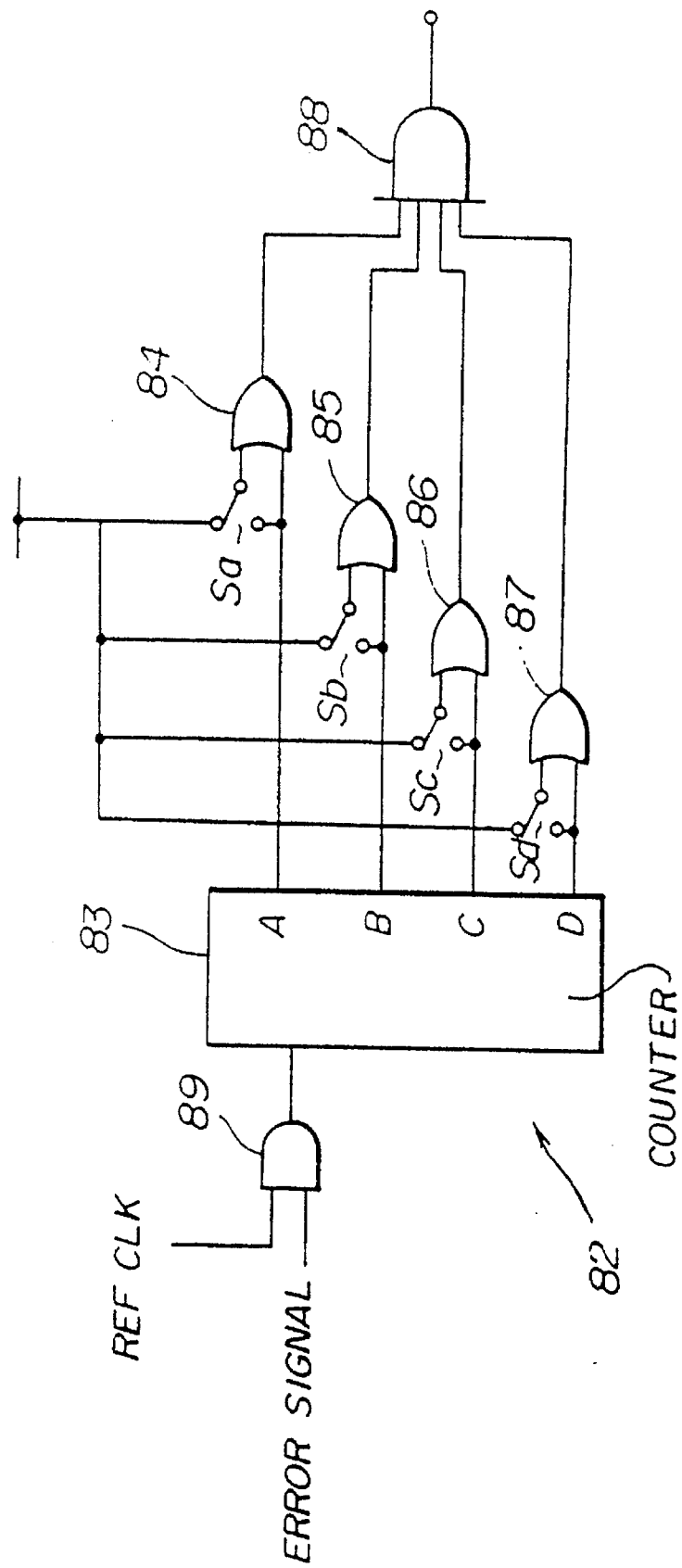
FIG. 44 is a circuit diagram showing an essential part of a third embodiment of the neuron unit according to the present invention.

When the pulse density is used as the clock input to the counter 83, it is possible to provide an AND gate 89 with respect to the error signal input as shown in FIG. 44. The learning constant setting means 82 is of course not limited to that shown in FIG. 44, and in addition, it is possible to provide a plurality of learning constant setting means 82. Furthermore, it is possible to appropriately controlling the learning constant setting means 82 by external signals, it is also possible to make the value of the learning constant which is used for the operation on the weight function different from the value of the learning constant which is used for the back propagation of the error signal.

Next, a description will be given of a fourth embodiment of the neuron unit according to the present invention, by referring to FIGS. 45 through 47. In addition to the fundamental rules [1] through [6] described above, this embodiment realizes the neuron unit by use of digital circuits according to the following additional rule [7B].

[7B] Two kinds of weight functions, that is, an excitatory weight function and an inhibitory weight function are prepared, and the flexibility of the neural network is improved by determining the result of the operation on the input signal depending on the majority of the kind of weight functions used.

In other words, one neuron unit has the excitatory weight function and the inhibitory weight function, and the resulting output which is obtained by an AND of the input signal and the weight function is processed depending on the ratio of the existing excitatory couplings and inhibitory couplings. This ratio of the existing excitatory couplings and inhibitory couplings means the following. That is, with respect to the plurality of input signals which are subjected to an operation in synchronism, the number of times the resulting output obtained by use of the excitatory weight function is "1" is compared with the number of times the resulting output obtained by use of the inhibitory weight function is "1" and the neuron unit outputs "0" when the latter is greater and otherwise outputs "1". Alternatively, the neuron unit may output "0" when the two as the same.

Figure 45:
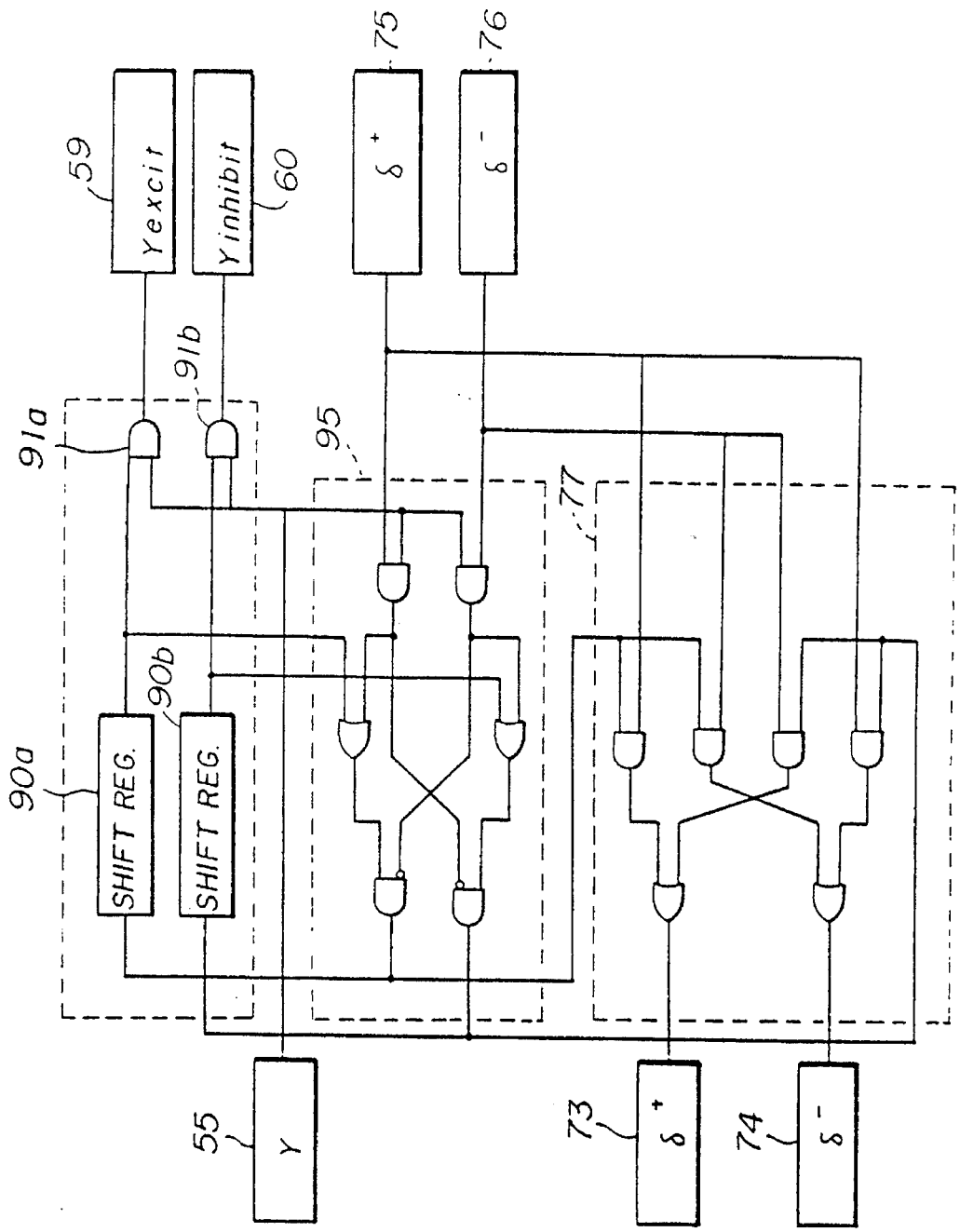
FIGS. 45 through 47 are circuit diagrams for explaining essential parts of a fourth embodiment of the neuron unit according to the present invention.
Figure 46:
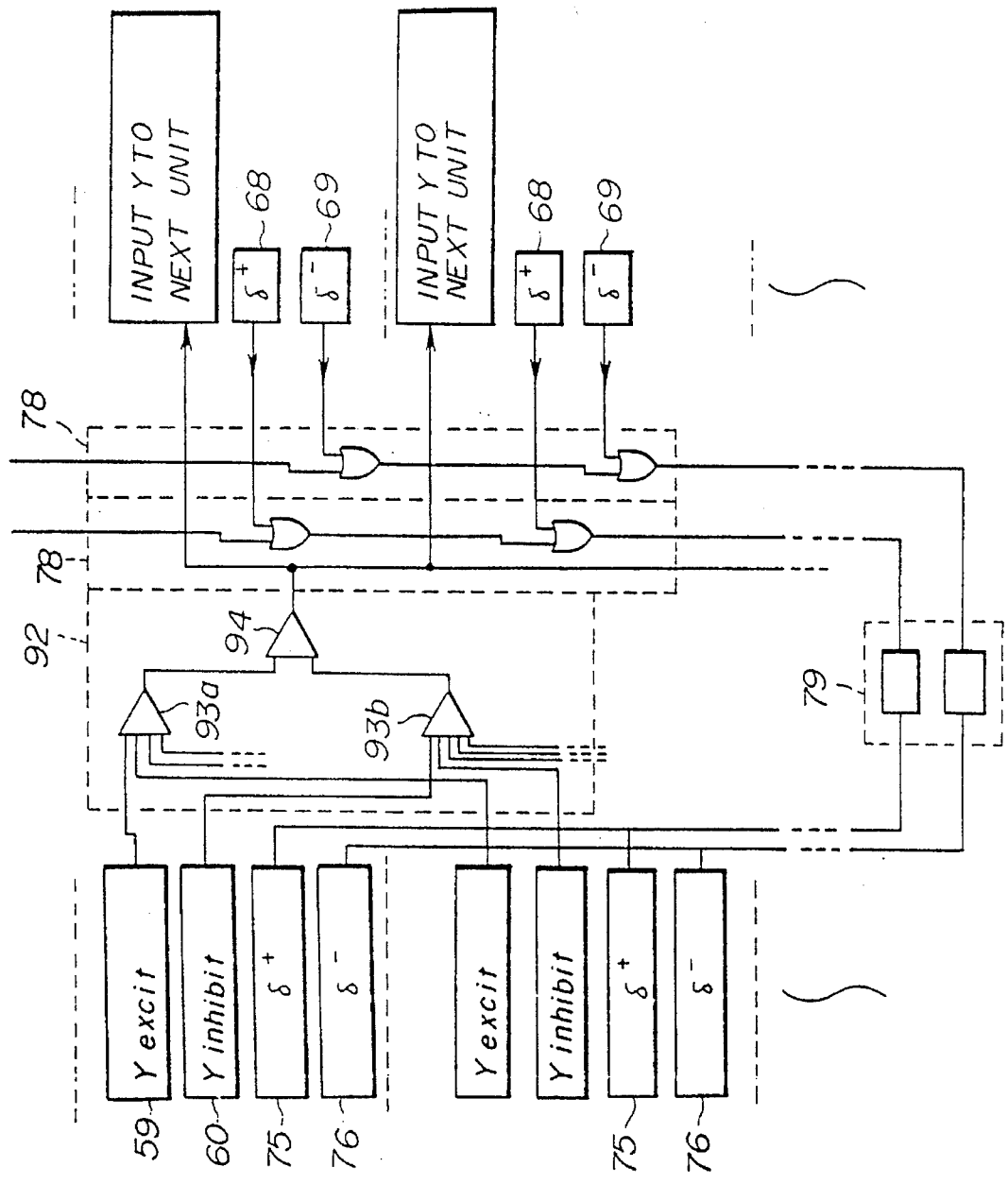

FIGS. 45 and 46 show circuits for realizing the above. First, a pair of shift registers 90a and 90b are provided with respect to each input signal 55. One of the shift registers 90a and 90b stores the excitatory weight function while the other stores the inhibitory weight function. These shift registers 90a and 90b may have the same construction as the shift register 56. The contents of the shift registers 90a and 90b are successively read out by a reading means (not shown) and supplied to corresponding AND gates 91a and 91b together with the input signal 55. A known reading means may be used.

Output signals 59 and 60 of the AND gates 91a and 91b are supplied to a majority determination circuit 92 shown in FIG. 46. The digital signals including the signal 59 which are obtained by using the excitatory weight functions stored in the shift registers 90a are supplied to an amplifier 93a and subjected to an adding process. Similarly, the digital signals including the signal 60 which are obtained by using the inhibitory weight functions stored in the shift registers 90b are supplied to an amplifier 93b and subjected to an adding process. Outputs of the amplifiers 93a and 93b are compared in a comparator 94 which determines the majority. Of course, the majority determination circuit 92 is not limited to that shown in FIG. 46, and any kind of majority determination circuit may be used.

Figure 47:
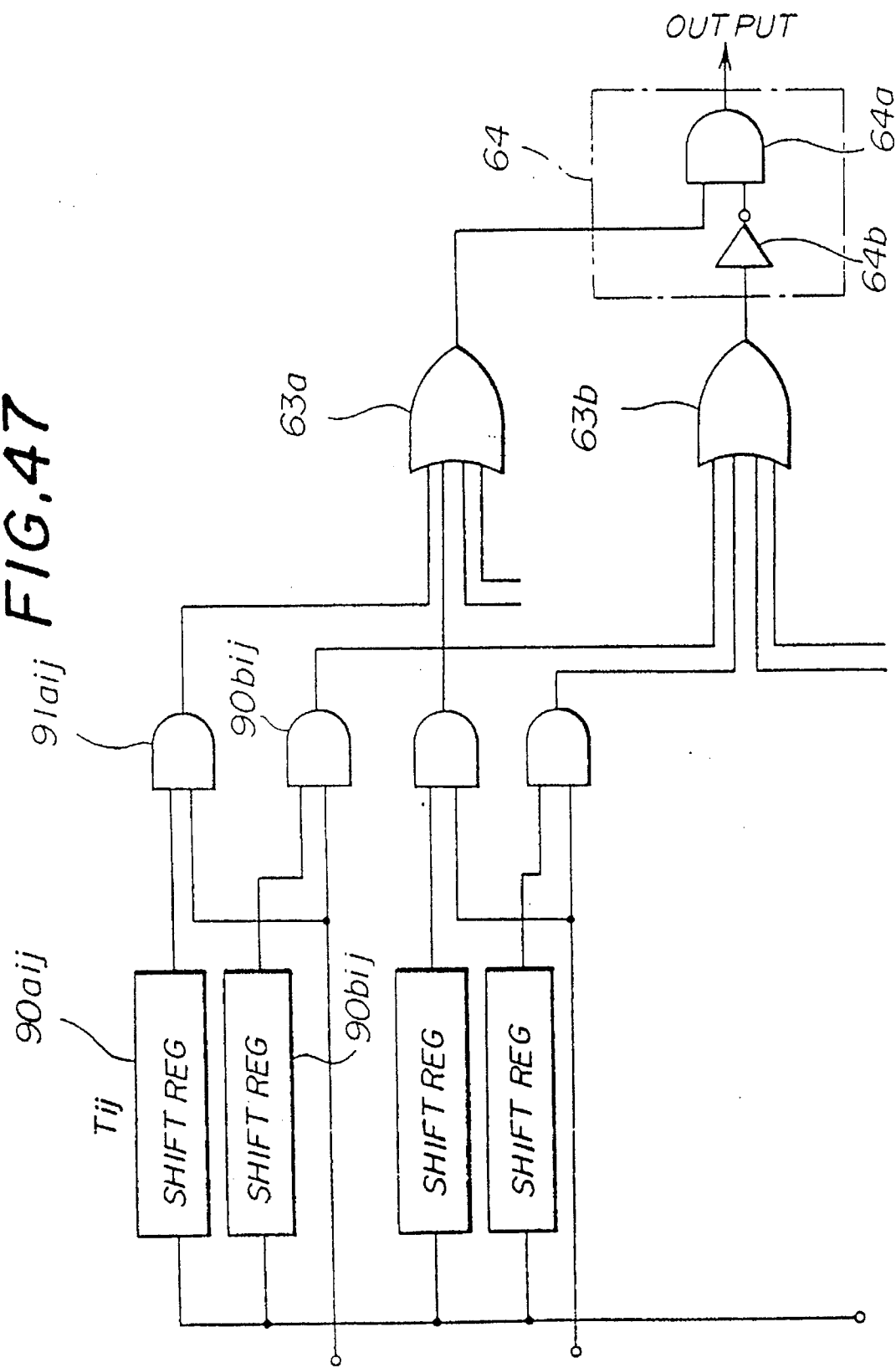

FIG. 47 shows the circuit for grouping the circuit shown in FIG. 45. A pair of shift registers (memories) for storing the excitatory and inhibitory weight functions with respect to each input signal are provided, and the logical product is obtained for each group of shift registers.

In FIG. 47, OR gates 63a and 63b are provided in place of the majority determination circuit 92, similarly as in the circuits shown in FIGS. 41 and 42. The gate circuit 64 may have the construction shown in FIG. 43.

In this embodiment, the pair of shift registers 90a and 90b is provided for each input signal 55. Hence, the rewriting of the weight function using the self-learning function is carried out for each of the shift registers 90a and 90b. For this reason, a self-learning circuit 95 is provided as shown in FIG. 45 to calculate the new weight function as described in conjunction with FIGS. 29 through 31 and the equations for obtaining the error signals $\delta^+j$ and $\delta^-j$. This self-learning circuit 95 is connected to the input side of the shift registers 90a and 90b.

According to this embodiment, the coupling of the neuron units is not limited to only the excitatory coupling or the inhibitory coupling. As a result, the neural network has more flexibility and is applicable to general applications.

The frequency dividing circuit 79 show in FIG. 46 may also be replaced by a learning constant setting means such as the learning constant setting means 82 shown in FIG. 44.

In addition, the method of determining the output by the majority determination circuit 92 is not limited to that shown in FIG. 45 in which two memories (shift registers 90a and 90b) are provided with respect to each input signal. For example, this method may be applied similarly to a case where one memory 56 is provided with respect to each input signal. In other words, in addition to the combination of FIGS. 38 and 39, it is also possible to combine FIGS. 38 and 46.

Next, a description will be given of a fifth embodiment of the neuron unit according to the present invention. In this embodiment, a switching circuit is provided to select a first mode in which the weight function is renewed (changed) or a second mode in which the weight function is fixed.

In addition to the fundamental rules [1] through [6] described above, this embodiment realizes the neuron unit by use of digital circuits according to the following additional rule [7C].

[7c] The mode is switched between a first mode in which the weight function is renewed (changed) or a second mode in which the weight function is fixed, where the first mode corresponds to a case where the learning (back propagation) takes place and the second mode corresponds to a case where no learning (only forward process) takes place.

Figure 48:
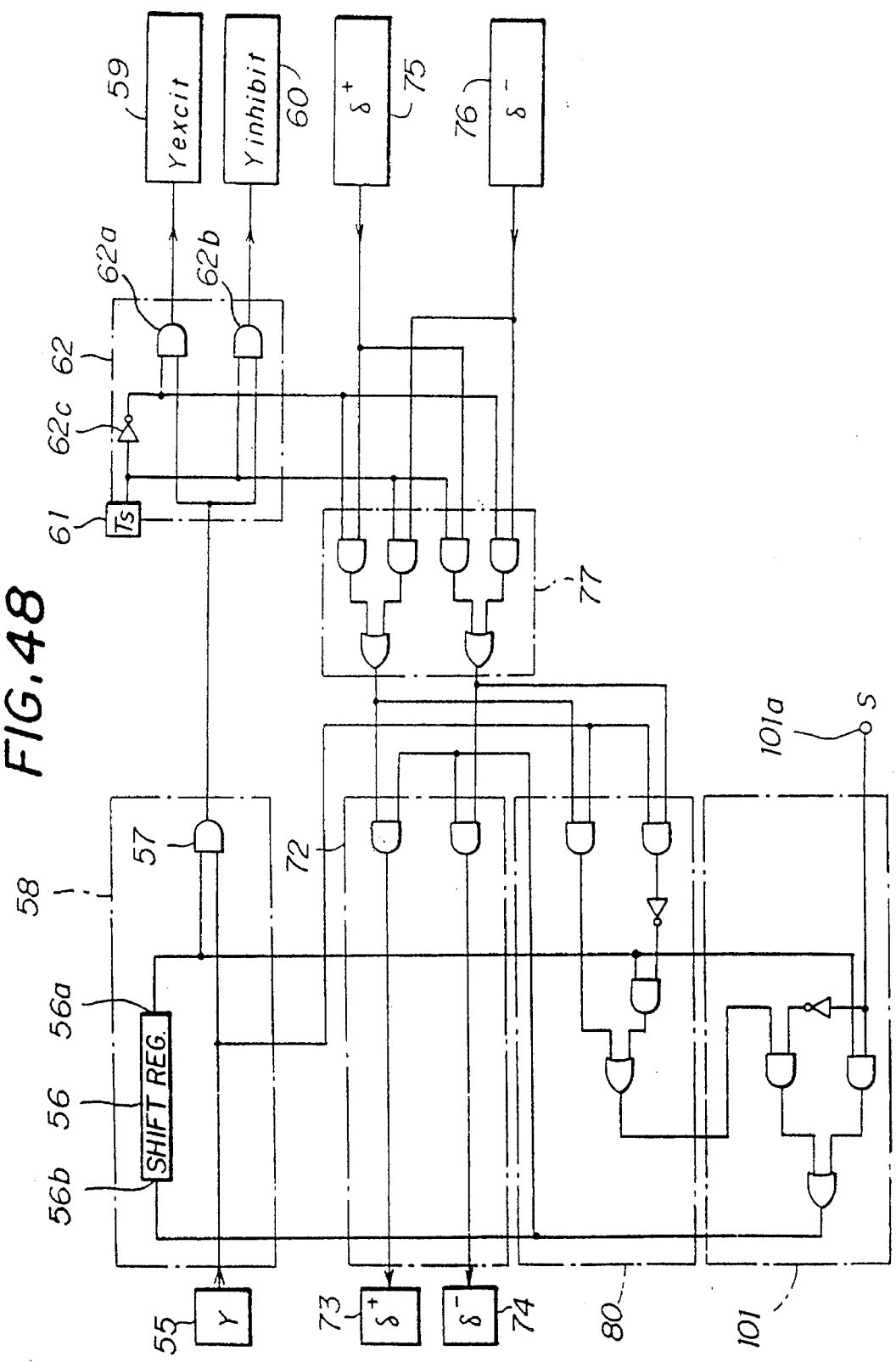
FIG. 48 is a circuit diagram showing an essential part of a fifth embodiment of the neuron unit according to the present invention.

FIG. 48 shows an essential part of the fifth embodiment. In FIG. 48, those parts which are the same as those corresponding parts in FIG. 38 are designated by the same reference numerals, and a description thereof will be omitted.

In the neural network, the forward process and the back propagation are not necessarily carried out constantly at the same time. Depending on the circumstances, the forward process is only required. For example, when making a character recognition using the weight functions which are obtained after the learning process, it is sufficient to carry out the forward process alone. Therefore, the neural network becomes more flexible by switching the mode between the first and second modes. This switching of the mode corresponds to a control which determines whether or not the weight function is to be renewed by the new weight function which is obtained as described above in conjunction with FIG. 36 or 37.

In FIG. 48, a switching circuit 101 switches the mode between the first and second modes responsive to an external switching signal S which is applied to a terminal 101a. The switching circuit 101 includes two AND gates, an OR gate and an inverter which are connected as shown. When selecting the first mode, the switching circuit 101 in response to the switching signal S selectively supplies to the shift register 56 the output value of the gate circuit 80 which is newly obtained, so as to renew the weight function. On the other hand, when selecting the second mode, the switching circuit 101 in response to the switching signal S selectively supplies to the shift register 56 the output value of the shift register 56, so as to maintain the weight function fixed. Therefore, the neural network as a whole can be controlled by the switching of the switching circuit 101 responsive to the switching signal S.

In the second embodiment, for example, the weight function and its sign (polarity) are stored in the memory. However, the memory content will be erased when the power source is turned OFF, and it is necessary to store the memory content in a non-volatile storage medium. On the other hand, when the weight functions and the signs thereof are already prepared through the learning process, it is unnecessary to carry out the learning process and it is simply necessary to write the prepared weight functions and the signs thereof in the memory. For this reason, it would be useful if an access to the memory content can be freely made from the outside.

Figure 49:
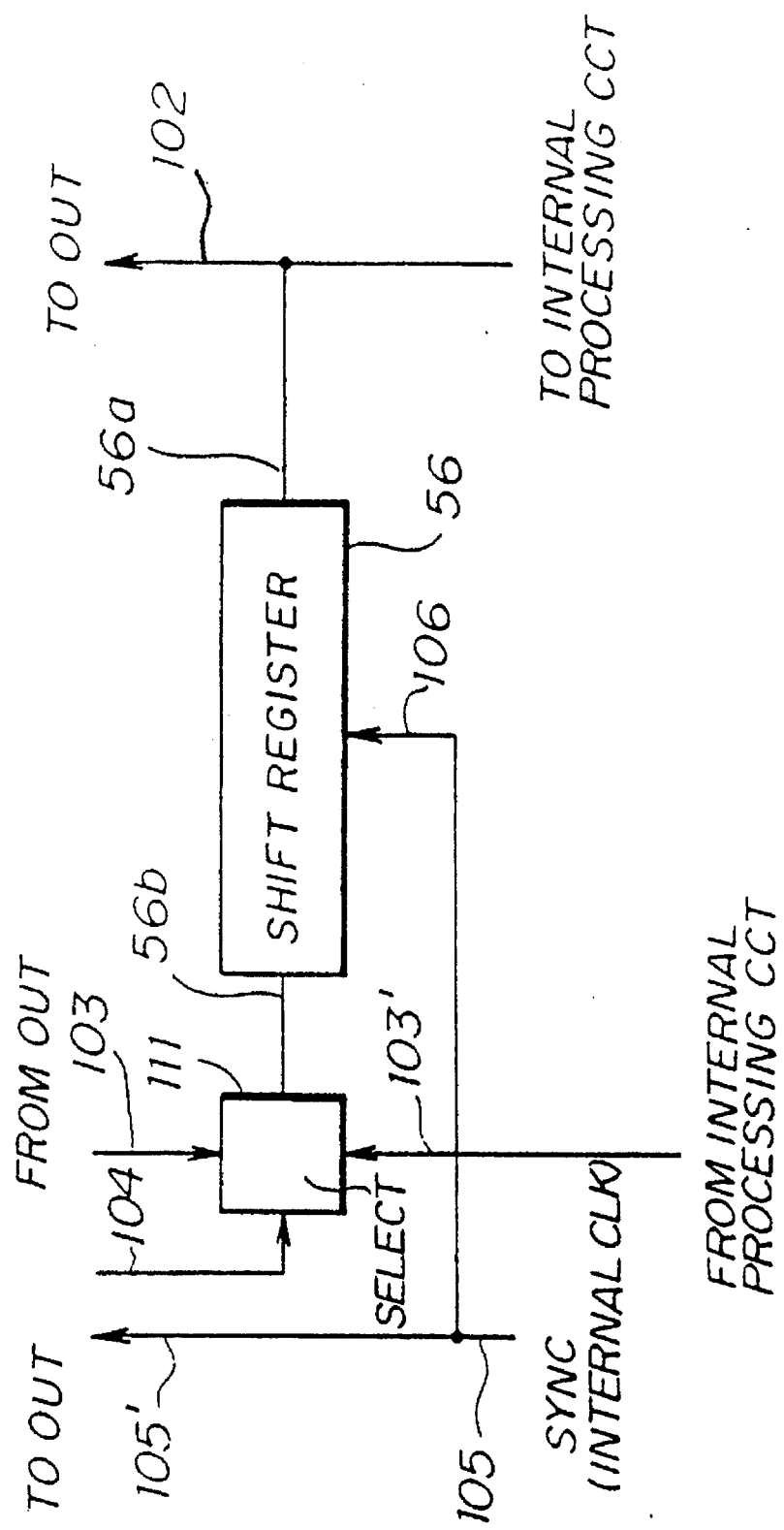
FIGS. 49 through 51 are system block diagrams respectively showing essential parts of a sixth embodiment of the neuron unit according to the present invention.
Figure 50:
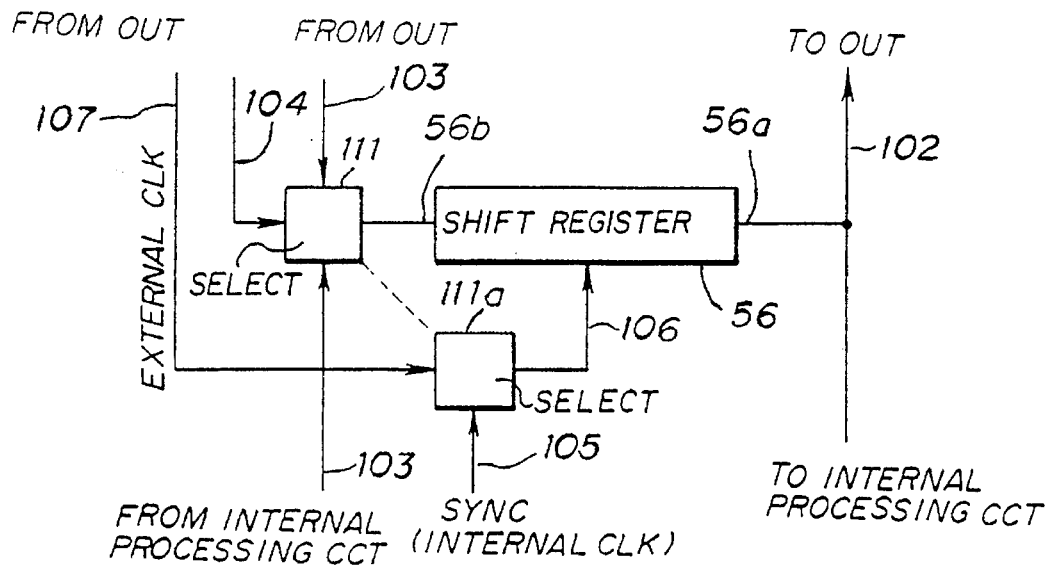
Figure 51:
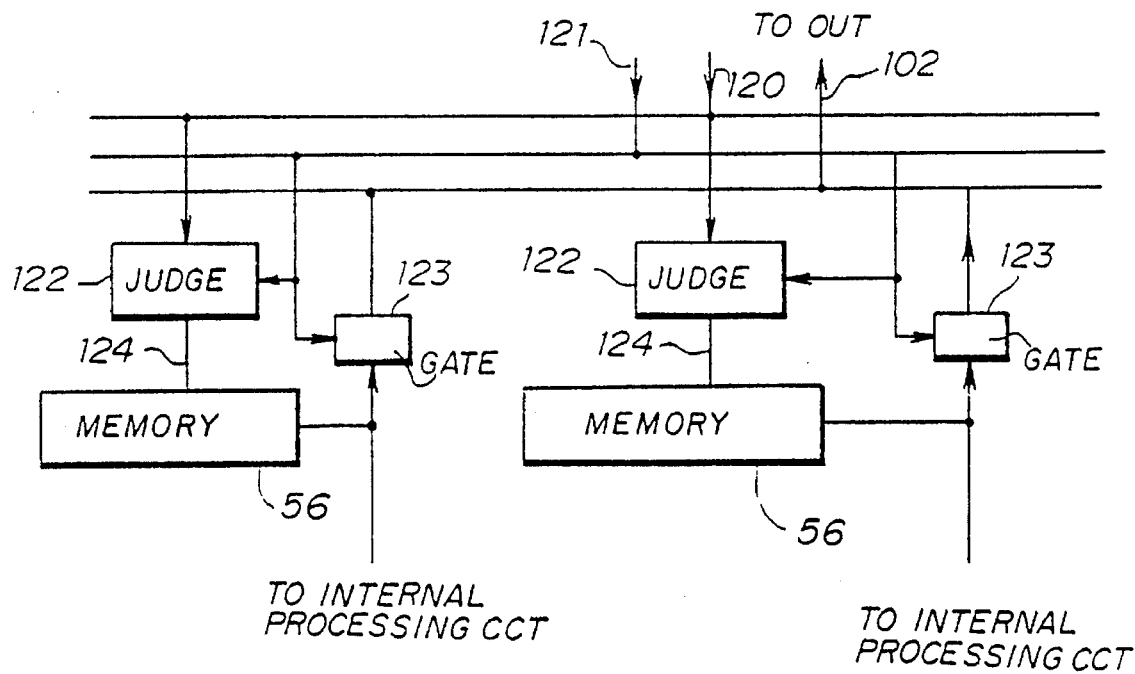

Next, a description will be given of a sixth embodiment of the neuron unit according to the present invention, in which an access to the memory content can be made from the outside. FIGS. 49 through 51 respectively show essential parts of the sixth embodiment.

In FIG. 49, an output signal 102 which is output from the output 56a of the shift register 56 to the outside. The input 56b of the shift register 56 uses an external signal 103 when reading or writing from the outside, and uses an internal signal 103' when not reading or writing from the outside. Hence, a selector 111 is provided to selectively supply one of the signals 103 and 103' to the shift register 56 depending on an external signal 104. A clock signal 106 is used to shift the content of the shift register 56, and an internal synchronizing signal (clock) 105 is used as it is as the clock signal 106. This internal synchronizing pulse 105 is output to the outside as a clock signal 105'. An external circuit (not shown) may control the read and write with respect to the shift register 56 in synchronism with the clock signal 105'.

Alternatively, it is possible to apply an external clock signal 107 to a selector 111a which also receives the internal synchronizing pulse 105, as shown in FIG. 50. The selector 111a selectively supplies the external clock signal 107 or the internal synchronizing pulse 105 to the shift register 56, and this selector 111a is controlled similarly to the selector 111.

When a combination of a RAM and an address decoder is used in place of the shift register 56, becomes possible to make a random access to the RAM from the external circuit by connecting an address bus, a data bus and a control signal line for read/write control signals to the external circuit. In the case of a memory having two ports, one port can be used for the read/write from the external circuit and the other port can be used for the internal processing. In the case of a memory having one port, the line from the internal address decoder is switched to the address bus and the like when making the access from the external circuit. This may be achieved by replacing the lines for the signals 105, 106 and 107 by the address bus and the control signal line for the read/write control signals.

Next, a description will be given of a case where the read/write with respect to a plurality of memories is carried out by use of a common bus, by referring to FIG. 51. In FIG. 51, only essential parts of FIGS. 49 and 50 are shown.

First, an address is assigned to each memory 56. A judging circuit 122 is connected to each memory 56 and judges whether or not an address received from the external circuit matches the address assigned to the memory 56. Each memory 56 is selected depending on a judgement result 124 output from the judging circuit 122. When making the read/write with respect to the memory 56, an address signal 120 which designates an arbitrary one of the memories 56 is supplied to the judging circuits 122, so that only the arbitrary memory 56 is read/write enabled.

When the memory 56 has only one port, an external signal 121 from the external circuit is used to indicate whether or not the read/write is to be made. On the other hand, all of the memories 56 are selected when no read/write is to be made. Further, a gate circuit 123 is provided to prevent the data from being supplied to the common bus for external read/write.

When realizing this embodiment by the hardware described above, it is possible to provide the entire hardware within one computer or provide only a portion of the hardware within the computer. In addition, hardware portions having independent functions may be combined to form the entire hardware.

Next, a description will be given of a seventh embodiment of the neuron unit according to the present invention. In addition to the fundamental rules [1] through [6] described above, this embodiment realizes the neuron unit by use of digital circuits according to the following additional rules [7D] and [8D].

[7D] When carrying out the learning process, the input signal and the teaching signal are stored in a memory so as to facilitate the operation of the operator.

[SD] When carrying out the learning process under the rule [7D], the learning rate is judged from the error in the final resulting output, and the judgement of the learning is made by the neural network itself.

It is assumed for the sake of convenience that the neuron units are connected as shown in FIG. 2 to form the neural network, and that this neural network learns from the teacher.

In order for the neural network to learn, it is necessary to prepare input signals which are input to the input layer and a desired resulting output, that is, a teaching signal which is output from the output layer. In FIG. 2, the input layer is made up of the neuron units on the left, and the output layer is made up of the neuron units on the right.

Immediately after a system such as a character recognition system applied with the neural network is started, that is, before the learning takes place, the weight functions of the neuron units are set at random. For this reason, the resulting output in most cases does not become the desired value with respect to the input signal. Hence, each weight function is varied as described above by applying to the neural network the teaching signal which corresponds to the input signal. Generally, the neural network has many input and output signals. Thus, the input signal and the teaching signal respectively are rarely one, and a group of input signals and a group of teaching signals usually exist. In addition, the learning is not ended by varying the weight functions once, and the learning process is usually carried out several tens of times to several thousands of times or more. As a result, there is a great burden on the operator in this respect.

Accordingly, this embodiment provides a memory for storing the input signal data and the teaching signal data, so that the inputting of the various data during each learning process and the learning process as a whole are simplified, thereby reducing the burden on the operator.

Particularly, groups of appropriate input signal data suited for the learning process and corresponding group of teaching signal data are prepared beforehand. At least one group of input signal data and at least one group of teaching signal data are stored in an external memory which is coupled externally to the neural network. The data stored in the external memory are stored in the form of pulse trains so as to match the form of the input signals to the neural network. Alternatively, it is also possible to store the data in the external memory in the form of numerical values and convert the numerical values to corresponding pulse trains when needed. Each group of input signal data has a corresponding group of teaching signal data, and such corresponding groups are read out from the external memory.

After the above described preparation, the operator instructs the neural network to carry out the learning process. Responsive to the learning instruction, the neural network reads out the corresponding groups of input signal data and teaching signal data from the external memory, and applies the input signal data to the neuron units in the input layer of the neural network. Then, the neural network carries out the forward process described above, the operation result is obtained from the neuron units in the output layer of the neural network. The teaching signal data which are read out from the external memory is then supplied to the neural network so that the neural network can carry out the learning process. Other groups of input signal data and teaching signal data are successively read out from the external memory and the process of supplying the input signal data to the input layer and supplying the teaching signal data to the neural network is repeated if needed. The end of the learning process can be controlled by providing a counter and counting the number of learning processes which are carried out. By appropriately changing the corresponding groups of input signal and teaching signal data which are used for the learning process depending on the counted value in the counter, it is possible to realize an efficient learning process. It is not essential to read out the teaching signal data from the external memory simultaneously as the reading out of the input signal data, and the teaching signal data need only be supplied to the neural network by the time the learning process of the neural network starts.

The learning process can also be controlled as follows in order to realize an efficient learning process. That is, the resulting output from the neural network is compared with the teaching signal data, and it is judged that the neural network has sufficiently learned and the learning process is ended when the error between the resulting output and the teaching signal data becomes less than a predetermined value. This judgement can be realized with ease by comparing and carrying out an operation on the resulting output of the neural network and the teaching signal data when supplying the teaching signal data to the neuron units in the neural network. Furthermore, a counter may be provided similarly as described above, and stop the learning process when the error does not become less than the predetermined value after carrying out a predetermined number of learning processes. In this case, it is possible to reset the data for learning and carry out the learning process again, and this method is extremely effective when E in the equation (4) is trapped at a local minimum, for example.

Figure 52:
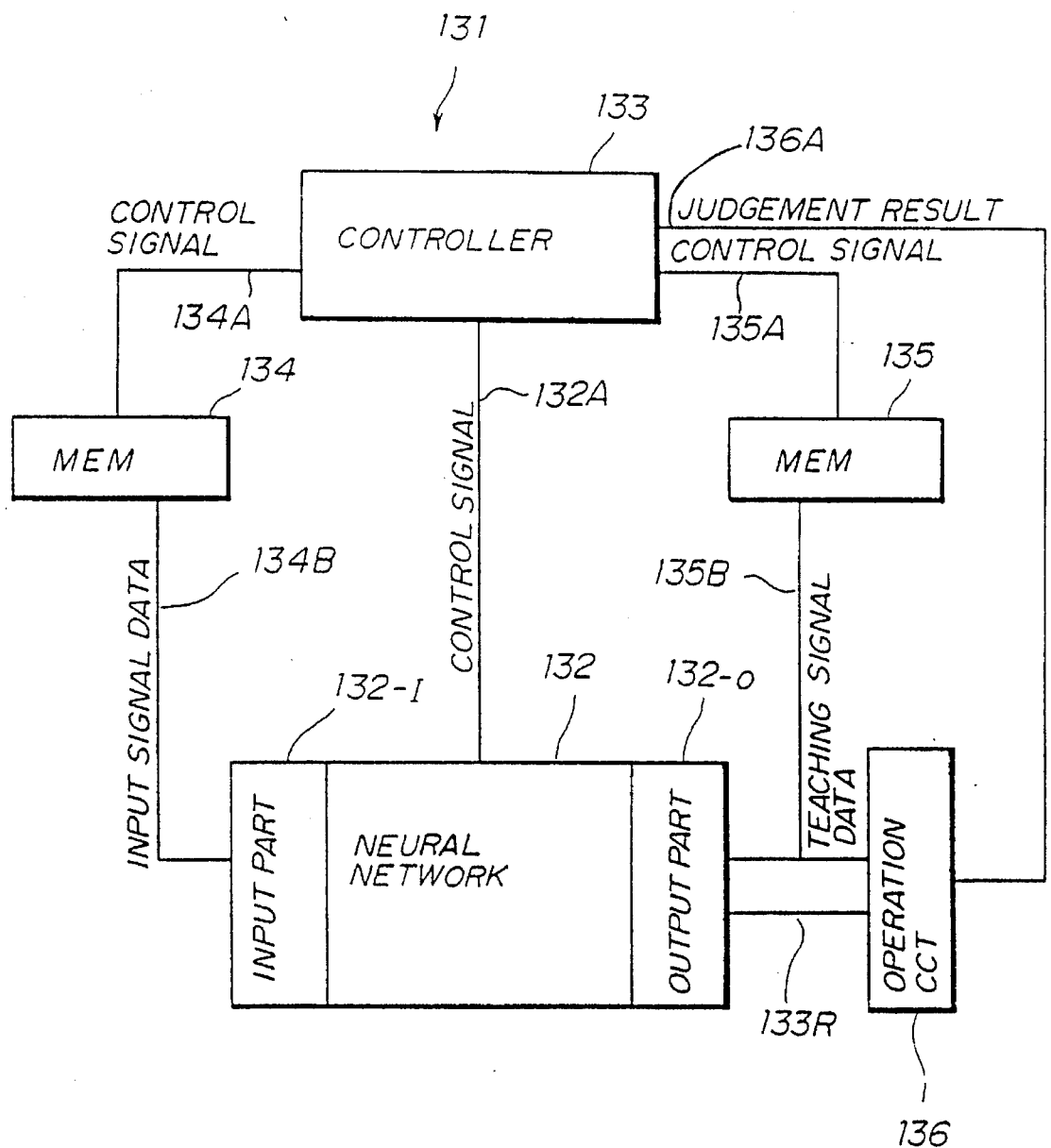
FIG. 52 is a system block diagram showing a seventh embodiment of the present invention.

FIG. 52 shows the seventh embodiment of the present invention applied to the neural network. A system 131 shown in FIG. 52 includes a hierarchical neural network 132, a controller 133, a memory 134 for storing the input signal data, a memory 135 for storing the teaching signal data, and an operation circuit 136. The necessary data are prestored in the memories 134 and 135. The operation circuit 136 receives a resulting output 132R of the neural network 132 and a teaching signal data 135B, and carries out a comparison and a judgement which will be described hereunder.

When the operator instructs the learning process to the controller 133, the controller 133 outputs control signals 132A, 134A and 135A. The memory 134 inputs an input signal data 134B to an input part 132-I of the neural network 132 responsive to the control signal 134A and the memory 135 inputs a teaching signal data 135B to an output part 132-O of the neural network 132 responsive to the control signal 136A. The neural network 132 starts the learning process responsive to the control signal 132A. The controller 133 includes a circuit for storing the number of learning processes carried out. When the number of learning processes reaches a predetermined number, the controller 133 ends the learning process of the neural network 132 by supplying the control signal 132A. The appropriate data are selectively read out from the memories 134 and 135 and input to the neural network 132 responsive to the control signals 134A and 135A depending on each stage of the learning process.

The learning process may be ended by use of the operation circuit 136. Particularly, the resulting output 132R of the neural network 132 and the teaching signal data 135B are compared, and an error is input to the controller 133 as a judgement result 136A. The controller 133 ends the learning process when the judgement result 136A is less than a predetermined value, but otherwise continues the learning process. Alternatively, the operation circuit 136 may judge whether the learning process is to be ended or continued, and in this case, the operation circuit 136 inputs the judgement result to the controller 133 as the judgement result 136A. Furthermore, in these two cases, the operation circuit 136 may be included within the controller 133. In addition, the learning process of the neural network 132 may be controlled by using a combination of the judgement result 136A and the number of learning processes carried out which is stored within the controller 133.

Of course, the operations of parts of the system 131 may be carried out by a computer.

Next, a description will be given of an eighth embodiment of the present invention. In addition to the fundamental rules [1] through [6] described above, this embodiment realizes the neuron unit by use of digital circuits according to the following additional rule [7E].

[7E] The length of the pulse train, that is, the data length, which describes the weight function is made variable, so as to improve the calculation accuracy of the neural network.

Figure 53:
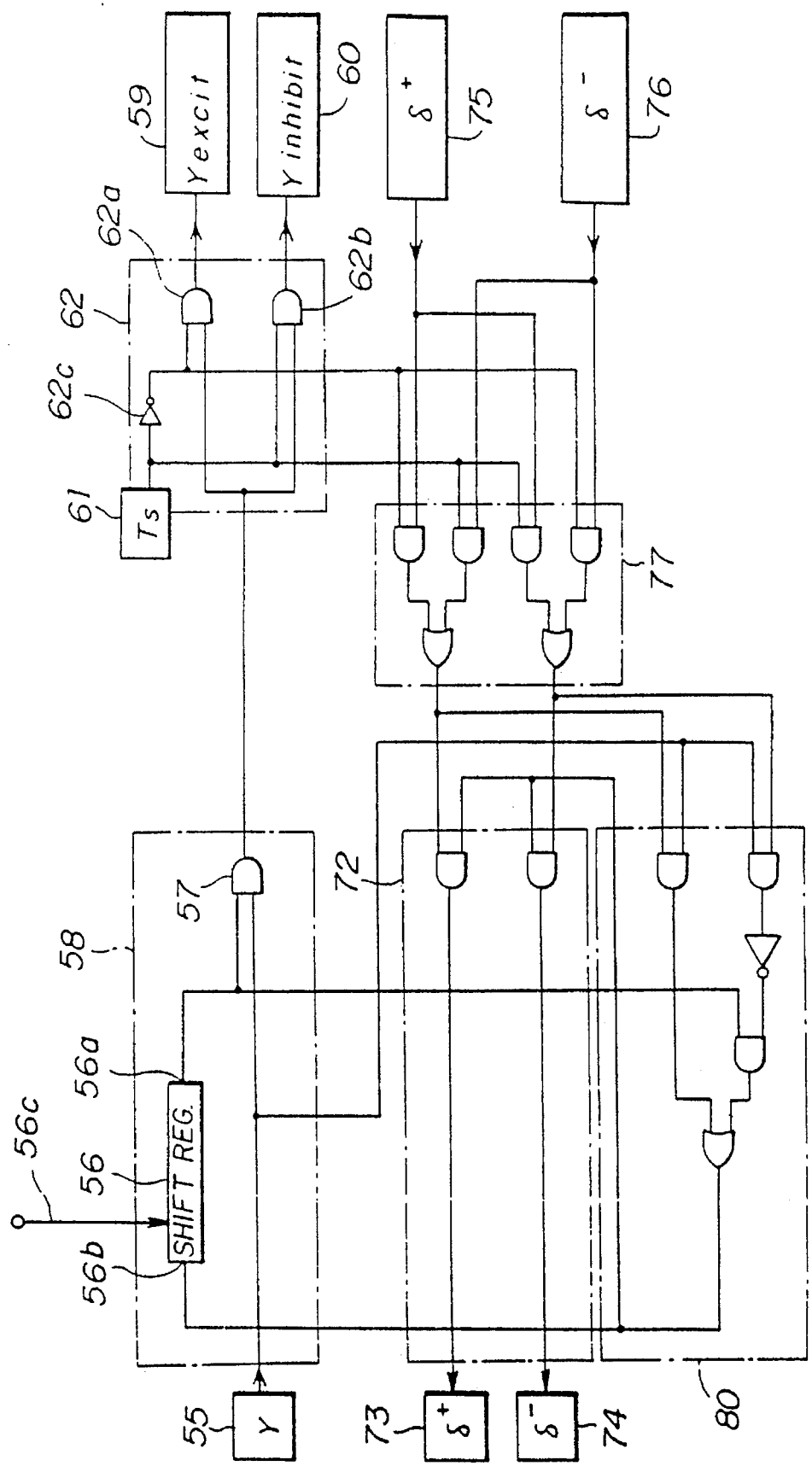
FIG. 53 is a circuit diagram showing an essential part of an eighth embodiment of the present invention.

FIG. 53 shows an essential part of the eighth embodiment. In FIG. 53, those parts which are the same as those corresponding parts in FIG. 38 are designated by the same reference numerals, and a description thereof will be omitted.

In FIG. 53, the pulse density of the output signal of the AND circuit 57 is approximately the product of the pulse density of the input signal and the pulse density of the weight function, and the AND circuit 57 functions similarly as when obtaining a logical products of signals in the analog system. The pulse density of the output signal of the AND circuit 57 more closely approximates the product of the pulse densities of the two signals applied thereto when the pulse trains of the two signals are longer and when the "0"s and "1"s are arranged more at random in the pulse trains. The "0"s or "1"s are concentrated when the "0"s or "1"s are not arranged at random.

Accordingly, by making the length of the pulse train (data length) of the weight function variable and setting the length of the pulse train depending on the circumstances, it is possible to arrange the "1"s and "0"s more at random. Especially when the pulse train of the weight function is short compared to the pulse train of the input signal and no more data can be read as the weight function, the read out can return to the beginning of the pulse train of the weight function and repeat such a read out depending on the length of the pulse train of the input signal.

Figure 54:
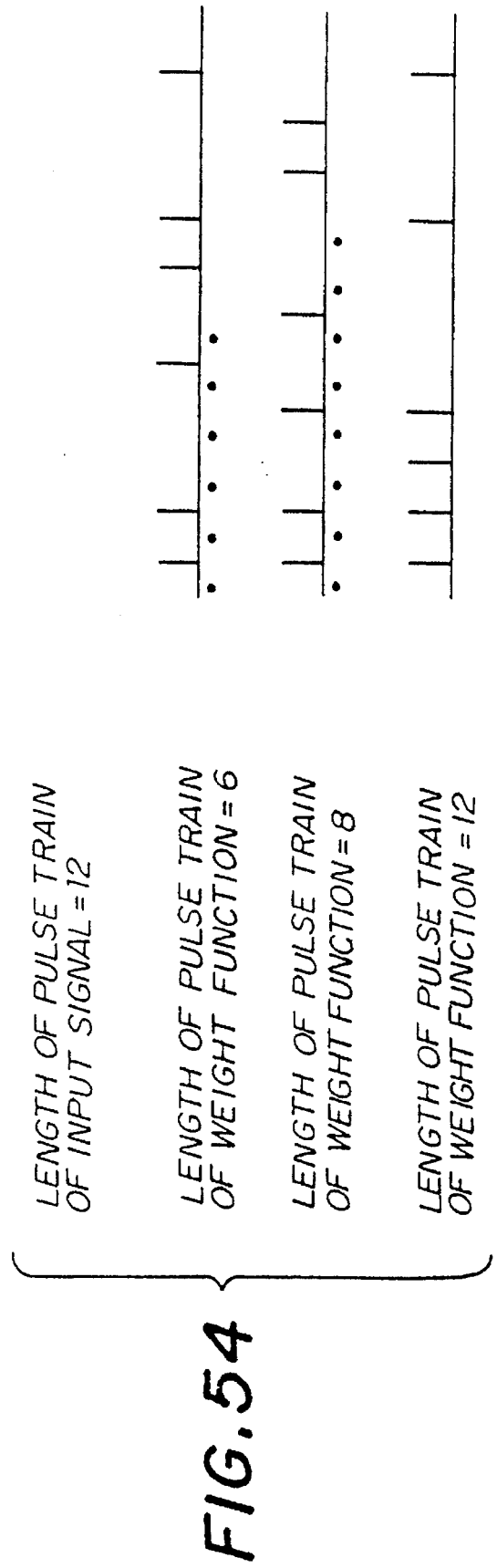
FIG. 54 is a diagram for explaining pulse sequences for indicating the same weight function.

FIG. 54 shows a case where the length of the pulse train of the input signal is 12 and the weight function is 6/12 for three cases, that is, a case where the length of the pulse train of the weight function is 6, a case where the length of the pulse train of the weight function is 8 and a case where the length of the pulse train of the weight function is 12. In the case where the length of the pulse train of the weight function is 6, the length of the pulse train of the weight function is repeated once, that is, the total length of the pulse train of the weight function is shifted once, to match the length of the pulse train of the input signal. In the case where the length of the pulse train of the weight function is 8, the length of the pulse train of the weight function is repeated 0.5 times, that is, 0.5 times the total length of the pulse train of the weight function is shifted once, to match the length of the pulse train of the input signal. It may be readily seen from FIG. 54 that although the weight function is 6/12 for the three cases, the random nature of the pulse train of the weight function improves when the length thereof is varied by repeating the same pulse trains to match the length of the pulse train of the input signal. When the random nature of the pulse train is improved, it is possible to improve the calculation accuracy of the neural network as a whole.

In FIG. 53, a control signal 56c is supplied to the shift register 56 from an external circuit such as a control circuit, so as to control the bit length of the data to be shifted. As a result, it is possible to make the length of the pulse train (data length) of the weight function variable.

Next, a description will be given of a ninth embodiment of the present invention. In addition to the fundamental rules [1] through [6] described above, this embodiment realizes the neuron unit by use of digital circuits according to the following additional rule [7F].

[7F] In the neural network, the input and output signals can be processed in analog signal form.

As described above, the signals processed in the neural network are digital signals, that is, pulse trains. Hence, in order to input analog signals to the neural network, the analog data are converted into pulse trains which contain information in the form of pulse densities. The conversion may be realized by providing a converting unit at the input signal input part of each neuron unit belonging to the input layer of the neural network and providing a converting unit at the teaching signal input part of each neuron unit belonging to the output layer of the neural network.

Figure 55B:
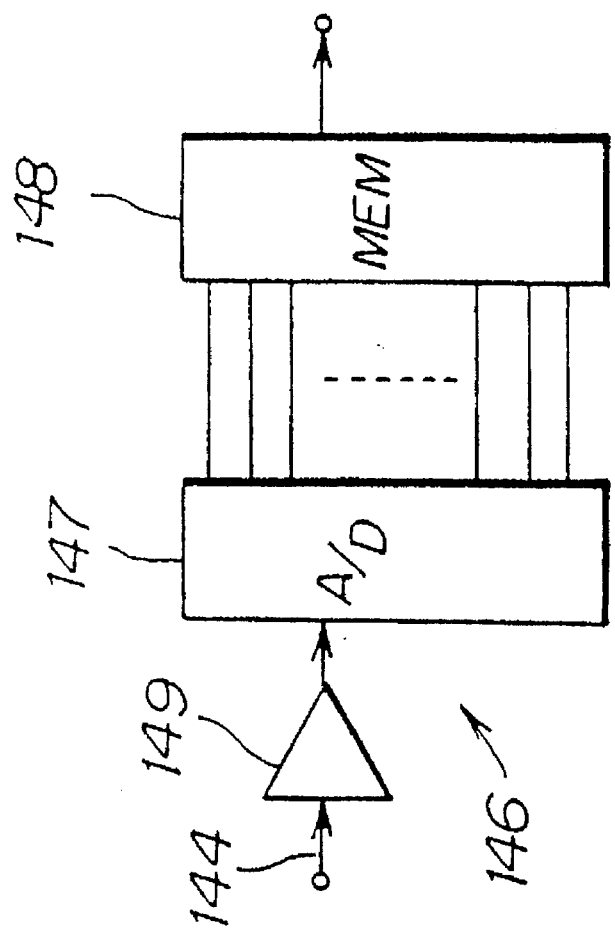
FIGS. 55A and 55B respectively are circuit diagrams showing an essential part of a ninth embodiment of the present invention for explaining an analog-to-digital conversion.
Figure 55A:
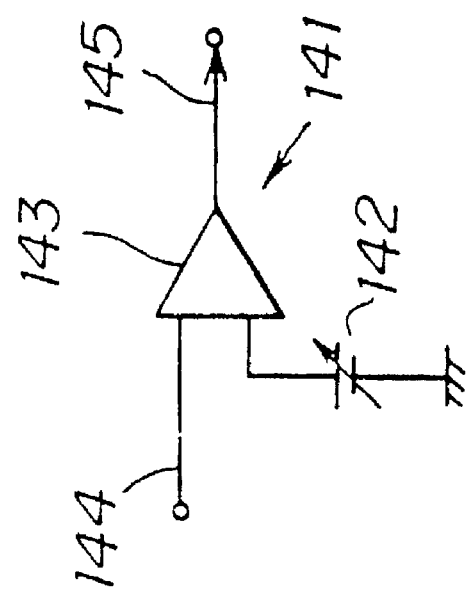

As a first method of analog-to-digital (A/D) conversion, it is possible to use a circuit 141 shown in FIG. 55A. A comparator 143 of the circuit 141 compares an input signal (analog voltage) 144 with a thermal noise (voltage) 142 of a transistor or the like, and outputs a signal 145 which is supplied to the neuron unit belonging to the input layer of the neural network. The thermal noise 142 is supplied to the comparator 143 as a random number. Hence, the signal 145 output from the circuit 141 is a pulse train which is proportional to the input signal 144 and in which the pulses exist at random intervals.

As a second method of A/D conversion, it is possible to use a circuit 146 shown in FIG. 55B. The circuit 146 includes an amplifier 149, an A/D converter 147 and a memory 148. The memory 148 prestores pulse train data corresponding to various input values. The input signal (analog voltage) 144 is supplied to the A/D converter 147 via the amplifier 149, and a binary output data of the A/D converter 147 is supplied to the memory 148 as an address signal. Based on the address signal, the prestored pulse train data which corresponds to the input signal value is read out from the memory 148 and is supplied to the neuron unit belonging to the input layer of the neural network. Of course, it is possible to omit the amplifier 149.

As a third method of A/D conversion, it is possible to convert an output of the A/D converter into a serial pulse train using a known pseudo random pulse generating circuit (not shown).

Similarly as in the case of the input signals to the neural network, the output signals of the neural network are also pulse trains containing information in the form of pulse densities. Hence, in order to output analog signals from the neural network, the pulse trains (digital data) are converted into analog signals. The conversion may be realized by providing a converting unit at the signal output part of each neuron unit belonging to the input layer of the neural network.

As a first method of digital-to-analog (D/A) conversion, it is possible to use a circuit 150 shown in FIG. 56A. The circuit 150 includes a counter 151, a D/A converter 152 and an amplifier 154. The counter 151 counts the number of pulses received from the neuron unit belonging to the output layer of the neural network and outputs the counted value as a binary data. The binary data is converted into an analog signal 153 by the D/A converter 152 and is amplified by the amplifier 154. The pulses received from the neuron unit belonging to the output layer of the neural network are generated at random time intervals, and thus, when these pulses are supplied to the counter 151 only during reference time intervals, the pulse train which contains the information in the form of the pulse density can be converted into the binary data which indicates the same information. Normally, this converting operation is repeated. Of course, the amplifier 154 may be omitted.

As a second method of D/A conversion, it is possible to use a circuit 155 shown in FIG. 56B. The circuit 155 includes a frequency-to-voltage (F/V) converter 156 and the amplifier 154. The F/V converter 156 generates an output voltage 153 which is dependent on the frequency of the pulses received from the neuron unit belonging to the output layer of the neural network, that is, dependent on the pulse density. The output voltage 153 of the F/V converter 156 is amplified by the amplifier 154. Since the pulse density of the pulse train corresponds to a kind of frequency modulation, the corresponding analog signal (voltage) 153 can easily be obtained by use of the F/V converter 156 which is a generally available element. Again, the amplifier 154 may be omitted.

As a third method of D/A conversion, it is possible to use a circuit 157 shown in FIG. 56C. The circuit 157 includes a driving circuit 158 and an LED 159. The pulses received from the neuron unit belonging to the output layer of the neural network are supplied to the LED 159 via the driving circuit 158. Thus, when the reference clock has a sufficiently high frequency, the brightness of the LED 159 becomes proportional to the pulse density of the pulse train. In this case, it is possible to visually and directly detect the resulting output of the neural network. Hence, this third method facilitates the transmission of the resulting output in the form of an optical signal.

Figure 57:
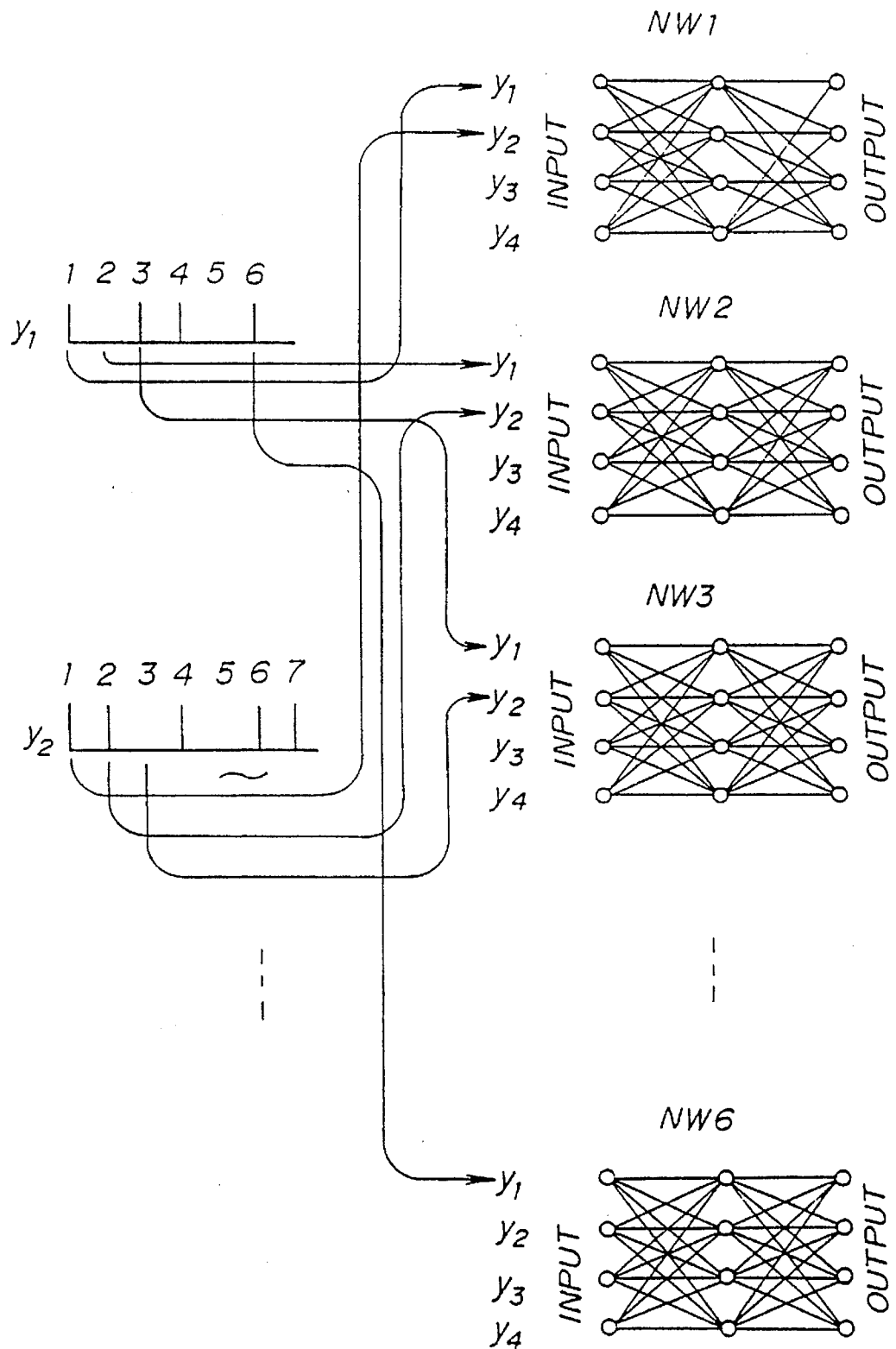
FIG. 57 is a system block diagram showing a tenth embodiment of the present invention.

Next, a description will be given of a tenth embodiment of the present invention. In this embodiment, a neural network is formed by a plurality of neuron units such as those of the embodiments described above. A plurality of such neural networks are then connected to form a large neural network as shown in FIG. 57. In this embodiment, six neural networks NW1 through NW6 are connected to form the large neural network, and the six neural networks NW1 through NW6 receive corresponding bits of input signals y1 through y6. In other words, the number of neural networks which are connected is equal to the number of bits of the input signals.

Next, a description will be given of a case where the above described large neural network is applied to a self-learning type character recognition system. The first layer of the neural network includes 256 neuron units, the second layer includes 20 neuron units and the third layer includes five neuron units. First, a hand-written character shown in FIG. 19 is read by a scanner, and the read image is divided into 16×16 meshes. The data in each mesh is then applied to each neuron unit of the first layer in the neural network. For the sake of convenience, the data of a mesh which includes a portion of the character is taken as "1" while the data of a mesh which includes no portion of the character is taken as "0". The output of the neural network is connected to an LED so that the resulting output is directly displayed on the LED. Out of the five neuron units of the third layer, the neuron unit which outputs the largest output is assumed to output the recognition result. The learning takes place so that when the numbers "1" through "5" are input to the neural network, the five neuron units of the third layer respectively corresponding to the numbers "1" through "5" output the largest output. In other words, when the number "1" is input, the neuron unit of the third layer corresponding to the number "1" outputs the largest output.

Each input signal data is made up of 128 bits. Hence, 128 identical neural networks were connected to form the large neural network.

Initially, when each weight function is set at random, the resulting output is not necessarily the desirable value. Hence, the self-learning function is used to newly obtain each weight function, and such renewal of each weight function is repeated a predetermined number of times until the desired value is obtained as the resulting output. In this embodiment, the input signal is "0" or "1", and the input pulse train is simply made up of low-level and high-level pulses. The LED is turned ON when the output signal has the high level and is turned OFF when the output signal has the low level. Since the synchronizing pulses (clock) has a frequency of 1000 kHz, the brightness of the LED appears to change to the human eyes depending on the pulse density. Hence, the LED which appears to be the brightest corresponds to the answer, that is, the recognition result. With respect to a character after sufficient learning, the recognition rate was 100%.

In the embodiments described above, the neural network carries out parallel processing. However, as the scale of the neural network becomes large, it becomes difficult to actually produce the required circuits which form the neural network. But if one neuron unit were to have the functions of a plurality of neuron units, it would be possible to reduce the scale of the entire neural network.

Next, a description will be given of an eleventh embodiment of the present invention in which one neuron unit has the functions of two neuron units within the same layer of the neural network.

FIG. 58 shows two neuron units 161 and 162. The neuron units 161 and 162 respectively receive input signals 164 and 165 for the forward process and respectively output output signals 166 and 167 of the forward process. Error signals 170 and 171 are propagated from an immediately next layer of the neural network, and error signals 168 and 169 are back-propagated to an immediately preceding layer of the neural network. Actually, each signal is received via a plurality of signal lines.

Figure 59:
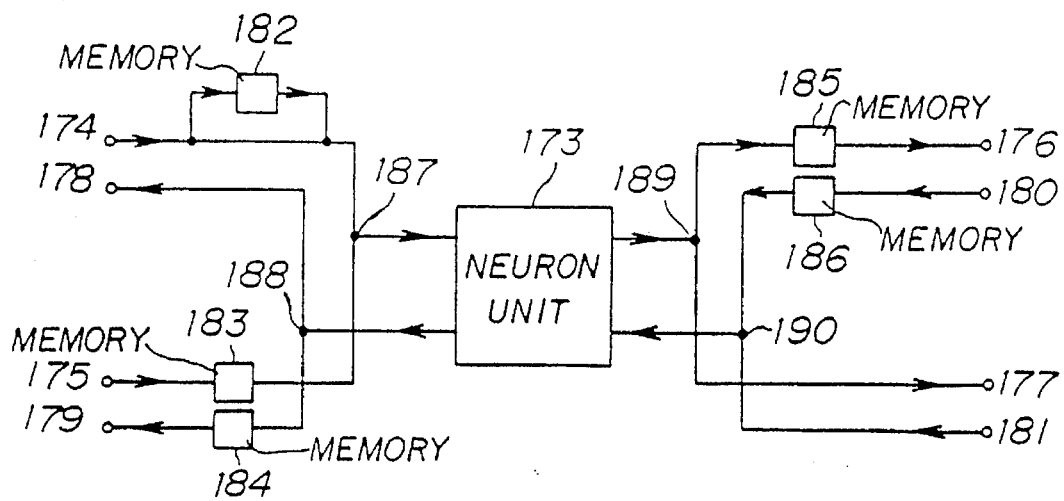
FIGS. 59 through 62 respectively are system block diagrams for explaining an operation of an eleventh embodiment of the present invention.

FIG. 59 is a diagram for explaining a first method of realizing the functions of the two neuron units 161 and 162 shown in FIG. 58 by a single neuron unit 173. In FIG. 59, those signals which are the same as those corresponding signals in FIG. 58 are designated by the same reference numerals, and a description thereof will be omitted.

Figure 60:
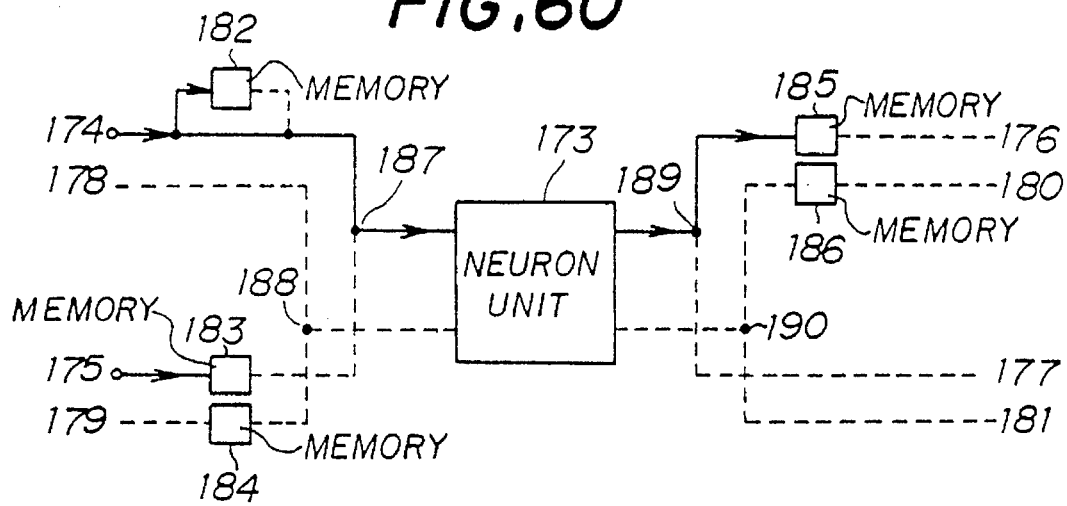

Next, a description will be given of the circuit shown in FIG. 59 by referring to FIGS. 60 through 62. First, the input signals 174 and 175 are input and stored in respective memories 182 and 183. The neuron unit 173 carries out an operation on the input signal 174 and stores an output signal in a memory 185. As a result, the forward process with respect to the input signal 174 ends.

Figure 61:
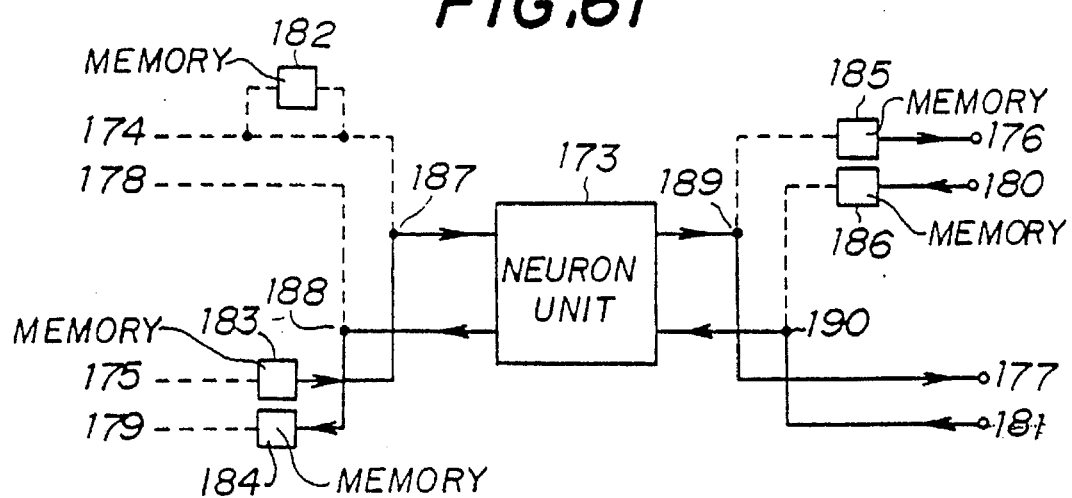
Figure 62:
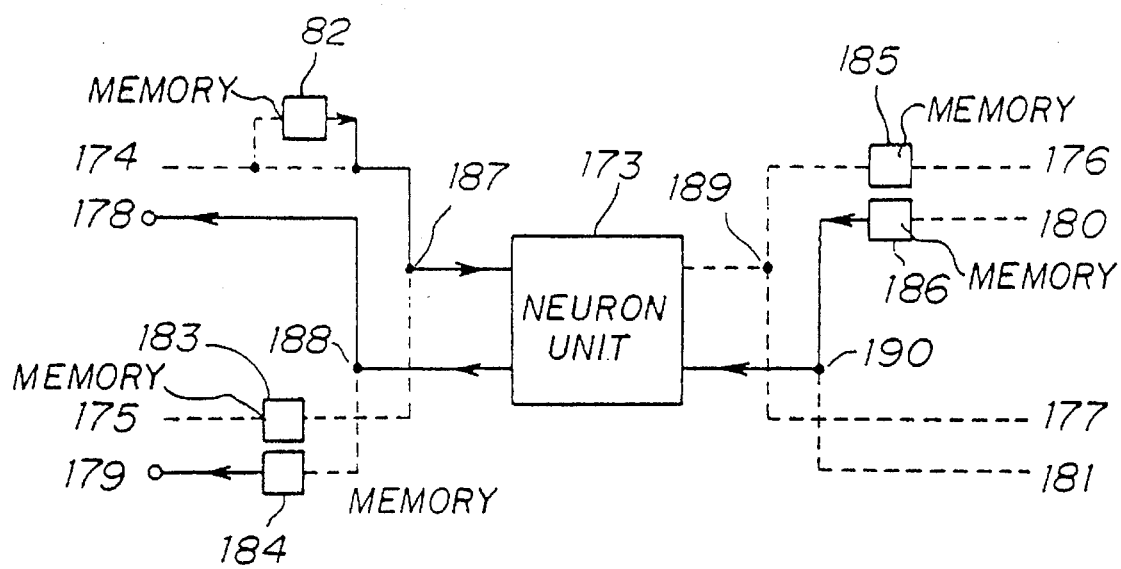

Next, as shown in FIG. 61, the input signal 175 which is stored in the memory 183 is read out and supplied to the neuron unit 173. The neuron unit 173 thus carries out an operation on the input signal 175 and outputs the output signal 177. At the same time, the neuron unit 173 outputs the output signal 176 which is stored in the memory 185. Therefore, the output signals 176 and 177 which respectively are the results of the operations carried out on the input signals 174 and 175 are output as the results of the forward process.

An operation is carried out in the immediately next layer of the neural network based on the output signals 176 and 177, and the error signals 180 and 181 are eventually back-propagated. First, the back-propagated error signal 180 is stored in a memory 186. The back-propagated error signal 181 is supplied to the neuron unit 173 which carries out an operation thereon, and an error signal which is output from the neuron unit 173 is stored in a memory 184. Next, the error signal 180 which is stored in the memory 186 and the input signal 174 which is stored in the memory 182 are read out simultaneously and supplied to the neuron unit 173 which carries out an operation thereon. Thus, the neuron unit 173 outputs the error signal 178, and the error signal stored in the memory 184 is output as the error signal 179, thereby ending the operation of the neuron unit 173.

The line to which the signal is to be output and the line from which the signal is to be input may be appropriately selected by providing a switch or the like on each of lines 187 through 190 which are connected to the neuron unit 173.

Figure 63:
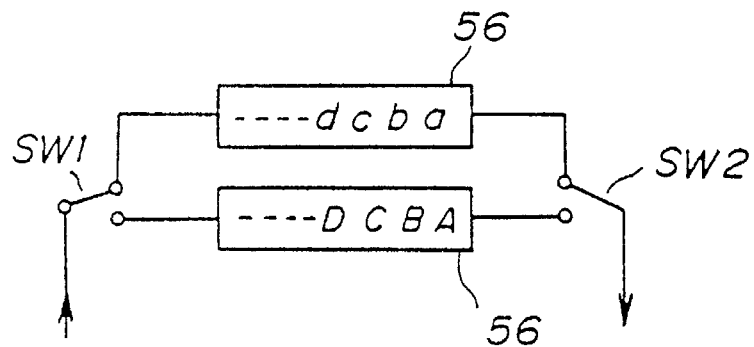
FIGS. 63 and 64 respectively are system block diagrams for explaining methods of storing the weight function and its sign.
Figure 64:
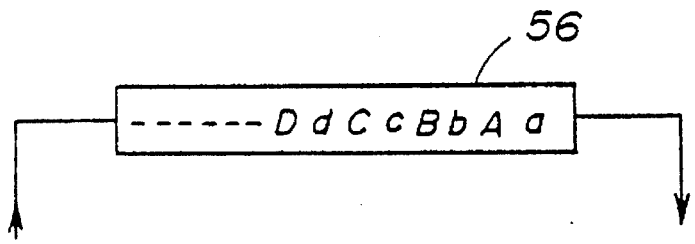

Next, a description will be given of the weight function and its positive or negative sign which are stored in the neuron unit. It is possible to independently store the weight function and its sign in the respective memories as shown in FIG. 63 by switching switches SW1 and SW2. On the other hand, it is possible to store both the weight function and its sign in the same memory 56 as shown in FIG. 64.

The memory 185 described above is provided to simultaneously output the output signals 176 and 177. Hence, the memory 185 may be omitted when it is unnecessary to simultaneously output the output signals 176 and 177. The memory 184 is provided to simultaneously output the error signals 178 and 179 which are to be back-propagated to the immediately preceding layer of the neural network. Thus, the memory 184 may be omitted similarly when it is unnecessary to simultaneously output the error signals 178 and 179.

The memory 183 is provided to temporarily store the input signals 174 and 175 which are received simultaneously. Hence, when the input signal 175 does not change in the states shown in FIGS. 60 and 62, it is possible to omit this memory 183. The memories 182 and 186 may be omitted for similar reasons.

In the described embodiment, the single neuron unit has the functions of two neuron units. However, it is of course possible for the single neuron unit to have the functions of three or more neuron units. In addition, the single neuron unit may have the functions of two or more neuron units which belong to different layers of the neural network. The circuitry required for the single neuron unit having such functions may be realized with ease using a general integrated circuits (ICs).

Next, a description will be given of a case where a neural network made up of the above described neuron units is applied to a self-learning type character recognition system. The first layer of the neural network includes 256 neuron units, the second layer includes 20 neuron units and the third layer includes five neuron units. First, a hand-written character shown in FIG. 19 is read by a scanner, and the read image is divided into 16×16 meshes. The data in each mesh is then applied to each neuron unit of the first layer in the neural network. For the sake of convenience, the data of a mesh which includes a portion of the character is taken as "1", while the data of a mesh which includes no portion of the character is taken as "0". The output of the neural network is connected to an LED so that the resulting output is directly displayed on the LED. Out of the five neuron units of the third layer, the neuron unit which outputs the largest output is assumed to output the recognition result. The learning takes place so that when the numbers "1" through "5" are input to the neural network, the five neuron units of the third layer respectively corresponding to the numbers "1" through "5" output the largest output. In other words, when the number "1" is input, the neuron unit of the third layer corresponding to the number "1" outputs the largest output.

Initially, when each weight function is set at random, the resulting output is not necessarily the desirable value. Hence, the self-learning function is used to newly obtain each weight function, and such renewal of each weight function is repeated a predetermined number of times until the desired value is obtained as the resulting output. In this embodiment, the input signal is "0" or "1", and the input pulse train is simply made up of low-level and high-level pulses. The LED is turned ON when the output signal has the high level and is turned OFF when the output signal has the low level. Since the synchronizing pulses (clock) has a frequency of 1000 kHz, the brightness of the LED appears to change to the human eyes depending on the pulse density. Hence, the LED which appears to be the brightest corresponds to the answer, that is, the recognition result. With respect to a character after sufficient learning, the recognition rate was 100%.

Figure 65:
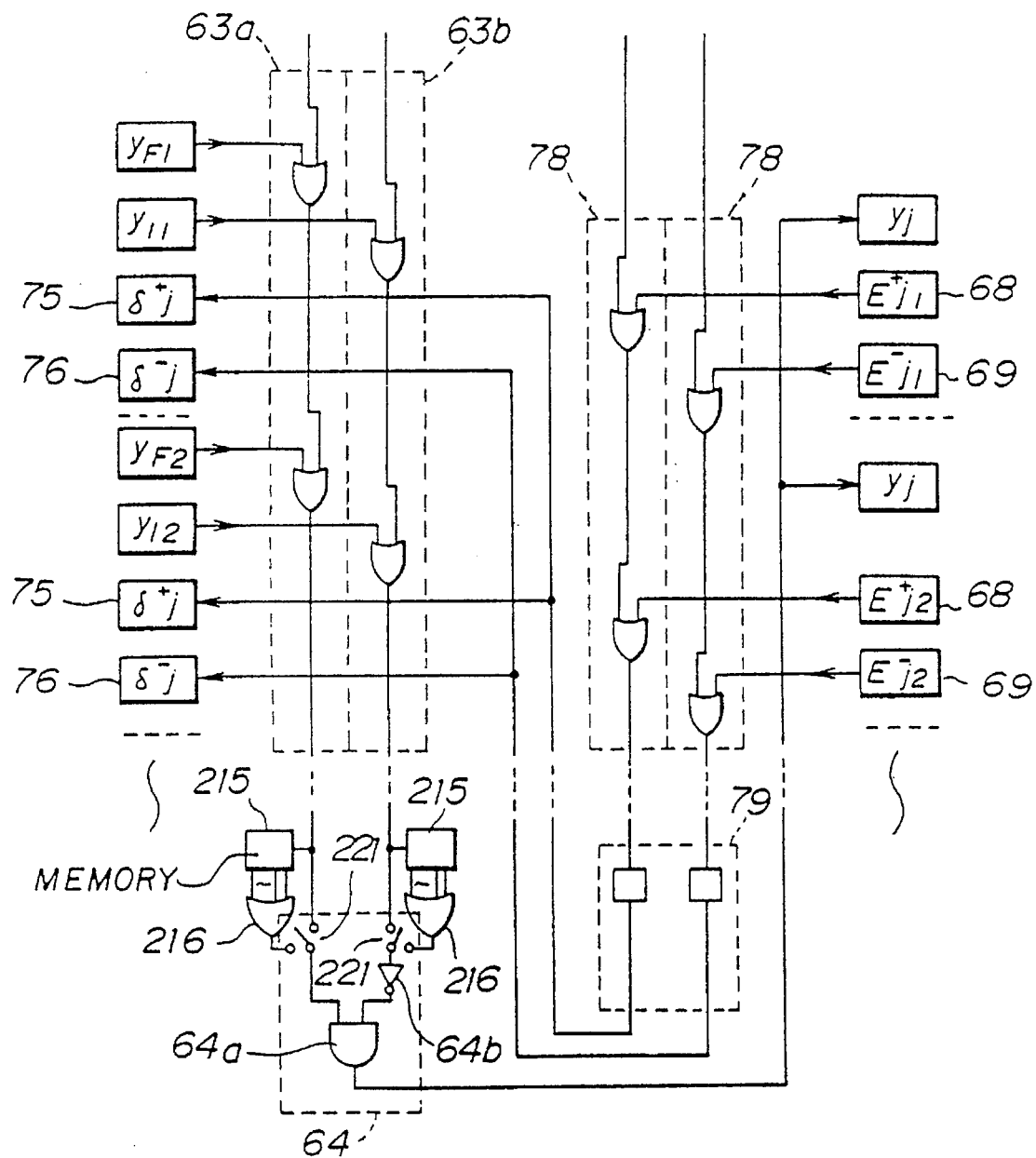
FIG. 65 is a circuit diagram showing an essential part of a twelfth embodiment of the present invention.

Next, a description will be given of a twelfth embodiment of the present invention. FIG. 65 shows an essential part of this embodiment. In FIG. 65, those parts which are the same as those corresponding parts in FIG. 39 are designated by the same reference numerals, and a description thereof will be omitted.

In FIG. 65, an OR circuit 216 corresponds to the process described above in conjunction with FIG. 24.

When carrying out the parallel processing, the number of input signals becomes extremely large and the interconnections of the neural network becomes extremely complex when making a character recognition or the like. Hence, this embodiment carries out serial processing with respect to a portion of the data, so that the number of interconnections is greatly reduced. In the case of a charge coupled device (CCD), for example, the data is read out serially for each line. Hence, it is more convenient in such a case to carry out the serial processing with respect to a portion of the data.

First, when calculating the outputs a and b described in conjunction with FIG. 25, the calculations can be carried out independently for the output $\underline{a}$ and the output b. In order to calculate the outputs $\underline{a}$ and b for 256 inputs, for example, the outputs $\underline{a}$ and b are first calculated for 64 inputs. The calculation of the outputs $\underline{a}$ and b for 64 inputs is successively performed four times, and the outputs $\underline{a}$ and b are finally obtained by taking an OR of the four outputs a and taking an OR of the four outputs b. This principle can be used to carry out the serial processing.

The outputs a and b which are obtained by the first process are stored in memories 215 shown in FIG. 65. The outputs $\underline{a}$ and b which are obtained by the second through fourth processes are similarly stored in the memories 215. After four outputs a are stored in one memory 215 and four outputs b are stored in the other memory 215, the four outputs $\underline{a}$ are read out in parallel from the one memory 215 and supplied to one OR circuit 216, and the four outputs b are read out in parallel from the other memory 215 and supplied to the other OR circuit 216. Hence, the calculation ends after four reference clock pulses. The serial processing becomes possible by thereafter carrying out the process $y_j = a \cap \overline{b}$ described in conjunction with FIG. 25 with respect to the outputs of the OR circuits 216. A shift register or the like may be used for the memory 215.

The output signal of the gate circuit 64 is supplied to the next layer of the neural network. However, since the output signal from the gate circuit 64 is supplied to the next layer after a plurality of clock pulses, the operation of the neuron units of the next layer must be delayed accordingly. It is possible to generate clock pulses which are obtained by frequency-dividing the reference clock pulses in a clock generator (not shown) and provide a switch or the like at the neuron unit so that each neuron unit may receive the reference clock pulse or the clock pulse. Alternatively, it is possible to provide a frequency divider within the neuron unit so that the clock pulses can be generated from the reference clock pulses within the neuron unit. In either case, a more general application of the neural network becomes possible when measures are taken so that the neuron unit can selectively receive the reference clock pulse or the clock pulse.

The pulse of the error signal is back-propagated only after the four serial processings end. However, the pulses of the input signal, the weight function and the sign of the weight function which are used for the forward process are required for the learning and back-propagation of the error signal. When the serial processing is carried out, the pulses corresponding to the first three processings are already read out when the operation is carried out on the pulse of the error signal, and it is necessary to again read out the pulses corresponding to the first three processings. Accordingly, after the forward process is carried out by the four serial processings, the first through 64th pulses are again input or read out from the memory and used for the operations necessary for the back-propagation of the error signal and the learning process. Thereafter, the operation is carried out on the next 65th through 128th pulses. The above described operation is repeated a total of four times before ending the operations on the 256 inputs.

As described above, the data used at the time of the forward process are used for the learning process. Thus, the data used at the time of the forward process may be stored in an independent memory and read out at the time of the learning process. Alternatively, a hold circuit may be provided with respect to the input signal which is received from the outside and an address decoder may be provided with respect to the weight function and the like stored in the memory for outputting the same address as the stored weight function, so that the data identical to that at the time of the forward process are input at the time of the learning process.

In addition, a switch 221 may be provided so that the circuit shown in FIG. 65 can be switched between two modes, that is, a mode in which the parallel processing is carried out as described in conjunction with FIG. 39 and a mode in which the serial processing is carried out. In order to input parallel data to the neural network which carries out the serial processing, a parallel-to-serial converter circuit is provided at the input of the neural network, and a known method such as the method using a shift register may be used to realize the parallel-to-serial converter circuit.

Next, a description will be given of a case where the above described neural network is applied to a self-learning type character recognition system. The first layer of the neural network includes 256 neuron units, the second layer includes 20 neuron units and the third layer includes five neuron units. First, a hand-written character shown in FIG. 19 is read by a scanner, and the read image is divided into 16×16 meshes. The data in each mesh is then applied to each neuron unit of the first layer in the neural network. For the sake of convenience, the data of a mesh which includes a portion of the character is taken as "1" while the data of a mesh which includes no portion of the character is taken as "0". The output of the neuron unit network is connected to an LED so that the resulting output is directly displayed on the LED. Out of the five neuron units of the third layer, the neuron unit which outputs the largest output is assumed to output the recognition result. The learning takes place so that when the numbers "1" through "5" are input to the neural network, the five neuron units of the third layer respectively corresponding to the numbers "1" through "5" output the largest output. In other words, when the number "1" is input, the neuron unit of the third layer corresponding to the number "1" outputs the largest output.

Initially, when each weight function is set at random, the resulting output is not necessarily the desirable value. Hence, the self-learning function is used to newly obtain each weight function, and such renewal of each weight function is repeated a predetermined number of times until the desired value is obtained as the resulting output. In this embodiment, the input signal is "0" or "1", and the input pulse train is simply made up of low-level and high-level pulses. The LED is turned ON when the output signal has the high level and is turned OFF when the output signal has the low level. Since the synchronizing pulses (clock) has a frequency of 1000 kHz, the brightness of the LED appears to change to the human eyes depending on the pulse density. Hence, the LED which appears to be the brightest corresponds to the answer, that is, the recognition result. With respect to a character after sufficient learning, the recognition rate was 100%.

In the embodiments described heretofore, it is assumed that the forward process and the learning process are both carried out by hardware, that is, circuits. However, these processes may be carried out by software, that is, by executing appropriate programs by a central processing unit (CPU).

Next, descriptions will be given of thirteenth through fifteenth embodiments of the present invention, by referring to FIGS. 66 through 68.

The neuron circuits shown in FIGS. 38 through 47 can be used to form a neuron unit or a neural network, but the entire circuit need not be formed solely of hardware. For example, the signal processing may be carried out by software according to the procedure described with reference to the equations (8) through (29).

In the thirteenth embodiment of the present invention, the functions of the neuron units forming the neural network may be realized by software. In the case of the neural network shown in FIG. 2, the signal processing is carried out by software in an arbitrary neuron unit of the neural network. The signal processing may be carried out by software in one or more neuron units, all of the neuron units, or selected neuron units determined for each layer of the neural network.

Figure 66A:
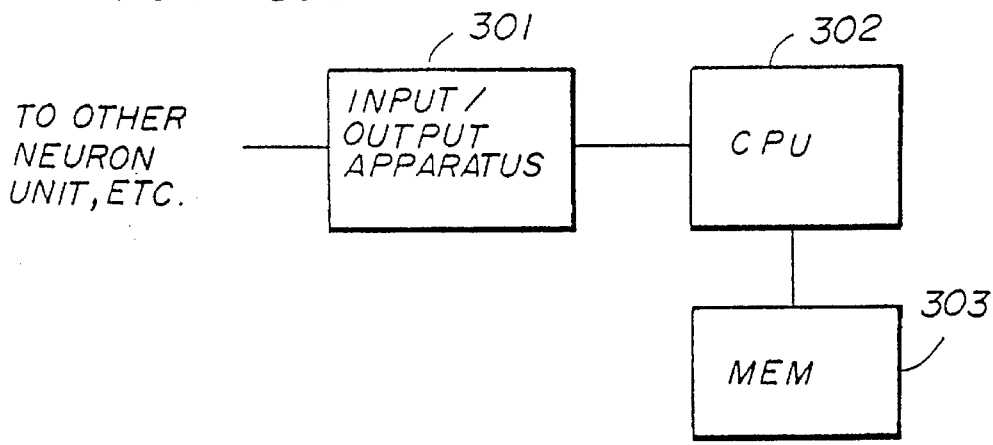
FIGS. 66A, 66B and 66C respectively are system block diagrams showing essential parts of thirteenth, fourteenth and fifteenth embodiments of the present invention.

FIG. 66A shows the neuron unit which carries out the signal processing by software in the thirteenth embodiment. In FIG. 66A, an input/output apparatus 301 is coupled to a neuron unit which uses a neuron circuit or an apparatus for inputting/outputting signals from/to the neural network. A memory 303 stores data and programs (software) for controlling a central processing unit (CPU) 302, and the signals are processed in the CPU 302. The signal processing procedure is as described above. The software is made according to the procedures shown in FIGS. 67 and 68 and stored in the memory 303.

One neuron unit shown in FIG. 66A may function as a plurality of neuron units depending on the software. In this case, it is necessary to process the signals in time division.

According to this embodiment, the network structure can be modified by simply changing the memory 303 (or changing the contents of the memory 303) without the need to modify the hardware. As a result, the network structure becomes flexible and suited for general applications.

Figure 66B:
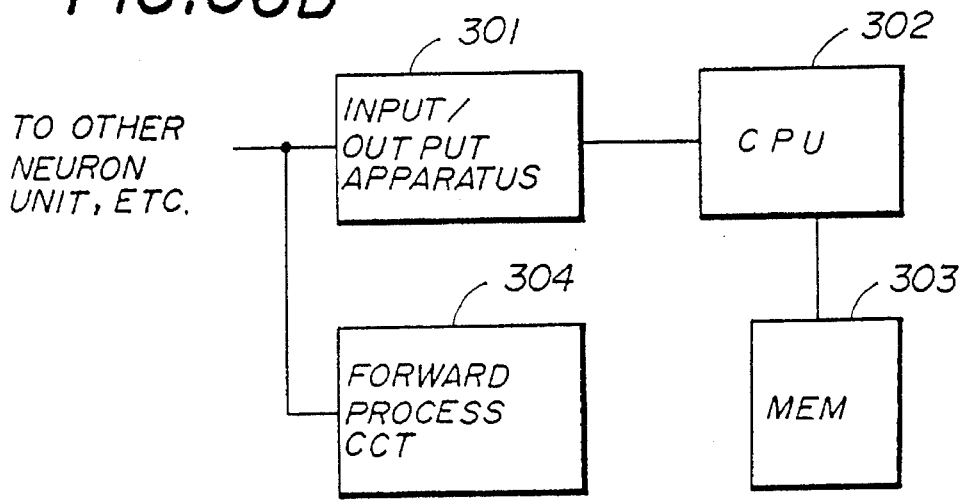

In the fourteenth embodiment, a portion of the functions of one neuron unit is carried out by software. In other words, the forward process is carried out by software. In FIG. 66B, software based on the signal processing procedure shown in FIG. 68 is stored in the memory 303, so as to realize a neuron unit which uses software and can carry out the forward process. In order to realize a neuron unit having the function of carrying out the forward process, the circuit shown in FIG. 38 or 45 is added to the input/output apparatus 301. In either case, the right half of the circuit shown in FIG. 39 and the circuit shown in FIG. 40 are required. The circuit shown in FIG. 44 may be provided depending on the needs. In FIG. 66B, the forward process is realized by the provision of a forward process circuit 304.

According to this embodiment, the network structure can be modified by simply changing the memory 303 (or changing the contents of the memory 303) without the need to modify the hardware. As a result, the network structure becomes flexible and suited for general applications.

General electronic apparatuses usually has a CPU and there is no need to newly provide the CPU 302. In addition, when no learning function is required, it is possible to greatly reduce the necessary hardware.

Figure 66C:
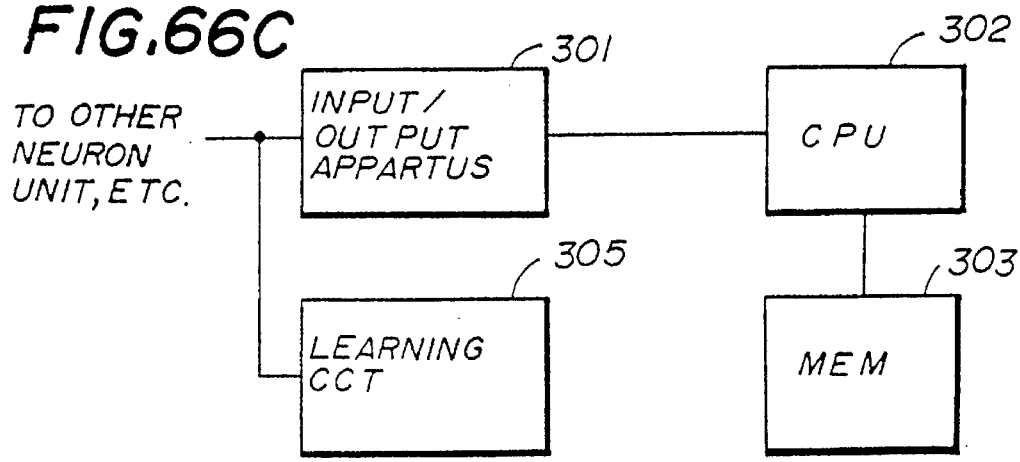

In the fifteenth embodiment, the learning process is carried out by software. In FIG. 66C, software based on the signal processing procedure shown in FIG. 67 is stored in the memory 303, so as to realize a neuron unit which uses software and can carry out the learning process. In order to realize a neuron unit having the function of carrying out the learning process, the circuits shown in FIGS. 38 and 39, the circuits shown in FIGS. 38 and 46, the circuit shown in FIG. 41, 42 or 47 is added to the input/output apparatus 301. The circuit shown in FIG. 43 may be provided depending on the needs. In FIG. 66C, the learning function is realized by the provision of a learning circuit 305.

According to this embodiment, the network structure can be modified by simply changing the memory 303 (or changing the contents of the memory 303) without the need to modify the hardware. As a result, the network structure becomes flexible and suited for general applications. In addition, the network can cope with a modification to the learning rule. Furthermore, general electronic apparatuses usually has a CPU and there is no need to newly provide the CPU 302.

As described above, the functions of the neuron unit can be realize using software. Moreover, when the signal processing system of the present invention is employed, the signal processing can be made solely by digital logic operations, and a low level language may be used for the required software thereby enabling high-speed processing of the software.

Figure 67:
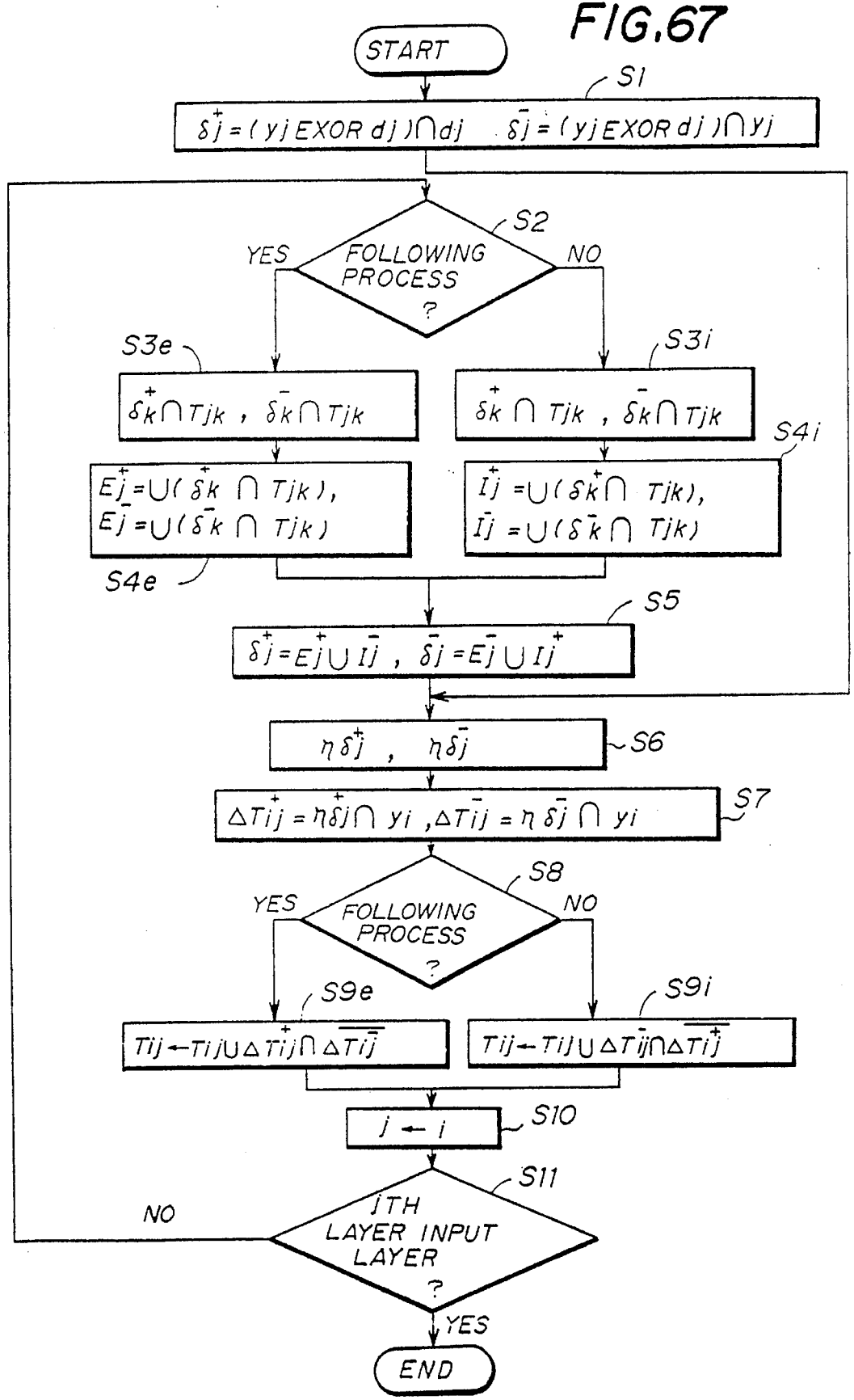
FIG. 67 is a flow chart for explaining a learning process of a CPU shown in FIG. 66B in the fourteenth embodiment.

FIG. 67 is a flow chart for explaining the learning process of the CPU 302. In FIG. 67, a step S1 generates the error signals $\delta^+j=(y_j \text{ EXOR } d_j) \text{ AND } d_j$ and $\delta^-j=(y_j \text{ EXOR } d_j) \text{ AND } y_j$ between the output signal $y_j$ and the teaching signal $d_j$ as described in conjunction with FIG. 27. A step S2 judges the following processes to be calculated depending on the sign of the weight function which is excitatory or inhibitory. Steps S3e and S4e are then carried out in the case where the coupling between the jth layer and the next kth layer is excitatory. On the other hand, steps S3i and S4i are carried out in the case where the coupling between the jth layer and the next kth layer is inhibitory.

The step S3e obtains an AND between the weight function $T_{jk}$ and the error signal $\delta^+k$, and an AND between the weight function $T_{jk}$ and the error signal $\delta^-k$. The step S4e obtains $E^+j= \cup(\delta^+k \cap T_{jk})$ which is an OR of all of $\delta^+k \cap T_{jk}$ obtained in the step S3e. In addition, the step S4e obtains $E^-j=\cup(\delta^-k \cap T_{jk})$ which is an OR of all of $\delta^-k \cap T_{jk}$ obtained in the step S3e.

Similarly, the step S3i obtains an AND between the weight function $T_{jk}$ and the error signal $\delta^+k$, and an AND between the weight function $T_{jk}$ and the error signal $\delta^-k$. The step S4i obtains $I^+jk=\cup(\delta^+k \cap T_{jk})$ which is an OR of all of $\delta^+k \cap T_{jk}$ obtained in the step S3i. In addition, the step S4i obtains $I^-j=\cup(\delta^-k \cap T_{jk})$ which is an OR of all of $\delta^-k \cap T_{jk}$ obtained in the step S3i.

A step S5 obtains $\delta^+j=E^+j \cup I^-j$ which is an OR of $E^+j$ and $I^-j$. In addition, the step S5 obtains $\delta^-j=E^-j \cup I^+j$ which is an OR of $E^-j$ and $I^+j$. A step S6 thins out the pulse trains of the error signals $\delta^+j$ and $\delta^-j$ and obtains $\eta\delta^+j$ and $\eta\delta^-j$. A step S7 obtains an AND of the input signal $y_i$ and the thinned out error signals $\eta\delta^+j$ and $\eta\delta^-j$. That is, the step S7 obtains $\Delta T^+ij=\eta\delta^+j \cap y_i$ and $\Delta T^-ij=\eta\delta^-j \cap y_i$. A step S8 judges the following processes to be calculated depending on the sign of the weight function which is excitatory or inhibitory.

Then, a step S9e is carried out in the case of the excitatory coupling and a step S9i is carried out in the case of the inhibitory coupling. The step S9e renews the weight function $T_{ij}$ by obtaining $T_{ij} \cap \overline{\Delta T^-ij} \cup \Delta T^+ij$. On the other hand, the step S9i renews the weight function $T_{ij}$ by obtaining $T_{ij} \cap \overline{\Delta T^+ij} \cup \Delta T^-ij$.

A step S10 changes j to i in accordance with the backward process In this case, j is decremented to i. A step S11 thereafter judges whether or not the jth layer of the neural network the input layer. The process returns to the step S2 when the judgement result in the step S11 is NO. On the other hand, the process ends when the judgement result in the step S11 is YES.

Figure 68:
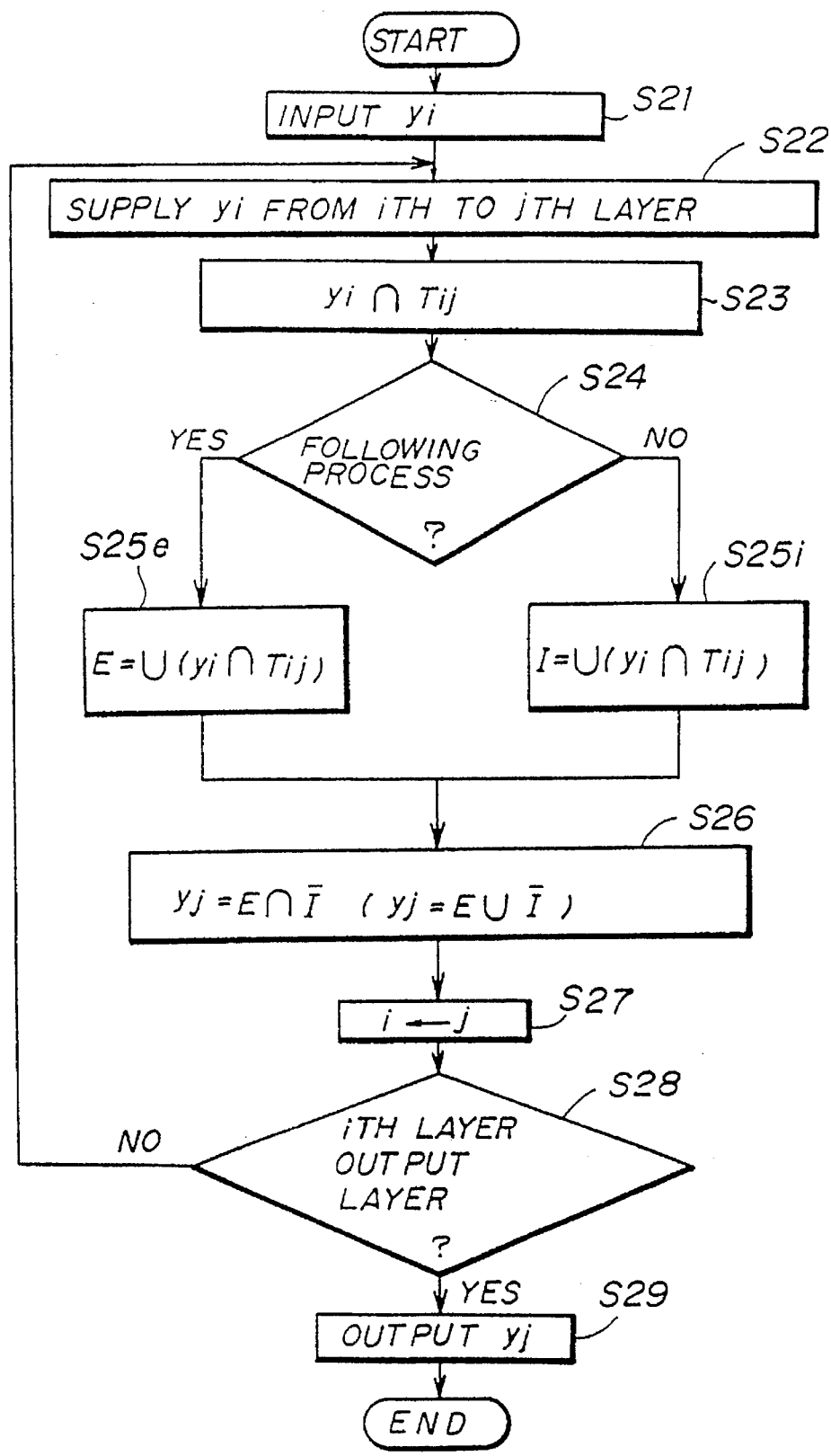
FIG. 68 is a flow chart for explaining a forward process of the CPU shown in FIG. 66C in the fifteenth embodiment.

FIG. 68 is a flow chart for explaining the forward process of the CPU 302. In FIG. 68, a step S21 inputs the input signal (pulse train) $y_i$. A step S22 supplies a signal $y_i$ from the ith layer to the jth layer, where j=i+1. A step S23 obtains $y_i \cap T_{ij}$ which is an AND of the input signal $y_i$ and the weight function $T_{ij}$. A step S24 judges the following processes to be calculated depending on the sign of the weight function which is excitatory or inhibitory.

A step S25e is then carried out when the coupling is excitatory. On the other hand, a step S25i is carried out when the coupling is inhibitory. The step S25e obtains $E=\cup(T_{ij} \cap y_i)$ which is an OR of all $y_i \cap T_{ij}$ obtained in the step S23. The step S25i obtains $I=\cup(T_{ij} \cap y_i)$ which is an OR of all $y_i \cap T_{ij}$ obtained in the step S23.

A step S26 obtains $y_j=E \cap \overline{I}$ which is an AND of E and $\overline{I}$, or $y_j=E \cup \overline{I}$ which is an OR of E and $\overline{I}$. Then, a step S27 increments i by one. In this case, i is incremented to j. A step S28 judges whether or not the ith layer is the output layer of the neural network. When the judgement result in the step S28 is NO, the process returns to the step S22. On the other hand, when the judgement result in the step S28 is YES, a step S29 outputs the signal (pulse train) $y_j$ and the process ends.

Of course, the application of the present invention is not limited to the character recognition system. The present invention may be applied to various other systems such as image recognition systems, motion control systems for robots, and associative information storage systems.

In addition, the structure of the neural network according to the present invention is not limited to the network structure shown in FIG. 2.

Figure 69:
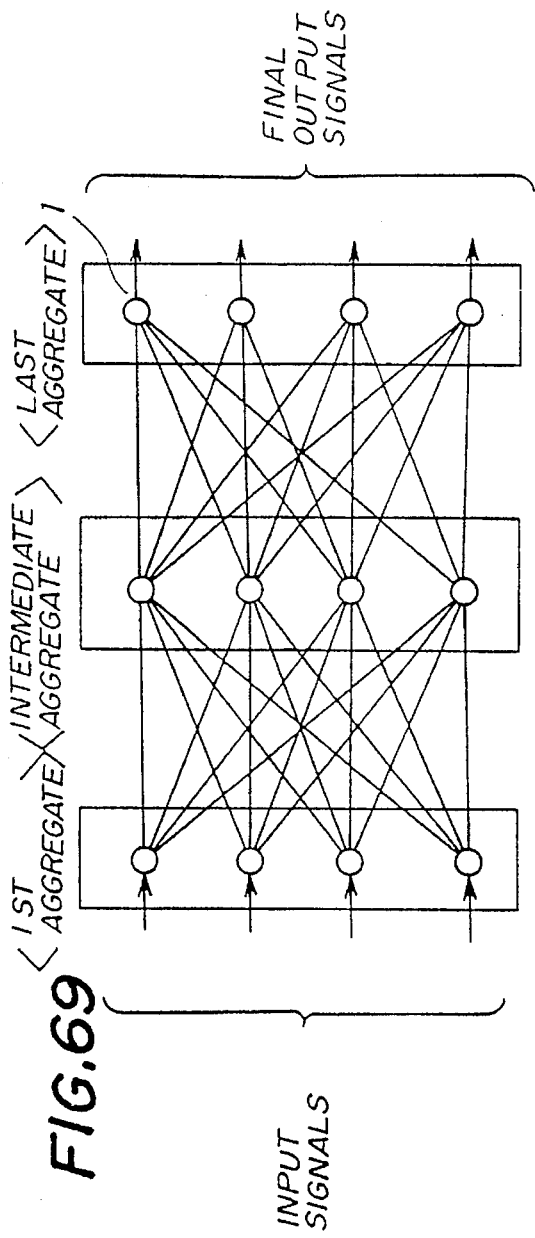
FIGS. 69, 70 and 71 are system block diagrams for explaining further embodiments of the present invention.

FIG. 69 shows a neural network in which a neuron unit 1 included in an aggregate is not coupled to all neuron units 1 included in another aggregate. In the neural network shown in FIG. 2, each neuron unit 1 included in an aggregate is coupled to all neuron units 1 included in another aggregate. But in the present invention, the neuron units 1 included in an aggregate need not be coupled to all neuron units 1 included in another aggregate as may be seen from FIG. 69.

Figure 70:
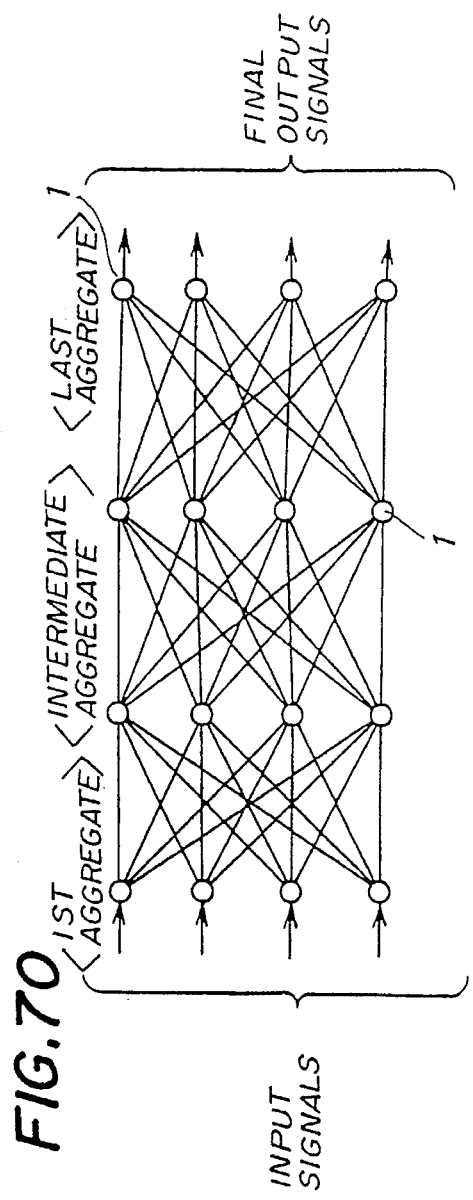

FIG. 70 shows a neural network in which a first aggregate and a last aggregate are coupled via two intermediate aggregates. Of course, the number of intermediate aggregates between the first and last aggregates is not limited to one or two and may be three or more.

Figure 71:
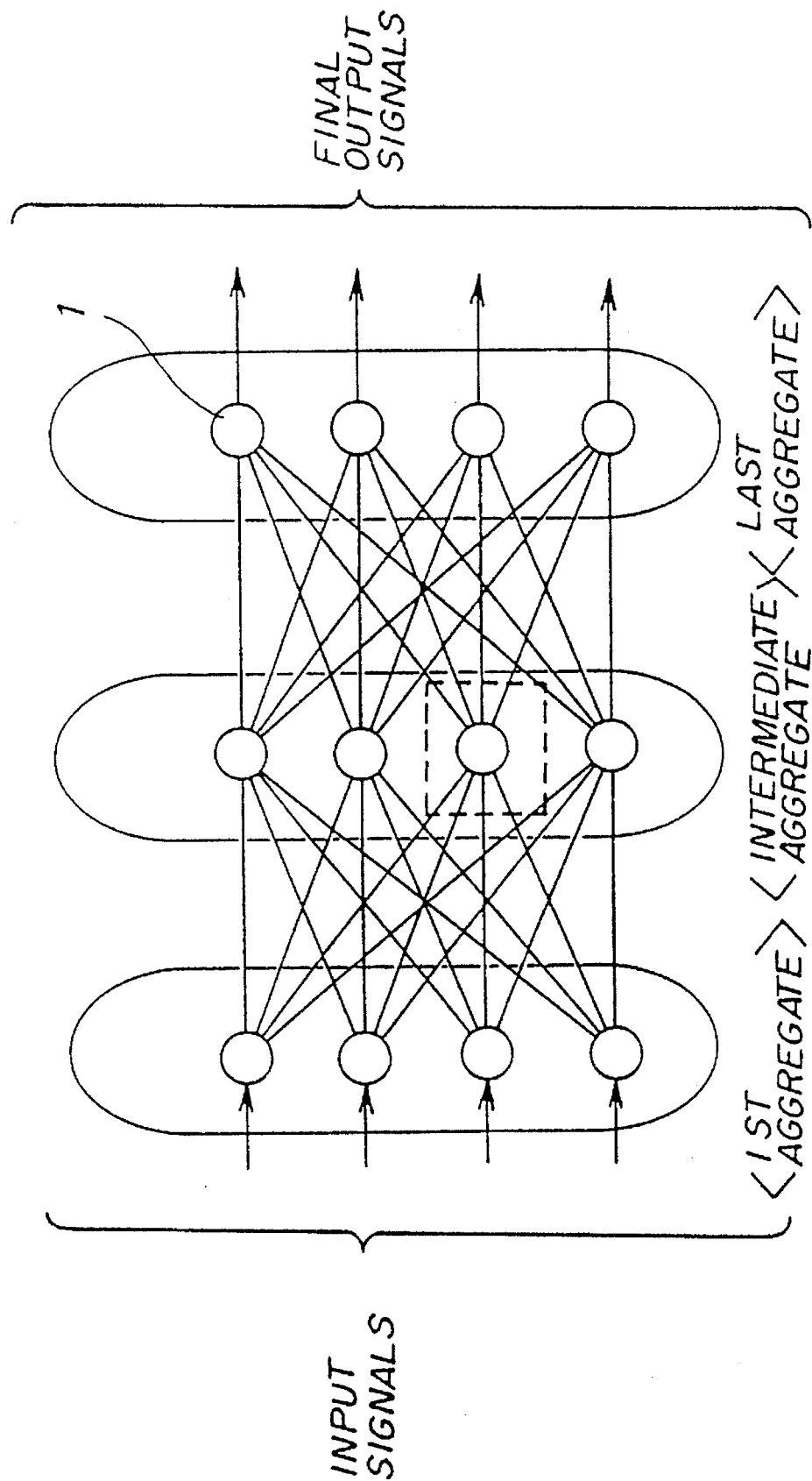

FIG. 71 shows a neural network in which a first aggregate and a last aggregate are coupled via a single intermediate aggregate.

Further, the present invention is not limited to these embodiments, but various variations and modifications may be made without departing from the scope of the present invention.

What is claimed is:

1. A signal processing method for processing a plurality of input signals within a neuron unit, and for outputting an output signal which is indicative of a result of the processing, the signal processing method comprising:

(a) carrying out a forward process within the neuron unit, the forward process including the steps of:
      a1) carrying out an operation on a plurality of weight functions, wherein each of the input signals corresponds to the weight functions; and
      a2) outputting a result of said operation as the output signal; and (b) carrying out a self-learning process within the neuron unit, the self-learning process including the substep of:
      b1) controlling the weight functions based on an error signal representing an error between (1) the output signal obtained by the forward process carried out in said step (a) and (2) a teaching signal;

wherein:

the error signal on which control of the weight functions is based in said step (b) substep b1) includes:
- e1) a first error signal component representing pulse densities; and
- e2) a second error signal component also representing pulse densities;

the first and second error signal components take on values other than a negative value;

the error between said output signal obtained by the forward process carried out in said step (a) and the teaching signal is equal to a difference between the first error signal component and the second error signal component; and the first error signal component and the second error signal component can simultaneously take on values other than the teaching signal and the output signal.

* * * * *

UNITED STATES PATENT AND TRADEMARK OFFICE
CERTIFICATE OF CORRECTION

PATENT NO. : 5,504,838
DATED : April 2, 1996
INVENTOR(S) : Toshiyuki FURUTA et al.

It is certified that error appears in the above-indentified patent and that said Letters Patent is hereby corrected as shown below: On title page, item [54] and col. 1, line 1,

In the title, insert --,-- after the word "UNIT".

In the Abstract, at lines 9-10, delete "an error signal representing an error" and insert --errors--.

In the Abstract, at line 11, delete "signal" and insert --signals--.

In the Abstract, delete the last sentence "The error signal includes first and second error signal components representing pulse densities".

At column 2, line 24, delete "FIG. 4 shows" and insert --FIGS. 4 and 4A show--.

At column 6, line 8, delete "," after "gate" and insert a space.

At column 9, line 67, delete "," and insert --.--.

At column 10, between lines 13 and 14, insert --FIG. 4A illustrates a detail of FIG. 4;--.

Column 10, line 66, delete "FIG." and insert --FIGS.--.

At column 11, line 8, delete "34 and 35" and insert --32 and 33--.

At column 11, line 20, delete "10" and insert --40--.

At column 16, line 17, insert --,-- after ""010000"".

UNITED STATES PATENT AND TRADEMARK OFFICE
CERTIFICATE OF CORRECTION

PATENT NO. : 5,504,838
DATED : April 2, 1996
INVENTOR(S) : Toshiyuki FURUTA et al.

It is certified that error appears in the above-indentified patent and that said Letters Patent is hereby corrected as shown below:

At column 16, line 17, insert --.-- after "example".

At column 16, line 53, insert --,-- after ""0"".

At column 20, line 6, delete "B6" and insert --36--.

At column 20, line 44, insert --and-- before "a".

At column 21, line 49, insert --,-- after ""1"".

At column 22, line 10, insert --,-- after "Hence".

At column 23, line 34, insert --,-- after ""1"".

At column 25, line 49, insert --it-- before "becomes".

At column 26, line 31, delete "[SD]" and insert --[8D]--.

At column 37, line 23, delete "$2" and insert --S2--.

Signed and Sealed this

Tenth Day of September, 1996

Attest:

BRUCE LEHMAN

Attesting Officer

Commissioner of Patents and Trademarks